United States Patent
You et al.

(10) Patent No.: US 12,549,856 B2
(45) Date of Patent: Feb. 10, 2026

(54) ACTUATOR DEVICE

(71) Applicant: LG INNOTEK CO., LTD., Seoul (KR)

(72) Inventors: Jeong Gi You, Seoul (KR); Han Ul Kwon, Seoul (KR); Hyun Joong Lee, Seoul (KR)

(73) Assignee: LG INNOTEK CO., LTD., Seoul (KR)

( * ) Notice: Subject to any disclaimer, the term of this patent is extended or adjusted under 35 U.S.C. 154(b) by 274 days.

(21) Appl. No.: 18/551,094

(22) PCT Filed: Mar. 24, 2022

(86) PCT No.: PCT/KR2022/004111
§ 371 (c)(1),
(2) Date: Sep. 18, 2023

(87) PCT Pub. No.: WO2022/203412
PCT Pub. Date: Sep. 29, 2022

(65) Prior Publication Data
US 2024/0163557 A1    May 16, 2024

(30) Foreign Application Priority Data
Mar. 24, 2021 (KR) .................. 10-2021-0038368

(51) Int. Cl.
*H04N 23/68* (2023.01)
*H01F 7/06* (2006.01)
(Continued)

(52) U.S. Cl.
CPC .......... *H04N 23/687* (2023.01); *H01F 7/064* (2013.01); *H04N 23/54* (2023.01); *H04N 23/55* (2023.01);
(Continued)

(58) Field of Classification Search
CPC ........ H04N 23/54; H04N 23/55; H04N 23/57; H04N 23/68; G03B 2205/0023
(Continued)

(56) References Cited

U.S. PATENT DOCUMENTS

2019/0268515 A1    8/2019   Im et al.
2020/0404181 A1    12/2020  Lee et al.
(Continued)

FOREIGN PATENT DOCUMENTS

CN    110662998 A    1/2020
CN    111624728 A    9/2020
(Continued)

OTHER PUBLICATIONS

International Search Report dated Jul. 8, 2022 in International Application No. PCT/KR2022/004111.
(Continued)

*Primary Examiner* — Anthony J Daniels
(74) *Attorney, Agent, or Firm* — Saliwanchik, Lloyd & Eisenschenk

(57) ABSTRACT

The actuator device according to the present embodiment comprises: a holder; a reflective member disposed on the holder; a rigid mover coupled to the holder; a first magnet disposed on the rigid mover; a second magnet generating a repulsive force with the first magnet; and a first driving magnet for tilting the holder, wherein the first driving magnet comprises a first surface in a direction directing toward the reflective member, wherein the second magnet comprises a first surface in a direction directing toward the reflective member, wherein the first surface of the first driving magnet comprises a first region that is the most adjacent to the second magnet, and wherein a first region of the first driving magnet having a polarity different from that of the first surface of the second magnet.

20 Claims, 34 Drawing Sheets

(51) Int. Cl.
　　*H04N 23/54*　　　(2023.01)
　　*H04N 23/55*　　　(2023.01)
　　*H04N 23/63*　　　(2023.01)
　　*H01F 7/16*　　　　(2006.01)

(52) U.S. Cl.
　　CPC ... *H04N 23/632* (2023.01); *H01F 2007/1692* (2013.01)

(58) Field of Classification Search
　　USPC ..................................... 348/208.99
　　See application file for complete search history.

(56) References Cited

U.S. PATENT DOCUMENTS

| | | | | |
|---|---|---|---|---|
| 2022/0221771 A1* | 7/2022 | Hur | ............ | G03B 3/10 |
| 2022/0326510 A1* | 10/2022 | Lee | ............ | G03B 5/00 |
| 2024/0219712 A1* | 7/2024 | Wu | ............ | G02B 7/1805 |
| 2025/0240528 A1* | 7/2025 | Kwon | ............ | H04N 23/55 |

FOREIGN PATENT DOCUMENTS

| | | |
|---|---|---|
| JP | 2020-126231 A | 8/2020 |
| KR | 10-1942743 B1 | 1/2019 |
| KR | 10-2067069 B1 | 1/2020 |
| KR | 10-2020-0125629 A | 11/2020 |
| TW | 202001320 A | 1/2020 |
| WO | 2021/020862 A1 | 2/2021 |

OTHER PUBLICATIONS

Supplementary European Search Report dated Jul. 30, 2024 in European Application No. 22776112.9.

Office Action dated Aug. 25, 2025 in Taiwanese Application No. 111110658.

* cited by examiner (a)

(b)

ACTUATOR DEVICE

CROSS-REFERENCE TO RELATED APPLICATIONS

This application is the U.S. national stage application of International Patent Application No. PCT/KR2022/004111, filed Mar. 24, 2022, which claims the benefit under 35 U.S.C. § 119 of Korean Application No. 10-2021-0038368, filed Mar. 24, 2021, the disclosures of each of which are incorporated herein by reference in their entirety.

TECHNICAL FIELD

The present embodiment relates to an actuator device.

BACKGROUND ART

A camera device is a device that photographs a picture or video of a subject, and is installed in optical devices such as smartphones, drones, and vehicles.

In recent camera devices, there is a demand for optical image stabilization (OIS) function that corrects image shake caused by user movement to improve image quality, auto focus (AF) function that automatically adjusts the distance between the image sensor and the lens to align the focal length of the lens, and a zoom function that increases or decreases the magnification of a distant subject through a zoom lens.

DETAILED DESCRIPTION OF THE INVENTION

Technical Subject

The present embodiment is intended to provide an actuator device in which an OIS function is implemented through tilting of a reflective member.

Furthermore, the present invention is intended to provide an actuator device in which magnetic field interference between magnets is minimized.

Technical Solution

The actuator device according to this embodiment comprises: a holder; a reflective member disposed on the holder; a rigid mover coupled to the holder; a first magnet disposed on the rigid mover; a second magnet generating a repulsive force with the first magnet; and a first driving magnet for tilting the holder, wherein the first driving magnet comprises a first surface in a direction toward the reflective member, wherein the second magnet comprises a first surface in a direction toward the reflective member, wherein the first surface of the first driving magnet comprises a first region that is the most adjacent to the second magnet, and wherein the first region of the first driving magnet may have a polarity different from that of the first surface of the second magnet.

The first surface of the first driving magnet may comprise a second region having a polarity different from that of the first region.

The first driving magnet comprises a second surface opposite to the first surface of the first driving magnet, and the second surface of the first driving magnet may comprise a third region having a polarity different from that of the first region and a fourth region having a polarity different from that of the second region.

The actuator device may comprise: a housing; and a moving plate disposed between the housing and the holder, wherein the second magnet may be disposed in the housing.

The size of the first magnet may be different from the size of the second magnet.

The central axis of the first magnet may be disposed to be eccentric with the central axis of the moving plate with respect to the first optical axis.

The rigid mover may comprise a protruding portion coupled to the housing by a damper.

The first driving magnet may comprise a neutral portion disposed between the first region and the second region.

It comprises a first coil interacting with the first driving magnet, and the second surface of the first driving magnet may face the first coil.

The second magnet comprises a second surface disposed at an opposite side of the first surface of the second magnet, the first magnet comprises a first surface facing the second surface of the second magnet, and the first surface of the first magnet may have the same polarity as the second surface of the second magnet.

The second magnet may be disposed so as not to be overlapped with the first driving magnet in a direction to which the first surface of the first driving magnet is directing.

The second magnet may be disposed so as not to be overlapped with the first driving magnet in a direction to which the first surface of the second magnet is directing.

The first region of the first driving magnet may have an S pole and the second region may have an N pole.

The holder may comprise a groove concavely formed on a lower surface of the holder, and at least a portion of the first driving magnet may be disposed in the groove of the holder.

The first driving magnet and the first coil may tilt the holder with respect to a first axis.

It comprises a second driving magnet and a second coil for tilting the holder with respect to a second axis perpendicular to the first axis, and the second driving magnet may be disposed on both side surfaces of the holder.

It may comprise a yoke disposed between the first surface of the first driving magnet and the holder.

The moving plate may be disposed between the first surface of the second magnet and the holder.

A camera device according to the present embodiment comprises: a printed circuit board; an image sensor disposed in the printed circuit board; an actuator device; and a lens disposed in an optical path formed by the reflective member of the actuator device and the image sensor.

An optical device according to the present embodiment may comprise: a main body; a camera device disposed on the body; and a display disposed on the main body and outputting at least one of a video and an image photographed by the camera device.

The actuator device according to the present embodiment comprises: a fixed part; a moving part that moves with respect to the fixed part; a first magnet disposed on the moving part; a second magnet generating a repulsive force with the first magnet; and a first driving magnet for tilting the moving part, wherein the second magnet comprises a first surface opposite to a surface facing the first magnet, and wherein a region of the first driving magnet that is the most adjacent to the first surface of the second magnet may have a polarity for generating an attractive force with the first surface of the second magnet.

The actuator device according to the present embodiment comprises: a fixed part; a moving part moving against the fixed part; a magnet disposed in the fixed part and generating a repulsive force with the moving part; and a driving magnet for driving the moving part, wherein the first surface of the magnet and the first region of the driving magnet that is the most adjacent to the first surface of the magnet may generate an attractive force with each other.

The first surface of the magnet may be an N-pole.

The first region of the driving magnet may be an S pole.

The fixed part comprises a housing, wherein the moving part comprises a holder disposed inside the housing, and wherein the driving magnet may comprise a first driving magnet for tilting the holder against a first axis and a second driving magnet for tilting the holder against a second axis perpendicular to the first axis.

The first driving magnet may be disposed between the holder and a lower surface of the housing.

The second driving magnet may be disposed between the holder and a side surface of the housing.

The first driving magnet may comprise a first surface comprising a region that is the most adjacent to the first surface of the magnet, and the region of the first driving magnet may have a polarity different from that of the first surface of the magnet.

The actuator device according to the present embodiment comprises: a fixed part; a moving part moving with respect to the fixed part; a moving plate disposed between the fixed part and the moving part; a first magnet disposed on the moving part; a second magnet disposed on the fixed part and generating a repulsive force with the first magnet; and a first driving magnet and a first coil for tilting the moving part, and a second driving magnet and a second coil, wherein each of the second magnet and the first driving magnet comprises a first surface facing the center of the moving part, wherein the first surface of the first driving magnet comprises a first region and a second region having different polarities from each other, wherein the first surface of the second magnet is disposed adjacent to the first driving magnet rather than the second driving magnet, wherein the first region of the first driving magnet is disposed adjacent to the second magnet rather than the second region, and wherein the first region of the first driving magnet may have a polarity different from that of the first surface of the second magnet.

The first driving magnet comprises a second surface disposed opposite the first surface of the first driving magnet and facing the first coil, wherein the second surface of the first driving magnet may comprise: a third region disposed at a position corresponding to the first region and having a polarity different from that of the first region; and a fourth region disposed at a position corresponding to the second region and having a polarity different from that of the second region.

The second magnet may be disposed so as not to be overlapped with the first driving magnet in a direction in which the first surface of the first driving magnet is directing.

The second magnet may be disposed so as not to be overlapped with the first driving magnet in a direction in which the first surface of the second magnet is directing.

The actuator device according to the present embodiment comprises: a housing; a holder disposed inside the housing; a reflective member disposed on the holder; a moving plate disposed between the housing and the holder; a rigid mover coupled to the holder; a first magnet disposed on the rigid mover; a second magnet disposed on the housing; and a first driving magnet and a first coil for tilting the holder, wherein each of the second magnet and the first driving magnet comprises a first surface facing the center of the holder, and wherein the first surface of the first driving magnet and the first surface of the second magnet may comprise regions having different polarities.

Advantageous Effects

Through the present embodiment, magnetic field interference between the driving magnet and the magnet for maintaining the posture may be minimized. More specifically, the influence of the repulsive magnet on the electromagnetic interaction between the driving magnet and the coil can be minimized. Through this, stable driving performance can be secured.

Furthermore, as the attractive force acts between the driving magnet disposed on the holder and the repulsive force magnet disposed on the housing, the force of the holder pressing the moving plate may be reinforced. Through this, the separation and removal of the moving plate can be minimized.

BEST MODE

Hereinafter, preferred embodiments of the present invention will be described in detail with reference to the accompanying drawings.

However, the technical idea of the present invention is not limited to some embodiments to be described, but may be implemented in various forms, and within the scope of the technical idea of the present invention, one or more of the constituent elements may be selectively combined or substituted between embodiments.

In addition, the terms (comprising technical and scientific terms) used in the embodiments of the present invention, unless explicitly defined and described, can be interpreted as a meaning that can be generally understood by a person skilled in the art, and commonly used terms such as terms defined in the dictionary may be interpreted in consideration of the meaning of the context of the related technology.

In addition, terms used in the present specification are for describing embodiments and are not intended to limit the present invention.

In the present specification, the singular form may comprise the plural form unless specifically stated in the phrase, and when described as "at least one (or more than one) of A and B and C", it may comprise one or more of all combinations that can be combined with A, B, and C.

In addition, in describing the components of the embodiment of the present invention, terms such as first, second, A, B, (a), and (b) may be used. These terms are merely intended to distinguish the components from other components, and the terms do not limit the nature, order or sequence of the components.

And, when a component is described as being 'connected', 'coupled' or 'interconnected' to another component, the component is not only directly connected, coupled or interconnected to the other component, but may also comprise cases of being 'connected', 'coupled', or 'interconnected' due that another component between that other components.

In addition, when described as being formed or arranged in "on (above)" or "below (under)" of each component, "on (above)" or "below (under)" means that it comprises not only the case where the two components are directly in contact with, but also the case where one or more other components are formed or arranged between the two components. In addition, when expressed as "on (above)" or "below (under)", the meaning of not only an upward direction but also a downward direction based on one component may be comprised.

Hereinafter, a reflective member driving device according to the present embodiment will be described with reference to the drawings.

Figure 9:
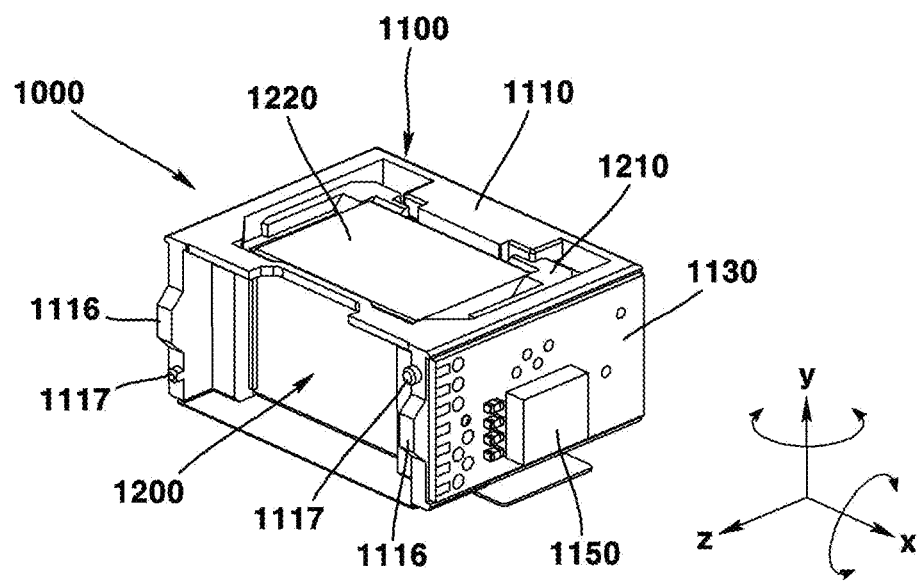
FIG. 9 is a perspective view of a reflective member driving device according to the present embodiment.
Figure 10:
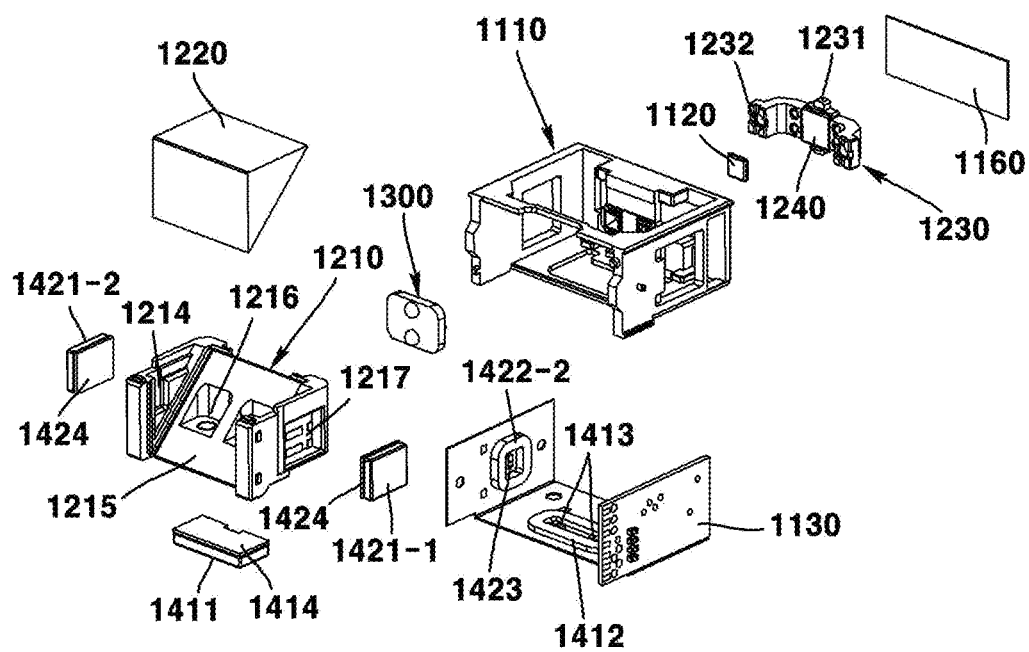
FIG. 10 is an exploded perspective view of a reflective member driving device according to the present embodiment.
Figure 11:
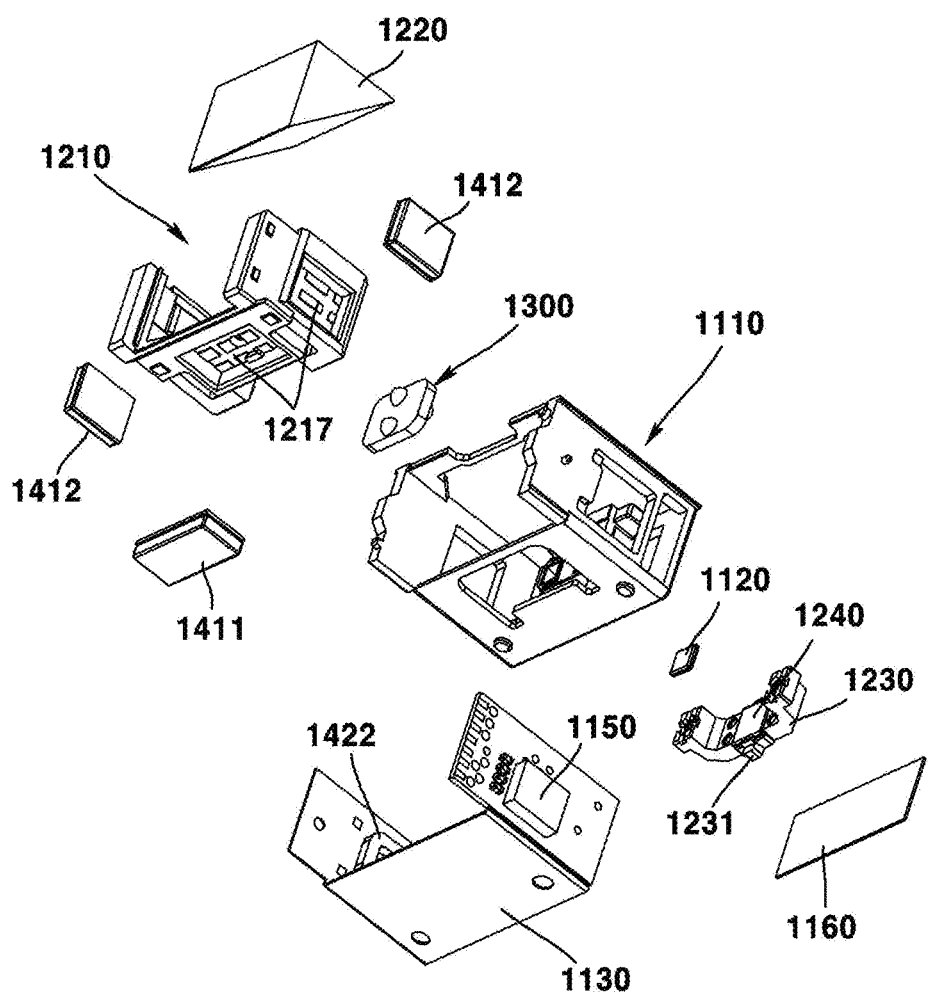
FIG. 11 is a bottom exploded perspective view of a reflective member driving device according to the present embodiment.
Figure 12:
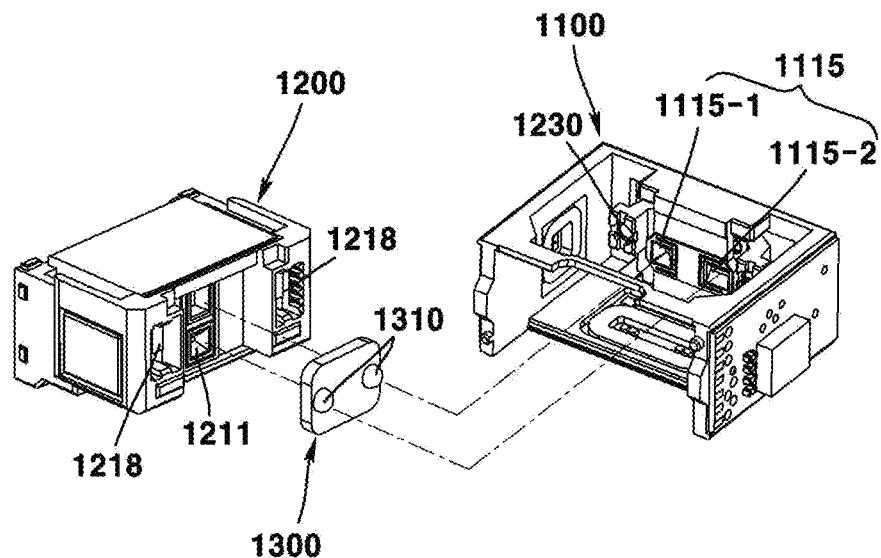
FIGS. 12 and 13 are diagrams for explaining a structure related to a moving plate of a reflective member driving device according to the present embodiment.
Figure 13:
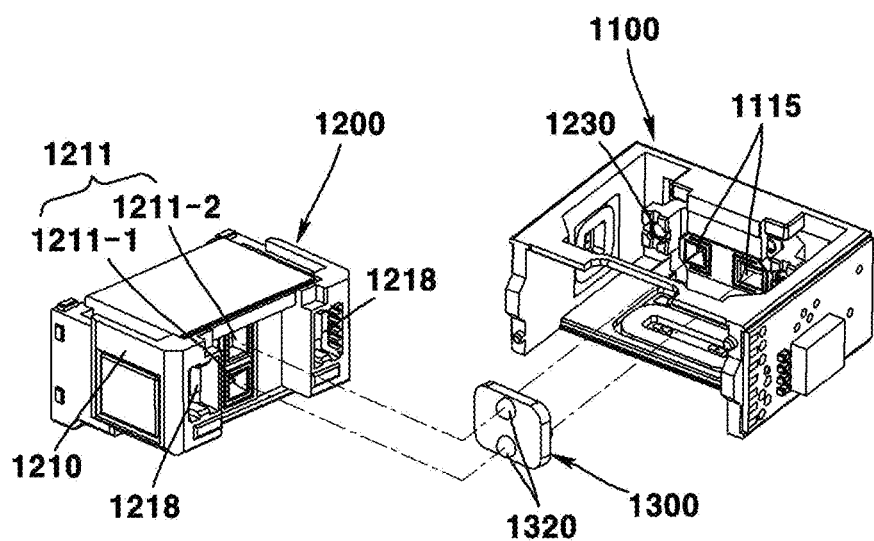
Figure 14:
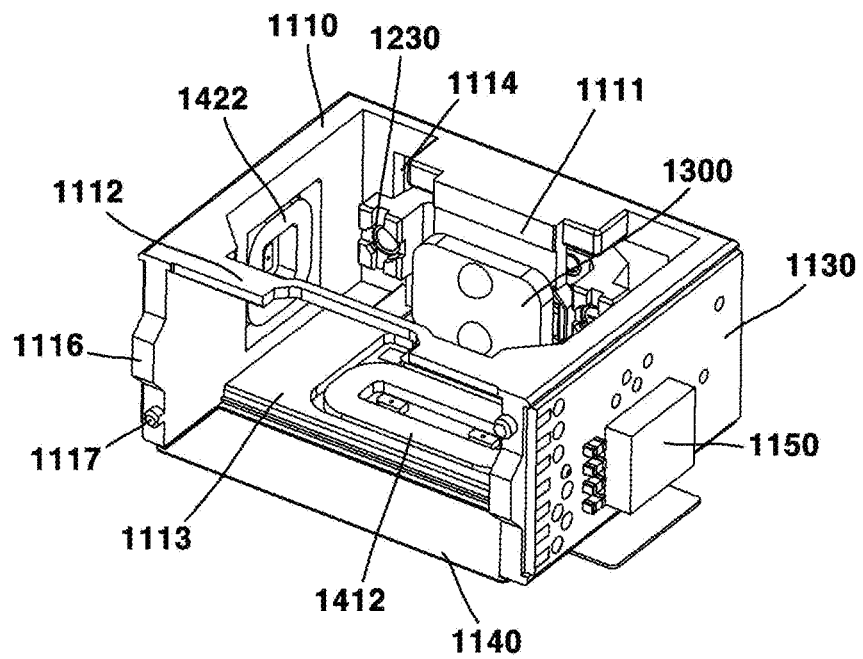
FIG. 14 is a perspective view of a state in which the configuration of a moving part of a reflective member driving device according to the present embodiment is omitted.
Figure 15:
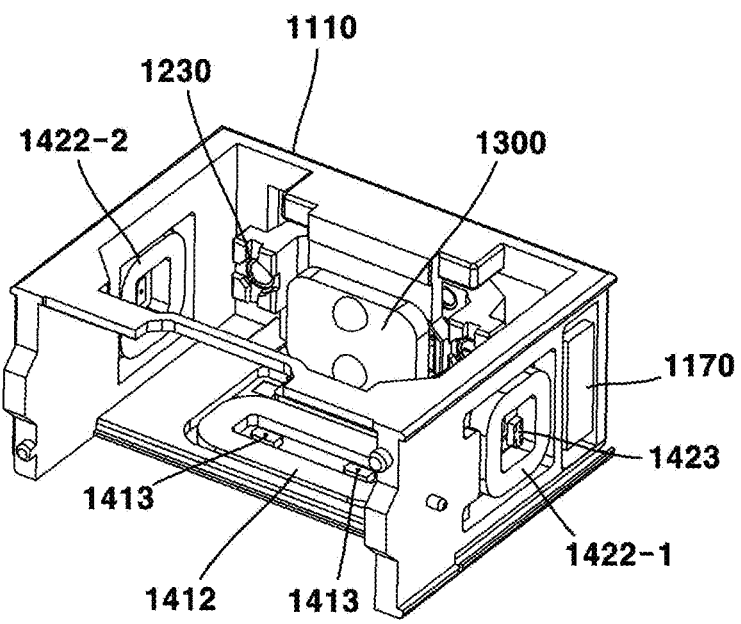
FIG. 15 is a perspective view of the reflective member driving device of FIG. 14 in a state in which components such as a substrate are omitted.
Figure 16:
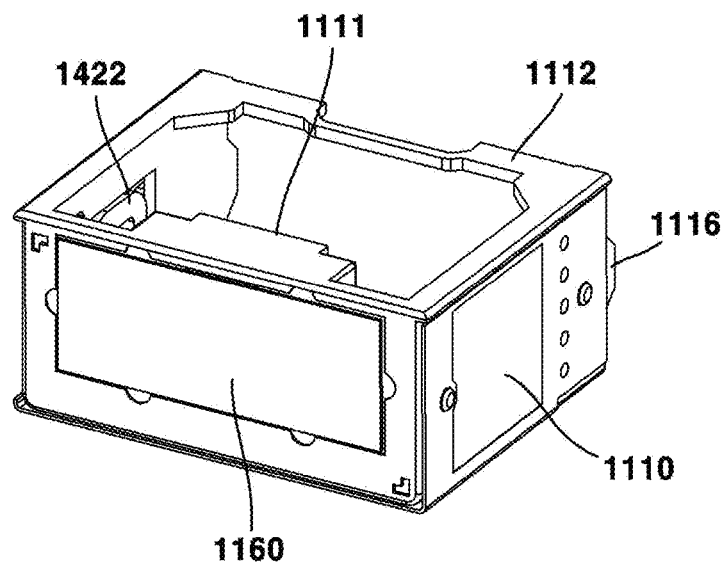
FIG. 16 is a perspective view illustrating a fixed part and related configuration of a reflective member driving device according to the present embodiment.
Figure 17:
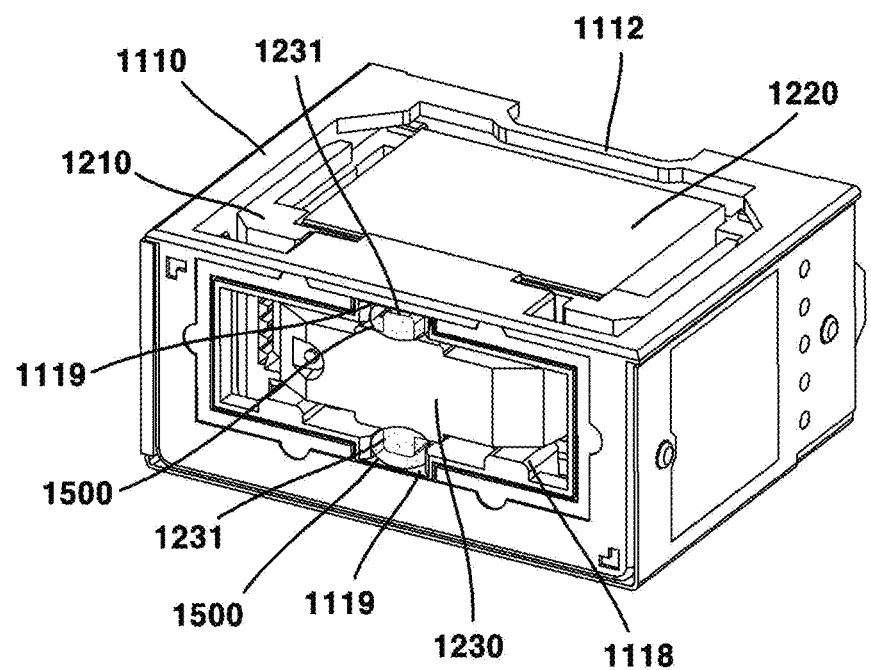
FIG. 17 is a perspective view illustrating a state in which a moving part is disposed in a fixed part in a reflective member driving device according to the present embodiment.
Figure 18:
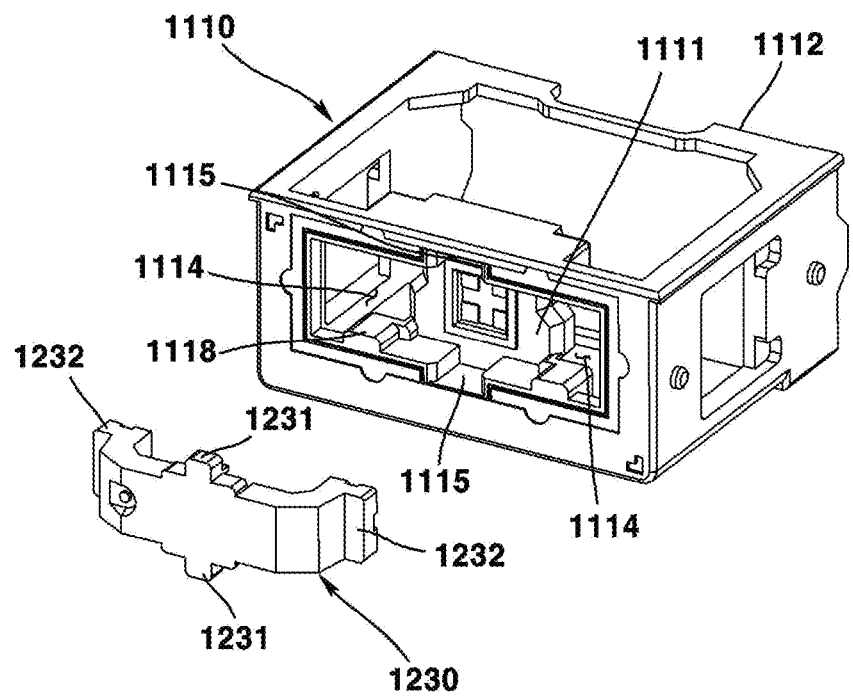
FIG. 18 is an exploded perspective view illustrating the related shapes of a rigid mover and the fixed part of a reflective member driving device according to the present embodiment.
Figure 19:
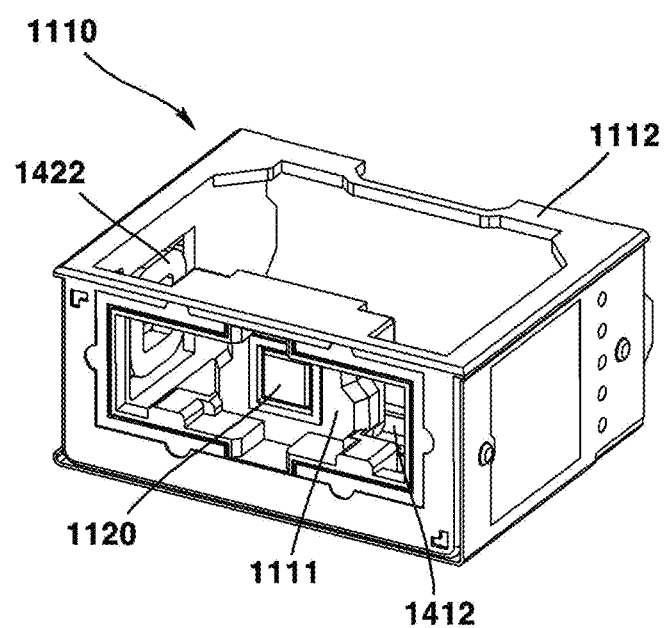
FIG. 19 is a perspective view illustrating an arrangement state of a second magnet of a fixed part of a reflective member driving device according to the present embodiment.
Figure 20:
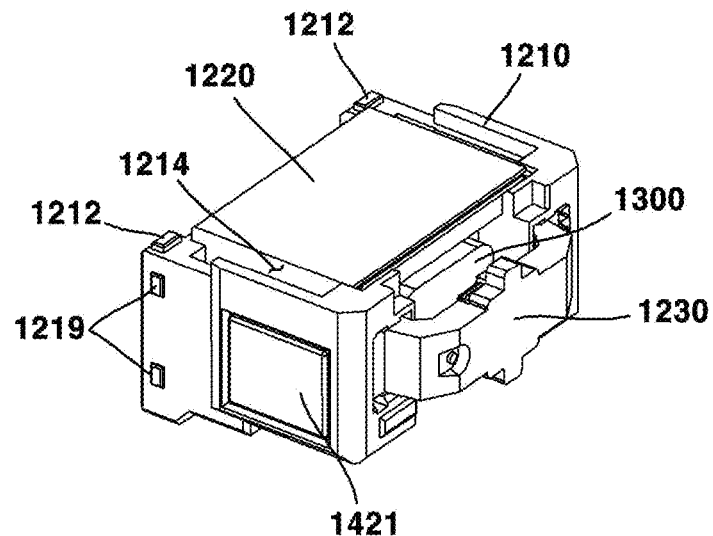
FIG. 20 is a perspective view illustrating a coupling state between a holder of a reflective member driving device and a rigid mover according to the present embodiment.
Figure 21:
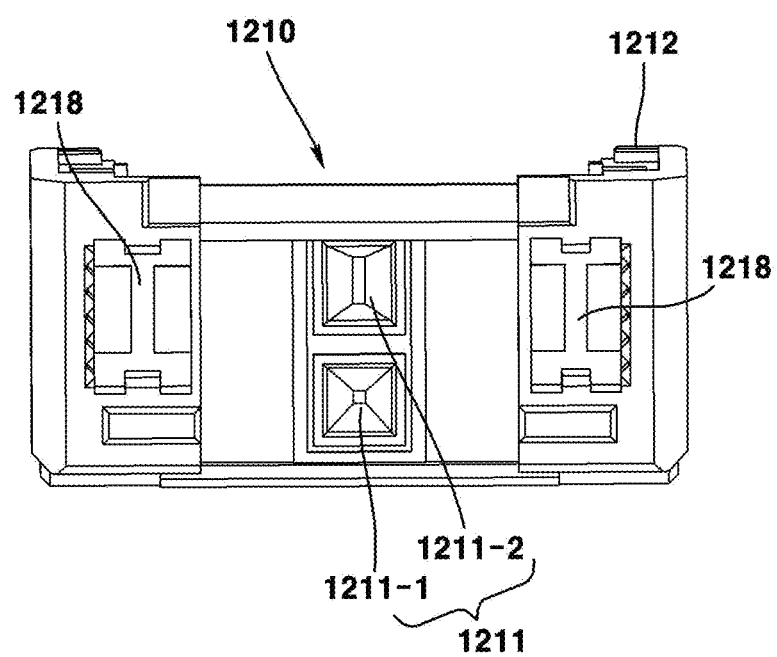
FIG. 21 is a front view illustrating a holder of a reflective member driving device according to the present embodiment.
Figure 22:
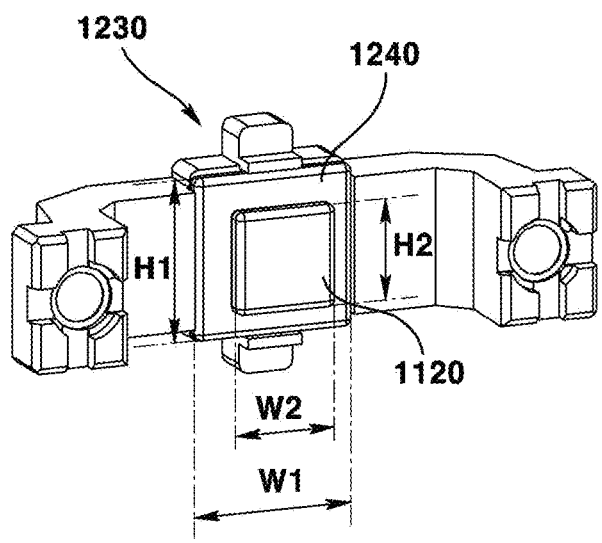
FIG. 22 is a perspective view illustrating a rigid mover, a first magnet, and a second magnet of a reflective member driving device according to the present embodiment.
Figure 23:
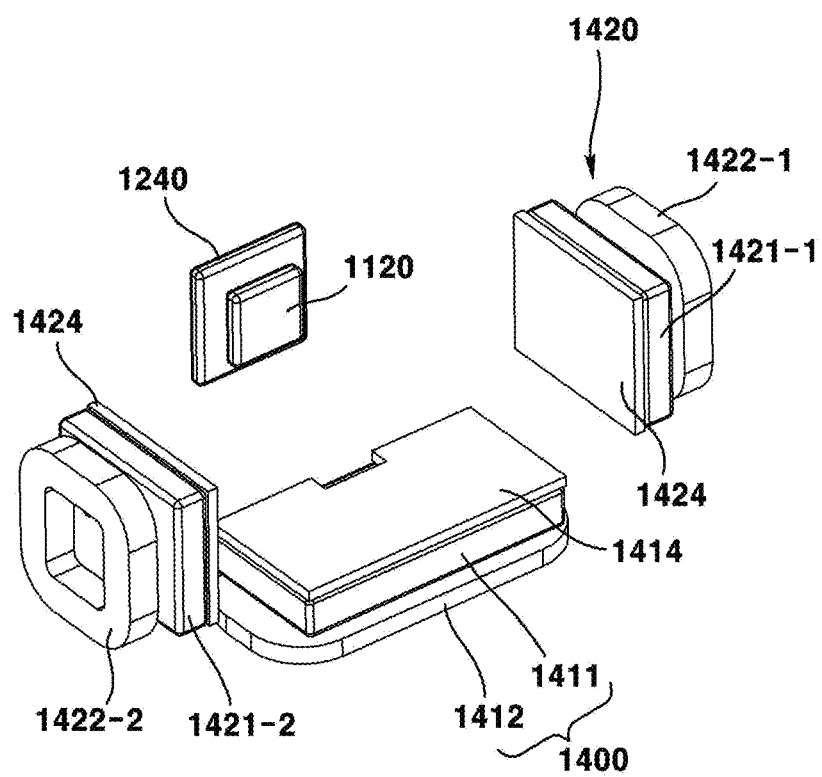
FIG. 23 is a perspective view illustrating a first magnet, a second magnet, and a driving unit of a reflective member driving device according to the present embodiment.
Figure 24:
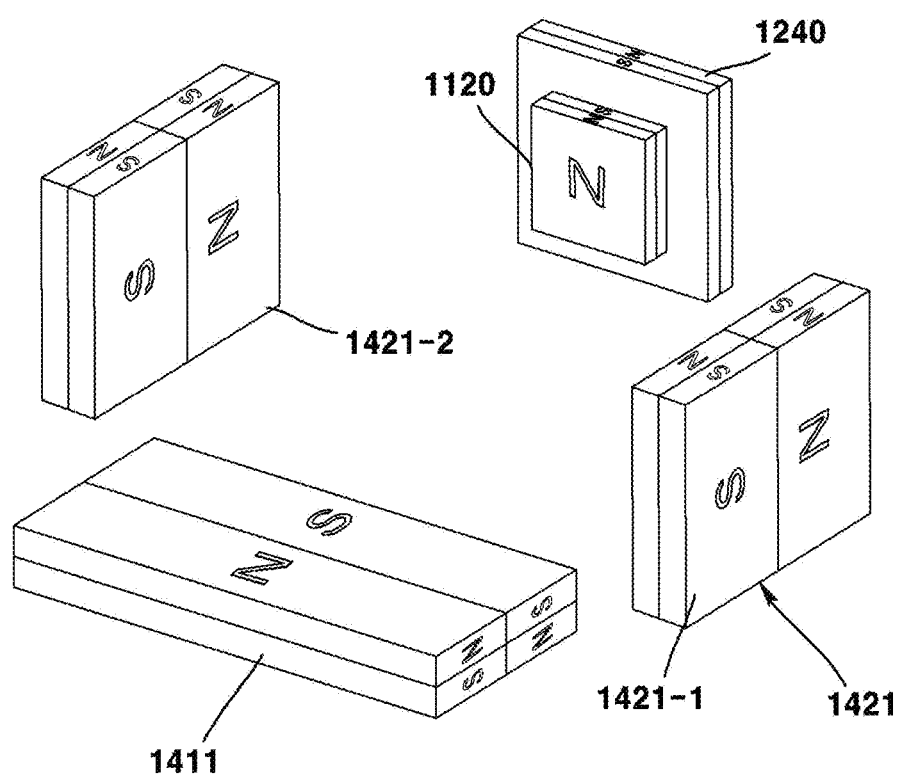
FIG. 24 is a perspective view illustrating a first magnet, a second magnet, and a driving magnet of a reflective member driving device according to the present embodiment.
Figure 25:
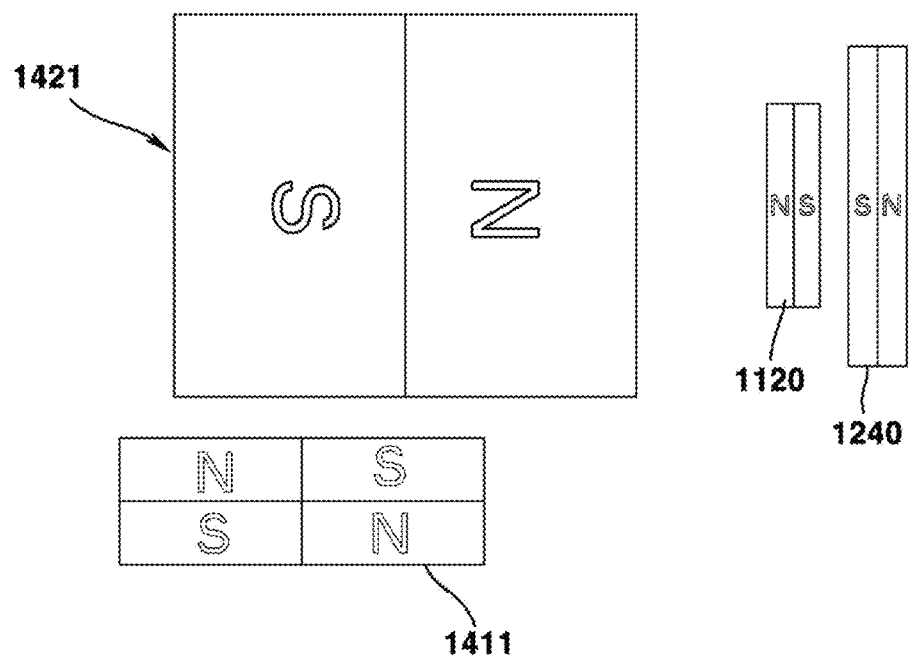
FIG. 25 is a side view illustrating a first magnet, a second magnet, and a driving magnet of a reflective member driving device according to the present embodiment.
Figure 26:
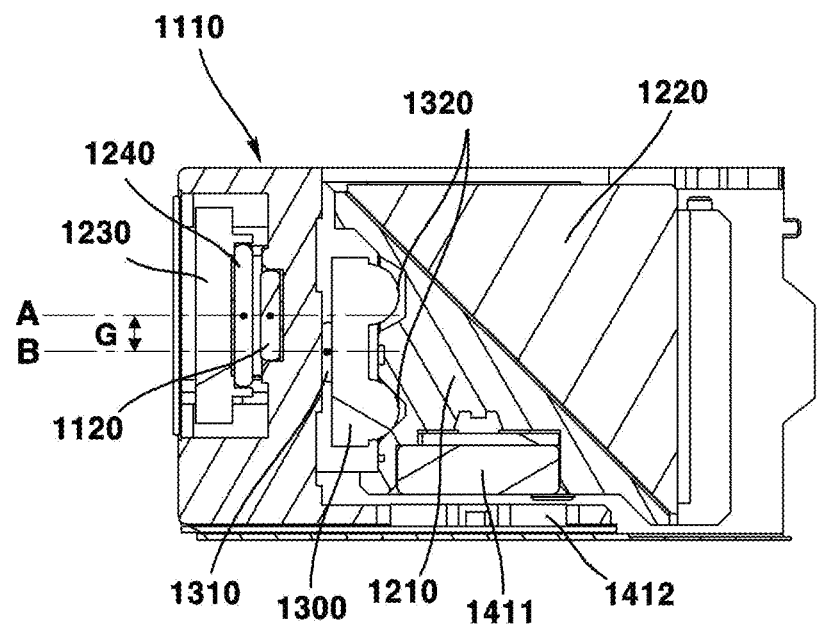
FIG. 26 is a cross-sectional view of a reflective member driving device according to the present embodiment.
Figure 27:
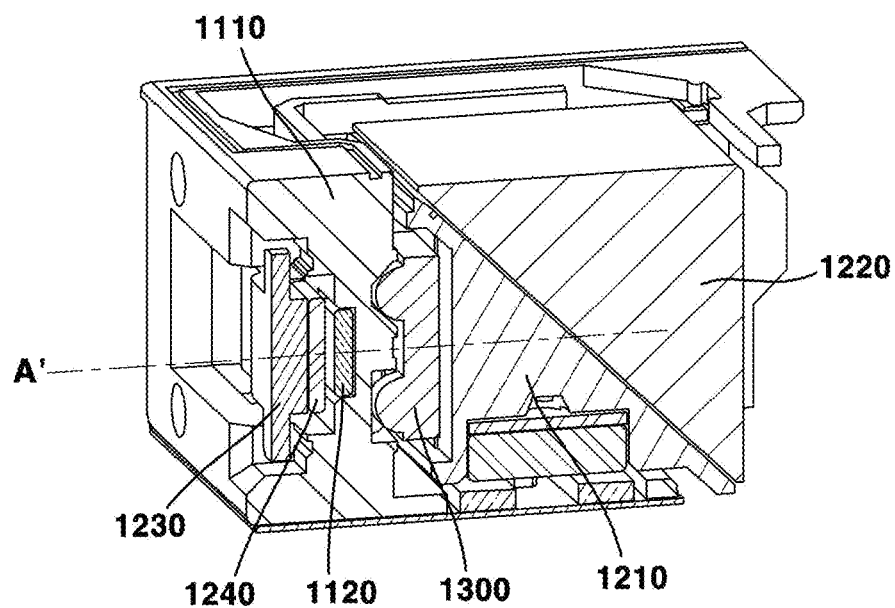
FIG. 27 is a cross-sectional perspective view of a reflective member driving device according to a modified example.
Figure 28A:
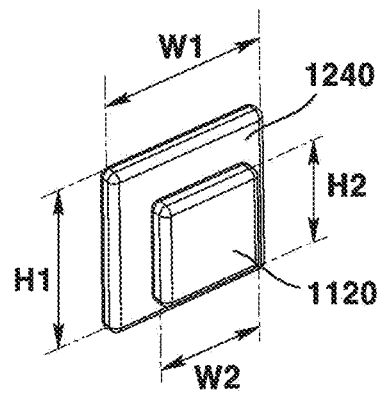
FIGS. 28(*a*) and 28(*b*) are perspective views (FIG. 28(*a*)) and a rear side view (FIG. 28(*b*)) illustrating a first magnet and a second magnet of a reflective member driving device according to the present embodiment.
Figure 28B:
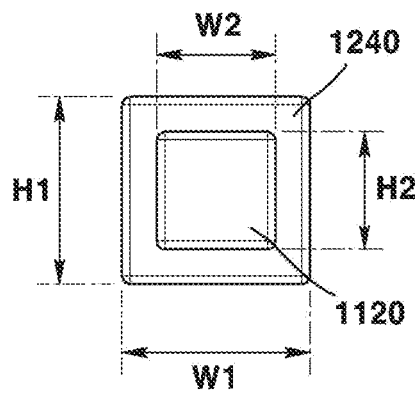
Figure 29:
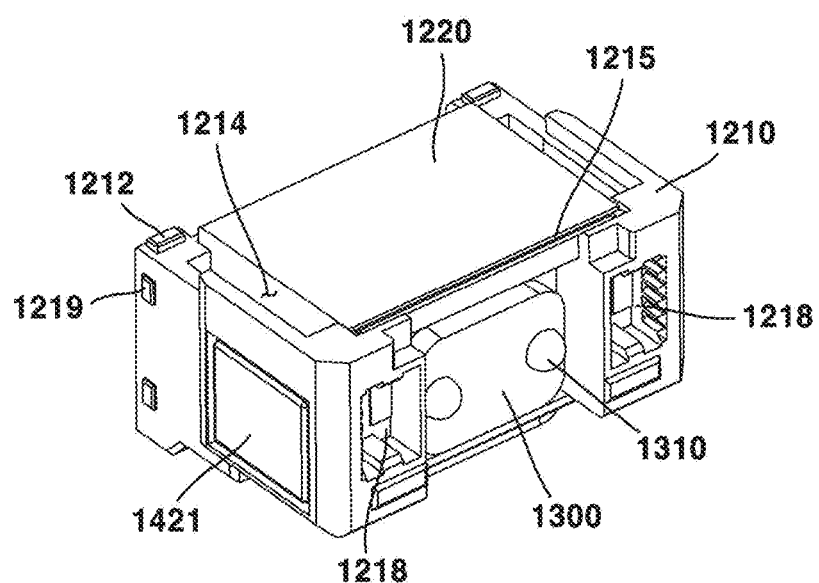
FIG. 29 is a perspective view illustrating a state in which a moving plate is disposed in a moving part of a reflective member driving device according to the present embodiment.

FIG. 9 is a perspective view of a reflective member driving device according to the present embodiment; FIG. 10 is an exploded perspective view of a reflective member driving device according to the present embodiment; FIG. 11 is a bottom exploded perspective view of a reflective member driving device according to the present embodiment; FIGS. 12 and 13 are diagrams for explaining a structure related to a moving plate of a reflective member driving device according to the present embodiment; FIG. 14 is a perspective view of a state in which the configuration of a moving part of a reflective member driving device according to the present embodiment is omitted; FIG. 15 is a perspective view of the reflective member driving device of FIG. 14 in a state in which components such as a substrate are omitted; FIG. 16 is a perspective view illustrating a fixed part and related configuration of a reflective member driving device according to the present embodiment; FIG. 17 is a perspective view illustrating a state in which a moving part is disposed in a fixed part in a reflective member driving device according to the present embodiment; FIG. 18 is an exploded perspective view illustrating the related shapes of a rigid mover and the fixed part of a reflective member driving device according to the present embodiment; FIG. 19 is a perspective view illustrating an arrangement state of a second magnet of a fixed part of a reflective member driving device according to the present embodiment; FIG. 20 is a perspective view illustrating a coupling state between a holder of a reflective member driving device and a rigid mover according to the present embodiment; FIG. 21 is a front view illustrating a holder of a reflective member driving device according to the present embodiment; FIG. 22 is a perspective view illustrating a rigid mover, a first magnet, and a second magnet of a reflective member driving device according to the present embodiment; FIG. 23 is a perspective view illustrating a first magnet, a second magnet, and a driving unit of a reflective member driving device according to the present embodiment; FIG. 24 is a perspective view illustrating a first magnet, a second magnet, and a driving magnet of a reflective member driving device according to the present embodiment; FIG. 25 is a side view illustrating a first magnet, a second magnet, and a driving magnet of a reflective member driving device according to the present embodiment; FIG. 26 is a cross-sectional view of a reflective member driving device according to the present embodiment; FIG. 27 is a cross-sectional perspective view of a reflective member driving device according to a modified example; FIG. 28(a) is a perspective view, and FIG. 28(b) is a rear side view illustrating a first magnet and a second magnet of a reflective member driving device according to the present embodiment; and FIG. 29 is a perspective view illustrating a state in which a moving plate is disposed in a moving part of a reflective member driving device according to the present embodiment.

A reflective member driving device 1000 may perform optical image stabilization (OIS) function. The reflective member driving device 1000 may perform a handshake correction function. The reflective member driving device 1000 may move the reflective member 1220. The reflective member driving device 1000 may tilt the reflective member 1220. The reflective member driving device 1000 may tilt the reflective member 1220 around two axes. The reflective member driving device 1000 may tilt the reflective member 1220 about the x-axis and the y-axis. The x-axis and the y-axis may be perpendicular to each other.

The reflective member driving device 1000 may be a reflective member actuator. The reflective member driving device 1000 may be an OIS actuator. The reflective member driving device 1000 may be an OIS driving device. The reflective member driving device 1000 may be a prism driving device. The reflective member driving device 1000 may be an actuator. The reflective member driving device 1000 may be an actuator device. The reflective member driving device 1000 may be an actuator driving device. The reflective member driving device 1000 may be a tilting device.

The reflective member driving device 1000 may comprise a fixed part 1100. The fixed part 1100 may be a relatively fixed part when the moving part 1200 is moved. The fixed part 1100 may accommodate at least a portion of the moving part 1200. The fixed part 1100 may be disposed outside the moving part 1200.

The reflective member driving device 1000 may comprise a housing 1110. The fixed part 110 may comprise a housing 1110. The housing 1110 may be disposed outside the holder 1210. The housing 1110 may accommodate at least a portion of the holder 1210. The housing 1110 may comprise an opening or a hole in the upper plate and any one of the side plates for securing a path of light. The housing 1110 may comprise an upper plate, a lower plate, and a plurality of side plates.

The housing 1110 may comprise a first portion 1111. The first portion 1111 may be formed on a side plate of the housing 1110. A moving plate 1300 may be disposed on the first portion 1111. The first portion 1111 may be disposed between the holder 1210 and a rigid mover 1230. The first portion 1111 may be disposed between the rigid mover 1230 and the moving plate 1300. A second magnet 1120 may be disposed on the first portion 1111. The moving plate 1300 may be disposed on one side of the first portion 1111 and the second magnet 1120 may be disposed on the other side of the opposite side. A portion of the housing 1110 may be disposed between the moving plate 1300 and the rigid mover 1230.

The housing 1110 may comprise a second portion 1112. The second portion 1112 may be disposed on the holder 1210. The second portion 1112 may be in contact with the holder 1210 when the holder 1210 moves upward. The second portion 1112 may be overlapped with the holder 1210 in the moving direction of the holder 1210. The second portion 1112 may be an upper plate of the housing 1110.

The housing 1110 may comprise a third portion 1113. The third portion 1113 may be disposed below the holder 1210. The third portion 1113 may be in contact with the holder 1210 when the holder 1210 moves downward. The third portion 1113 may be overlapped with the holder 1210 in the moving direction. The third portion 1113 may be a lower plate of the housing 1110.

The housing 1110 may comprise a hole 1114. The hole 1114 may be a rigid mover through hole. The hole 1114 may be formed in the side plate of the housing 1110. The hole 1114 may be formed in the first portion 1111 of the housing 1110. A rigid mover 1230 may be disposed in the hole 1114. The rigid mover 1230 may be disposed to pass through the hole 1114. The hole 1114 may be formed to be larger than the movement space of the rigid mover 1230 so as not to interfere with the rigid mover 1230. The housing 1110 may comprise two holes 1114 into which the rigid mover 1230 is inserted.

The housing 1110 may comprise a groove 1115. The groove 1115 may be an accommodating groove of a first protrusion of the moving plate. A first protrusion 1310 of the moving plate 1300 may be disposed in the groove 1115. The groove 1115 may accommodate at least a portion of the moving plate 1300. The groove 1115 may arrest the movement except for rotation of the first protrusion 1310 of the moving plate 1300. The groove 1115 may comprise an inclined surface being in contact with the first protrusion 1310 of the moving plate 1300. An inclined surface may comprise a plurality of inclined surfaces.

The housing 1110 may comprise a plurality of grooves 1115 in which a plurality of first protrusions 1310 are disposed. The plurality of grooves 1115 of the housing 1110 may comprise: a first groove 1115-1 in contact with a first protrusion 1310 among a plurality of first protrusions 1310 at four point; and a second groove 1115-2 in contact with the first protrusion 1310 of the other one among the plurality of first protrusions 1310 at two points.

The groove 1115 may comprise a first groove 1115-1. The first groove 1115-1 may be a four-point contact groove. The first groove 1115-1 may be in contact with one among the two first protrusions 1310 of the moving plate 1300 at four points. Through this, the first groove 1115-1 of the housing 1110 may arrest the movement in four directions, up, down, left, and right except for rotation of one among the first protrusions 1310 of the moving plate 1300.

The groove 1115 may comprise a second groove 1115-2. The second groove 1115-2 may be a two-point contact groove. The second groove 1115-2 may be in contact with the other one among the two first protrusions 1310 of the moving plate 1300 at two points. Through this, the second groove 1115-2 of the housing 1110 may arrest the movement of the other one among the first protrusions 1310 of the moving plate 1300 in two directions. For example, the second groove 1115-2 of the housing 1110 may arrest the up and down movement of the first protrusion 1310 of the moving plate 1300 and may not arrest the left to right movement.

The housing 1110 may comprise a protruding portion 1116. The protruding portion 1116 may be coupled to the lens driving device 2000. The protruding portion 1116 may be formed on a side plate of the housing 1110. The protruding portion 1116 may be formed on a side of the housing 1110 facing the lens driving device 2000. The protruding portion 1116 may have a trapezoidal cross-section. The protruding portion 1116 may be coupled to the housing 2110 of the lens driving device 2000. The protruding portion 1116 may be inserted into the first groove 2111 of the housing 2110 of the lens driving device 2000. The protruding portion 1116 may be coupled to the housing 2110 of the lens driving device 2000 by an adhesive.

The housing 1110 may comprise a protrusion 1117. The protrusion 1117 may be coupled to the lens driving device 2000. The protrusion 1117 may be formed on the side plate of the housing 1110. The protrusion 1117 may be formed on a side of the housing 1110 facing the lens driving device 2000. The protrusion 1117 may comprise a circular cross-section. The protrusion 1117 may be coupled to the housing 2110 of the lens driving device 2000. The protrusion 1117 may be inserted into the second groove 2112 of the housing 2110 of the lens driving device 2000. The protrusion 1117 may be coupled to the housing 2110 of the lens driving device 2000 by an adhesive.

The housing 1110 may comprise a protrusion 1118. The protrusion 1118 may be a protrusion to be in contact with the rigid mover. A protrusion 1118 may be formed on a second surface of the housing 1110. The protrusion 1118 may be in contact with the rigid mover 1230. The protrusion 1118 may be formed on an inner circumferential surface of the hole 1114 of the housing 1110 through which the rigid mover 1230 passes. The protrusion 1118 may be formed to be in contact with any one or more of the lower surface and the upper surface of the rigid mover 1230 when the rigid mover 1230 is moved. The protrusion 1118 can inhibit the rigid mover 1230 from being separated and removed from the original position excessively.

The protrusion 1118 may comprise a plurality of protrusions. The protrusion 1118 may comprise two protrusions. The two protrusions may be spaced apart by the same distance as the second groove disposed below among the grooves 1119 of the housing 1110. When the body portion of the rigid mover 1230 moves downward, the body portion of the rigid mover 1230 may be in contact with the two protrusions 1118 of the housing 1110.

The housing 1110 may comprise a groove 1119. At least a portion of the protruding portion 1231 may be disposed in the groove 1119. A portion of the protruding portion 1231 may be disposed in the groove 1119. The groove 1119 may be open toward the outside of the housing 1110. The groove 1119 may be larger than the protruding portion 1231 of the rigid mover 1230. The groove 1119 may be spaced apart from the protruding portion 1231 of the rigid mover 1230. In an initial state in which power is not applied to the driving unit 1400, the groove 1119 may be spaced apart from the protruding portion 1231 of the rigid mover 1230. Even when power is applied to the driving unit 1400 to be driven, the groove 1119 may be spaced apart from the protruding portion 1231 of the rigid mover 1230. The groove 1119 of the housing 1110 and the protruding portion 1231 of the rigid mover 1230 may be in contact with each other by an external impact. That is, the groove 1119 of the housing 1110 and the protruding portion 1231 of the rigid mover 1230 do not come into contact within the normal driving range of the rigid mover 1230, and they can be in contact with each other when they are outside the normal driving range due to an impact. The groove 1119 of the housing 1110 and the protruding portion 1231 of the rigid mover 1230 may perform a stopper function upon impact.

The groove 1119 may comprise a first groove portion and a second groove portion recessed from the first groove portion. The groove 1119 may be formed as a two-step groove. The groove 1119 may have a double groove shape. A damper 1500 may be disposed in the second groove portion. A contact area between the damper 1500 and the housing 1110 may be increased by the second groove portion. The second groove portion may inhibit the damper 1500 from flowing.

The groove 1119 may comprise a plurality of grooves. The groove 1119 may comprise a first groove in which at least a portion of the first protruded region of the rigid mover 1230 is disposed, and a second groove in which at least a portion of the second protruded region is disposed. The housing 1110 may comprise a first surface opposite to the upper surface of the body portion of the rigid mover 1230. The housing 1110 may comprise a second surface facing the lower surface of the body portion of the rigid mover 1230. The housing 1110 may comprise a first groove formed on the first surface of the housing 1110 and a second groove formed on the second surface of the housing 1110.

The reflective member driving device 1000 may comprise a second magnet 1120. The fixed part 1100 may comprise a second magnet 1120. The second magnet 1120 may be disposed in the fixed part 1100. The second magnet 1120 may be a second repulsive force magnet. The second magnet 1120 may be disposed in the housing 1110. The second magnet 1120 may be disposed on the first portion 1111 of the housing 1110. The second magnet 1120 may be disposed on the opposite side of the moving plate 1300 with respect to the first portion 1111 of the housing 1110. The second magnet 1120 may be disposed between the first magnet 1240 and the moving plate 1300. The second magnet 1120 may be disposed to face the first magnet 1240. The second magnet 1120 may generate a repulsive force with the first magnet 1240. The second magnet 1120 may be disposed to generate a repulsive force with the first magnet 1240. The second magnet 1120 may be disposed to face the same polarity as the first magnet 1240. The second magnet 1120 may push the first magnet 1240 out.

At least a portion of the second magnet 1120 may be disposed between the first magnet 1240 and the moving plate 1300. The second magnet 1120 may be disposed between the first magnet 1240 and the moving plate 1300. The center of the second magnet 1120 may be disposed at the same height as the center of the first magnet 1240.

In the present embodiment, the driving unit 1400 may tilt the moving part 1200 With respect to the x-axis and the y-axis of the moving plate 1300 perpendicular to each other. At this time, in the y-axis direction, a horizontal axis passing through the center of the second magnet 1120 may be disposed to be eccentric with the x-axis of the moving plate 1300. The horizontal axis may be parallel to the x-axis.

In a direction passing through the x-axis, the center of the second magnet 1120 may not be eccentric with the y-axis. When viewed from the moving plate 1300 toward the first magnet 1240, the center of the second magnet 1120 may be disposed to coincide with the y-axis. The center of the second magnet 1120 may be disposed at the same height as the center of the first magnet 1240. The center of the second magnet 1120 may be disposed at the same height as the center of the first magnet 1240. The center of gravity of the second magnet 1120 may be disposed at the same height as the center of gravity of the first magnet 1240.

The second magnet 1120 may comprise a second surface disposed opposite to the first surface of the second magnet 1120. The first magnet 1240 may comprise a first surface facing the second surface of the second magnet 1120. The first surface of the first magnet 1240 may have the same polarity as the second surface of the second magnet 1120.

In a direction in which the first surface of the first driving magnet 1411 faces, the second magnet 1120 may be disposed so as not to be overlapped the first driving magnet 1411. In a direction in which the first surface of the second magnet 1120 faces, the second magnet 1120 may be disposed so as not to be overlapped with the first driving magnet 1411.

The reflective member driving device 1000 may comprise a substrate 1130. The fixed part 1100 may comprise a substrate 1130. The substrate 1130 may be a flexible printed circuit board (FPCB). The substrate 1130 may be a flexible printed circuit board. The substrate 1130 may be disposed in the housing 1110.

The reflective member driving device 1000 may comprise a suspension (SUS) 1140. The fixed part 1100 may comprise a SUS 1140. The suspension 1140 may be disposed on the substrate 1130. The suspension 1140 may be disposed on the outer surface of the substrate 1130. The suspension 1140 may reinforce the strength of the substrate 1130.

The reflective member driving device 1000 may comprise a gyro sensor 1150. The fixed part 1100 may comprise a gyro sensor 1150. The gyro sensor 1150 may detect shaking of the camera device 10. The shake detected by the gyro sensor 1150 may be offset through the hand shake correction function. The gyro sensor 1150 may be disposed on the substrate 1130. The gyro sensor 1150 may be disposed on an outer surface of the substrate 1130.

The reflective member driving device 1000 may comprise a plate 1160. The fixed part 1100 may comprise a plate 1160. The plate 1160 may be coupled to the housing 1110. The plate 1600 may cover up the rigid mover 1230. The plate 1600 may cover the rigid mover 1230. The plate 1160 may be disposed to cover the open portion of the housing 1110. The plate 1160 may be disposed to close the open front of the housing 1110. The plate 1160 may be formed of a metal plate. The housing 1110 may comprise a groove in which an adhesive for fixing the plate 1160 to the housing 1110 is disposed.

The reflective member driving device 1000 may comprise a driver IC 1170. The fixed part 1100 may comprise a driver IC 1170. The driver IC 1170 may be disposed on the substrate 1130. The driver IC 1170 may be electrically connected to the first coil 1412 and the second coil 1422. The driver IC 1170 may supply current to the first coil 1412 and the second coil 1422. The driver IC 1170 may control at least one of a voltage and a current applied to each of the first coil 1412 and the second coil 1422. The driver IC 1170 may be electrically connected to the Hall sensors 1413 and 1423. The driver IC 1170 may feedback-control the voltage and current applied to the first coil 1412 and the second coil 1422 through the position of the reflective member 1220 detected by the Hall sensors 1413 and 1423.

The reflective member driving device 1000 may comprise a moving part 1200. The moving part 1200 may be a moving part. The moving part 1200 may be a movable part. The moving part 1200 may be a mover. The moving part 1200 may move with respect to the fixed part 1100. The moving part 1200 may be tilted with respect to the fixed part 1100. The moving part 1200 may be disposed inside the fixed part 1100. At least a portion of the moving part 1200 may be spaced apart from the fixed part 1100.

In the present embodiment, in an initial state in which no current is applied to the driving unit 1400, the moving part 1200 may be in contact with the fixed part 1100.

The reflective member driving device 1000 may comprise a holder 1210. The moving part 1200 may comprise a holder 1210. The holder 1210 may be disposed in the housing 1110. The holder 1210 is movable with respect to the housing 1110. The holder 1210 may be tilted with respect to the housing 1110. At least a portion of the holder 1210 may be spaced apart from the housing 1110. The holder 1210 may be in contact with the housing 1110.

In the present embodiment, the holder 1210 may move between the second portion 1112 and the third portion 1113 of the housing 1110 by a first driving unit 1410. In an initial state in which no current is applied to the first driving unit 1410, the holder 1210 may be in contact with the housing 1110. In the initial state, the holder 1210 may be in contact with the inner surface of the housing 1110 adjacent to the incident surface of the reflective member 1220. As current is applied to the driving unit 1400, the holder 1210 may be spaced apart from the inner surface of the housing 1110 and may be tilted with respect to the first axis of the moving plate 1300.

The holder 1210 may comprise a groove 1211. The groove 1211 may be an accommodating groove of a second protrusion of the moving plate. A second protrusion 1320 of the moving plate 1300 may be disposed in the groove 1211. The groove 1211 may accommodate at least a portion of the moving plate 1300. The groove 1211 may arrest the movement except for rotation of the second protrusion 1320 of the moving plate 1300. The groove 1211 may comprise an inclined surface being in contact with the second protrusion 1320 of the moving plate 1300. An inclined surface may comprise a plurality of inclined surfaces.

The holder 1210 may comprise a plurality of grooves 1211 in which a plurality of second protrusions 1320 are being disposed. The plurality of grooves 1211 of the holder 1210 comprises a first groove 1211-1 in four-point contact with one of the second protrusions 1320 among the plurality of second protrusions 1320, and a plurality of second protrusions 1320. It may comprise a second groove 1211-2 in two-point contact with the other second protrusion 1320.

The groove 1211 may comprise a first groove 1211-1. The first groove 1211-1 may be a four-point contact groove. The first groove 1211-1 may be in contact with one among the two second protrusions 1320 of the moving plate 1300 at four points. Through this, the first groove 1211-1 of the holder 1210 may arrest the movement in four directions, up, down, left, and right except for rotation of one among the second protrusions 1320 of the moving plate 1300.

The groove 1211 may comprise a second groove 1211-2. The second groove 1211-2 may be a two-point contact groove. The second groove 1211-2 may be in contact with the other one among the two second protrusions 1320 of the moving plate 1300 at two points. Through this, the second groove 1211-2 of the holder 1210 may arrest the movement of the other one among the second protrusions 1320 of the moving plate 1300 in two directions. For example, the second groove 1211-2 of the holder 1210 may arrest the movement in the left and right directions of the second protrusion 1320 of the moving plate 1300 and may not arrest the movement in the up and down direction.

The holder 1210 may comprise a first protrusion 1212. The first protrusion 1212 may be an upper stopper. The first protrusion 1212 may be formed on an upper surface of the holder 1210. The first protrusion 1212 may be protruded from an upper surface of the holder 1210. The first protrusion 1212 may be in contact with the housing 1110 when the holder 1210 moves upward. The first protrusion 1212 may be in contact with the second portion 1112 of the housing 1110 when the holder 1210 moves upward.

The holder 1210 may comprise a second protrusion 1213. The second protrusion 1213 may be a lower stopper. The second protrusion 1213 may be formed on a lower surface of the holder 1210. The second protrusion 1213 may be protruded from a lower surface of the holder 1210. The second protrusion 1213 may be in contact with the housing 1110 when the holder 1210 moves downward. The second protrusion 1213 may be in contact with the third portion 1113 of the housing 1110 when the holder 1210 moves downward.

In the present embodiment, in the initial state, the first protrusion 1212 of the holder 1210 may be in contact with the second portion 1112 of the housing 1110. The second protrusion 1213 of the holder 1210 may come into contact with the third portion 1113 of the housing 1110 by applying a current to the first driving unit 1410 or by impact.

The holder 1210 may comprise an adhesive accommodating groove 1214. The adhesive accommodating groove 1214 may receive an adhesive for fixing the reflective member 1220 to the holder 1210. The adhesive accommodating groove 1214 may be formed on a surface in contact with the reflective member 1220. An adhesive may be disposed in the adhesive accommodating groove 1214.

The holder 1210 may comprise a groove 1215. The groove 1215 may be a separation groove providing a separation space between the groove 1215 and the reflective member 1220. The groove 1215 may be formed on a surface in contact with the reflective member 1220. A contact area between the reflective member 1220 and the holder 1210 may be reduced by the groove 1215.

The holder 1210 may comprise a groove 1216. The groove 1216 may be a slimming groove. The groove 1216 may be formed in a central portion of the holder 1210. The weight of the holder 1210 may be reduced by the groove 1216.

The holder 1210 may comprise a magnet accommodating groove 1217. Driving magnets 1411 and 1421 may be disposed in the magnet accommodating groove 1217. The magnet accommodating groove 1217 may be formed in a shape corresponding to the driving magnets 1411 and 1421. The magnet accommodating groove 1217 may be concavely formed on a lower surface of the holder 1210. The magnet accommodating groove 1217 may be formed on a lower surface and both side surfaces of the holder 1210. The magnet accommodating groove 1217 may comprise a plurality of magnet accommodating grooves. The magnet accommodating groove 1217 may comprise a first magnet accommodating groove accommodating the first driving magnet 1411 and the yoke 1414. The magnet accommodating groove 1217 may comprise a second magnet accommodating groove accommodating the second driving magnet 1421 and the yoke 1424.

The holder 1210 may comprise a groove 1218. The groove 1218 may be a rigid mover accommodating groove. A coupling portion 1232 of the rigid mover 1230 may be disposed in the groove 1218. The groove 1218 may be formed in a shape corresponding to the coupling portion 1232 of the rigid mover 1230. The groove 1218 may comprise a groove in which an adhesive for fixing the coupling portion 1232 of the rigid mover 1230 to the holder 1210 is accommodated. The holder 1210 may comprise a plurality of protrusions formed inside the groove 1218. At least a portion of the coupling portion 1232 of the rigid mover 1230 may be inserted into the groove 1218. The reflective member driving device 1000 may comprise an adhesive for fixing the rigid mover 1230 to the holder 1210. At least a portion of the adhesive may be disposed between the pluralities of protrusions formed inside the grooves 1218 of the holder 1210. Through this, the coupling force between the rigid mover 1230 and the holder 1210 may be enhanced.

The holder 1210 may comprise a side stopper 1219. The side stopper 1219 may be formed on both sides of the holder

1210. The side stopper 1219 may be protruded from the side surface of the holder 1210. The side stopper 1219 may be in contact with the housing 1110 when the holder 1210 moves laterally. The side stopper 1219 may be in contact with the side plate of the housing 1110 when the holder 1210 moves laterally.

The reflective member driving device 1000 may comprise a reflective member 1220. The moving part 1200 may comprise a reflective member 1220. The reflective member 1220 may be disposed on the holder 1210. The reflective member 1220 may be disposed inside the holder 1210. The reflective member 1220 may be coupled to the holder 1210. The reflective member 1220 may be fixed to the holder 1210. The reflective member 1220 may be fixed to the holder 1210 by an adhesive. The reflective member 1220 may move integrally with the holder 1210. The reflective member 1220 may change the path of light. The reflective member 1220 may reflect light. The reflective member 1220 may comprise a prism. The reflective member 1220 may comprise a mirror. The reflective member 1220 may be formed in a triangular prism shape. An angle between a path of light incident to the reflective member 1220 and a path of exiting light may be 90 degrees.

The reflective member driving device 1000 may comprise a rigid mover 1230. The moving part 1200 may comprise a rigid mover 1230. The rigid mover 1230 may be coupled to the holder 1210. The rigid mover 1230 may be formed as a member separate from the holder 1210. The rigid mover 1230 may be coupled to the holder 1210 through the hole 1114 of the housing 1110. The rigid mover 1230 may be formed of a non-magnetic metal. A first magnet 1240 and a second magnet 1120 may be disposed between the rigid mover 1230 and the holder 1210. The first magnet 1240 and the second magnet 1120 may be disposed to face the same polarity and may repel each other. The first magnet 1240 fixed to the housing 1110 may push the second magnet 1120 outward. The rigid mover 1230 to which the second magnet 1120 is fixed by the repulsive force of the first magnet 1240 may also be pressed toward the outer side. The holder 1210 to which the rigid mover 1230 is fixed may also be pressed toward the outer side. Through this, the holder 1210 may press the moving plate 1300 against the housing 1110. Through this, the moving plate 1300 may be disposed between the holder 1210 and the housing 1110 without being separated and removed.

The rigid mover 1230 may comprise a protruding portion 1231. The protruding portion 1231 may be extended from the body portion of the rigid mover 1230. The protruding portion 1231 may be coupled to the housing 1110 by the damper 1500. The protruding portion 1231 may be disposed in a central region of the rigid mover 1230. The protruding portion 1231 may be formed in a central region of the rigid mover 1230. The protruding portion 1231 may be protruded from an upper surface of the body portion of the rigid mover 1230. The protruding portion 1231 may in contact with the housing 1110 when the rigid mover 1230 moves.

The protruding portion 1231 may comprise a plurality of protruding portions. The protruding portion 1231 of the rigid mover 1230 may comprise a first protruding portion formed on an upper surface of the body portion of the rigid mover 1230. It may comprise a second protruding portion formed on a lower surface of the body portion of the rigid mover 1230. At least a portion of the first protruding portion of the rigid mover 1230 may be disposed in the first groove of the housing 1110. At least a portion of the second protruding portion of the rigid mover 1230 may be disposed in the second groove of the housing 1110. The protruding portion 1231 may comprise a first protruded region being protruded to one side and a second protruded region being protruded to the other side. Each of the first and second protruded regions may be referred to as a protruding portion.

The rigid mover 1230 may comprise a body portion. The body portion may be disposed at an opposite side of the moving plate 1300 with respect to the first portion 1111 of the housing 1110. The rigid mover 1230 may comprise two coupling portions 1232 protruding from both sides of the body portion. The rigid mover 1230 may comprise two protruding portions 1231 being protruded up and down directions from the body portion.

The rigid mover 1230 may comprise a coupling portion 1232. The coupling portion 1232 may be a leg portion. The coupling portion 1232 may be extended from the body portion of the rigid mover 1230. The coupling portion 1232 may pass through the hole 1114 of the housing 1110. The coupling portion 1232 may be coupled to the holder 1210. The coupling portion 1232 may be fixed to the holder 1210 by an adhesive. At least a portion of the coupling portion 1232 may be inserted into the groove 1218 of the holder 1210.

The reflective member driving device 1000 may comprise a first magnet 1240. The moving part 1200 may comprise a first magnet 1240. The first magnet 1240 may be disposed in the moving part 1200. The first magnet 1240 may be a first repulsive force magnet. The first magnet 1240 may be disposed on the rigid mover 1230. The first magnet 1240 may be disposed in the body portion of the rigid mover 1230. The first magnet 1240 may be disposed to face the second magnet 1120. The first magnet 1240 may be disposed to generate a repulsive force with the second magnet 1120. The first magnet 1240 may be disposed to face the same polarity as the second magnet 1120. The first magnet 1240 may push the second magnet 1120.

In the present embodiment, with respect to the first optical axis, the central axis of the first magnet 1240 may be disposed to be eccentric with the central axis of the moving plate 1300. At this time, the first optical axis may be a z-axis. The first optical axis may be an axis perpendicular to the sensor surface of the image sensor 3400. The first optical axis may be an optical axis of lens groups disposed adjacent to the image sensor 3400.

As illustrated in FIG. 26, the horizontal central axis A of the first magnet 1240 and the second magnet 1120 may be eccentrically placed to have a gap G in the longitudinal direction with the horizontal central axis B of the moving plate 1300.

When viewed from the moving plate 1300 toward the first magnet 1240, the center of the first magnet 1240 may be disposed to be eccentric with the center of the moving plate 1300.

With respect to the facing surface, the horizontal axis passing through the central axis of the first magnet 1240 may be eccentric in the direction of the horizontal axis passing through the central axis of the moving plate 1300 and a second optical axis perpendicular to the first optical axis. At this time, the horizontal axis may be an x-axis. The horizontal axis may be disposed in a horizontal direction. The second optical axis may be a y-axis. The second optical axis may be an axis parallel to the sensor surface of the image sensor 3400. The second optical axis may be disposed in a vertical direction. With respect to the facing surface, the horizontal axis that meets or comes into contact with the central axis of the first magnet 1240 may be eccentric in the direction of the horizontal axis passing through the central axis of the moving plate 1300 and the second optical axis perpendicular to the first optical axis. The center of the first magnet 1240 may be disposed to be eccentric in the longitudinal direction with respect to the center of the moving plate 1300.

With respect to the facing surface, the vertical axis passing through the central axis of the first magnet 1240 may not be eccentric in the direction of the vertical axis and the horizontal axis passing through the central axis of the moving plate 1300. At this time, the horizontal axis may be an x-axis. The horizontal axis may be disposed in a horizontal direction. The second optical axis may be a y-axis. The second optical axis may be an axis parallel to the sensor surface of the image sensor 3400. The second optical axis may be disposed in a vertical direction. The center of the first magnet 1240 may be disposed so as not to be eccentric in the horizontal direction with respect to the center of the moving plate 1300.

With respect to the facing surface, a horizontal line passing through the center of the first magnet 1240 may be eccentric in the vertical direction from a horizontal line passing through the center of the moving plate 1300. With respect to the facing surface, the vertical line passing through the center of the first magnet 1240 may not be eccentric in the horizontal direction from the vertical line passing through the center of the moving plate 1300.

A horizontal axis of the first magnet 1240 may be disposed higher than a horizontal axis of the moving plate 1300. As a modified embodiment, the horizontal axis of the first magnet 1240 may be disposed lower than the horizontal axis of the moving plate 1300.

The first magnet 1240 and the second magnet 1120 may be disposed between the rigid mover 1230 and the moving plate 1300.

The size of the first magnet 1240 may be different from the size of the second magnet 1120. The first magnet 1240 may be formed in a size different from that of the second magnet 1120. The size of the first magnet 1240 may be larger than the size of the second magnet 1120. The first magnet 1240 may be formed to be larger than the second magnet 1120.

The area of the first surface of the first magnet 1240 may be larger than the area of the second surface of the second magnet 1120 facing the first surface. The first surface and the second surface are arbitrarily referred to as one of the two surfaces, and the other may be referred to as the second surface, and both may be referred to as the first surface. The first magnet 1240 may comprise a first surface. The second magnet 1120 may comprise a first surface facing the first surface of the first magnet 1240. The area of the first surface of the first magnet 1240 may be larger than the area of the first surface of the second magnet 1120.

The first surface of the first magnet 1240 may comprise a first side. The first surface of the second magnet 1120 may comprise a first side disposed in a direction corresponding to the first side of the first magnet 1240. The first side of the second magnet 1120 may be 55% to 75% of the first side of the first magnet 1240. The first side of the second magnet 1120 may be 60% to 66% of the first side of the first magnet 1240. The first side of the second magnet 1120 may be 62% to 64% of the first side of the first magnet 1240. The height H1 of the first magnet 1240 may be greater than the height 112 of the second magnet 1120. The width W1 of the first magnet 1240 may be greater than the width W2 of the second magnet 1120.

The area of the first surface of the second magnet 1120 may be 30% to 50% of the area of the first surface of the first magnet 1240. The area of the first surface of the second magnet 1120 may be 35% to 45% of the area of the first surface of the first magnet 1240. The area of the first surface of the second magnet 1120 may be 38% to 42% of the area of the first surface of the first magnet 1240.

The first magnet 1240 and the second magnet 1120 may be formed to have the same thickness. The volume of the second magnet 1120 may be 30% to 50% of the volume of the first magnet 1240.

When viewed from the second magnet 1120 toward the first magnet 1240, an edge region of the second magnet 1120 may be disposed inside the first surface of the first magnet 1240. The edge region may be a corner region. The edge region may be a corner. The first magnet 1240 may be disposed such that all regions of the second magnet 1120 are being overlapped with the first magnet 1240 in a first direction in which the first magnet 1240 faces the second magnet 1120. The first magnet 1240 may be disposed such that all regions of the second magnet 1120 are being overlapped with the first magnet 1240 in a first direction in which the first magnet 1240 faces the second magnet 1120.

As a modified embodiment, the size of the first magnet 1240 may be smaller than the size of the second magnet 1120. The second magnet 1120 may be formed to be larger than the first magnet 1240.

The central axes of the first magnet 1240 and the second magnet 1120 may coincide. However, in actual products, a tolerance of ±1% to ±2% may occur.

In the present embodiment, the second magnet 1120 may comprise a second surface facing the first surface of the first magnet 1240. At this time, the central axis of the first magnet 1240 may be disposed to be eccentric with the central axis of the moving plate 1300 in a direction perpendicular to the first surface. The area of the first surface of the first magnet 1240 may be larger than the area of the second surface of the second magnet 1120.

In the present embodiment, in an initial state in which no current is applied to the driving unit 1400, the moving part 1200 may be in contact with the fixed part 1100. When viewed from the second magnet 1120 toward the first magnet 1240, an edge of the first magnet 1240 may surround the second magnet 1120. When viewed from the second magnet 1120 toward the first magnet 1240, the second magnet 1120 may be disposed at an inner side of the corner of the first magnet 1240.

The first magnet 1240 may comprise a first surface facing the second magnet 1120 and a second surface opposite to the first surface. The first surface of the first magnet 1240 may comprise a first side and a second side shorter than the first side. The first side of the first magnet 1240 may be formed to be 1 mm to 5 mm. The second side of the first magnet 1240 may be formed to be 0.8 mm to 4 mm. A thickness between the first and second surfaces of the first magnet 1240 may be formed to be 0.1 mm to 0.5 mm.

In the present embodiment, the force Fx formed by the first driving unit 1410 may be within 7 mN. In addition, the force Fy formed by the second driving unit 1420 may be within 7 mN. Or, the force Fx formed by the first driving unit 1410 may be within 3 mN. In addition, the force Fy formed by the second driving unit 1420 may be within 3 mN.

The first surface of the first magnet 1240 may be formed in a square shape. The first surface of the second magnet 1120 may be formed in a square shape. Or, each of the first surface of the first magnet 1240 and the first surface of the second magnet 1120 may be formed in a rectangular shape. The first magnet 1240 may have a square cross-section at least in part. The second magnet 1120 may have a square cross-section at least in part. The first magnet 1240 may be formed to have a rounded edge. The second magnet 1120 may be formed to have a rounded edge.

As a modified embodiment, the first magnet 1240 may have a circular cross section. The first magnet 1240 may be formed in a cylindrical shape. The second magnet 1120 may have a circular cross-section. The second magnet 1120 may be formed in a cylindrical shape. The first magnet 1240 may be formed to have a rounded edge. The first magnet 1240 may be formed to have a curved edge. The first magnet 1240 may be formed so that an edge has a curvature. The first magnet 1240 may be formed to have a C-cut or R-cut edge. The second magnet 1120 may be formed to have a rounded edge. The second magnet 1120 may be formed to have a curved edge. The second magnet 1120 may be formed so that an edge has a curvature. The second magnet 1120 may be formed to have a C-cut or R-cut edge.

The reflective member driving device 1000 may comprise a moving plate 1300. The moving plate 1300 may be an intermediate plate. The moving plate 1300 may be disposed between the housing 1110 and the holder 1210. The moving plate 1300 may be disposed between the rigid mover 1230 and the holder 1210. The moving plate 1300 may be disposed between the first magnet 1240 and the holder 1210. The moving plate 1300 may be placed between the fixed part 1100 and the moving part 1200. The moving plate 1300 may be disposed between the first surface of the second magnet 1120 and the holder 1210. The moving plate 1300 may guide the movement of the holder 1210 against the housing 1110. The moving plate 1300 may provide a tilt center of the holder 1210. That is, the holder 1210 may be tilted around the moving plate 1300. The moving plate 1300 may have one side disposed on the holder 1210 and the other side disposed in the housing 1110. The moving plate 1300 may be in contact with the holder 1210 and the housing 1110.

The moving plate 1300 may comprise a first surface facing the housing 1110 and a second surface facing the holder 1210. The first surface of the moving plate 1300 may comprise a plurality of first protrusions 1310 spaced apart from each other in the direction of the first axis. The second surface of the moving plate 1300 may comprise a plurality of second protrusions 1320 spaced apart from each other in the direction of the second axis.

The moving plate 1300 may comprise a plurality of first convex portions formed on one surface and a plurality of second convex portions formed on the other surface. The first convex portion may be a first protrusion 1310. The second convex portion may be a second protrusion 1320. The x-axis may correspond to a straight line connecting two convex portions among the plurality of first convex portions. The x-axis may coincide with or parallel to a straight line connecting two convex portions among the plurality of first convex portions. The y-axis may correspond to a straight line connecting two convex portions among the plurality of second convex portions. The y-axis may coincide with or parallel to a straight line connecting the two convex portions among the plurality of second convex portions. In a modified embodiment, the first protrusion may be the second protrusion 1320 and the second protrusion may be the first protrusion 1310.

The moving plate 1300 may comprise a first protrusion 1310. The first protrusion 1310 may be disposed in the housing 1110. The first protrusion 1310 may be in contact with the housing 1110. The first protrusion 1310 may be disposed in the groove 1115 of the housing 1110. The first protrusion 1310 may provide a first axis tilt center with respect to the holder 1210. The first protrusion 1310 may provide an x-axis tilt center for the holder 1210. The first protrusion 1310 may comprise two first protrusions. The two first protrusions may be spaced apart from each other in the x-axis direction. The two first protrusions may be disposed on the x-axis. The holder 1210 may be tilted around the first protrusion 1310 of the moving plate 1300 by the first driving unit 1410. The holder 1210 may be tilted up and down directions about the first protrusion 1310 of the moving plate 1300 by the first driving unit 1410.

A first axis of the moving plate 1300 may be defined by a first protrusion 1310 of the moving plate 1300 and a groove 1115 of the housing 1110. In the present embodiment, by disposing the first protrusion 1310 of the moving plate 1300 in the housing 1110 side rather than the holder 1210 side, the rotation center of the tilt about the first axis can be further away. Through this, the accuracy of the Hall value for detecting the amount of the tilt movement of the first axis may be increased. A mechanical stroke for the x-axis tilt driving can be secured.

The moving plate 1300 may comprise a second protrusion 1320. The second protrusion 1320 may be disposed in the holder 1210. The second protrusion 1320 may be in contact with the holder 1210. The second protrusion 1320 may be disposed in the groove 1211 of the holder 1210. The second protrusion 1320 may provide a second axis tilt center perpendicular to the first axis for the holder 1210. The second protrusion 1320 may provide a y-axis tilt center for the holder 1210. The second protrusion 1320 may comprise two second protrusions. The two second protrusions may be spaced apart from each other in the y-axis direction. The two second protrusions may be disposed on the y-axis. The holder 1210 may be tilted around the second protrusion 1320 of the moving plate 1300 by the second driving unit 1420. The holder 1210 may be tilted in the left and right directions with respect to the second protrusion 1320 of the moving plate 1300 by the second driving unit 1420.

As a modified embodiment, the first protrusion 1310 of the moving plate 1300 provides the y-axis tilt center to the holder 1210, and the second protrusion 1320 of the moving plate 1300 may provide the x-axis tilt center.

The reflective member driving device 1000 may comprise grease. Grease may be disposed between the moving plate 1300 and the housing 1110. The grease may be formed of a material different from that of the damper 1500. The grease may be spaced apart from the damper 1500. Grease may be distinguished from the damper 1500. Grease may be applied in a shape different from that of the damper 1500. Grease may be applied at a different location than the damper 1500.

The reflective member driving device 1000 may comprise a driving unit 1400. The driving unit 1400 may move the moving part 1200 against the fixed part 1100. The driving unit 1400 may tilt the moving part 1200 against the fixed part 1100. The driving unit 1400 may tilt the holder 1210. The driving unit 1400 may tilt the moving part 1200 with respect to the x-axis and the y-axis perpendicular to each other and of the moving plate 1300. The driving unit 1400 may comprise a coil and a magnet. The driving unit 1400 may move the moving part 1200 through electromagnetic interaction. In a modified embodiment, the driving unit 1400 may comprise a shape memory alloy (SMA).

The driving unit 1400 may comprise a first driving unit 1410 and a second driving unit 1420. The first driving unit 1410 may comprise a first driving magnet 1411 and a first coil 1412. It may comprise a second driving unit 1420, a second driving magnet 1421, and a second coil 1422. The first driving magnet 1411 and the first coil 1412 may tilt the holder 1210 about the first axis. The second driving magnet 1421 and the second coil 1422 may tilt the holder 1210 about a second axis perpendicular to the first axis. One of the first driving magnet 1411 and the second driving magnet 1421 may be referred to as a third magnet, and the other may be referred to as a fourth magnet.

The driving unit 1400 may comprise a first driving unit 1410. The first driving unit 1410 may tilt the moving part 1200 against the fixed part 1100 about a first axis. The first driving unit 1410 may tilt the holder 1210 with respect to a first axis of the moving plate 1300. The first driving unit 1410 may tilt the moving part 1200 about the x-axis against the fixed part 1100. The first driving unit 1410 may comprise a coil and a magnet. The first driving unit 1410 may move the moving part 1200 through electromagnetic interaction. As a modified embodiment, the first driving unit 1410 may comprise a shape memory alloy (SMA).

The first driving unit 1410 may comprise a first driving magnet 1411. The first driving magnet 1411 may be disposed in the holder 1210. The first driving magnet 1411 may be disposed on a lower surface of the holder 1210. The first driving magnet 1411 may be fixed to the holder 1210. The first driving magnet 1411 may be fixed to the holder 1210 by an adhesive. The first driving magnet 1411 may be disposed between the holder 1210 and the lower surface of the housing 1110. The first driving magnet 1411 may be disposed between the holder 1210 and the lower plate of the housing 1110. The first driving magnet 1411 may move integrally with the holder 1210. The first driving magnet 1411 may tilt the holder 1210. The first driving magnet 1411 may tilt the holder 1210 against the first axis. The first driving magnet 1411 may be disposed to face the first coil 1412. The first driving magnet 1411 may face the first coil 1412. The first driving magnet 1411 may be disposed at a position corresponding to the first coil 1412. The first driving magnet 1411 may interact with the first coil 1412. The first driving magnet 1411 may electromagnetically interact with the first coil 1412. At least a portion of the first driving magnet 1411 may be disposed in the groove 1217 of the holder 1210.

The first driving magnet 1411 may comprise a first surface in a direction toward the reflective member 1220. The second magnet 1120 may comprise a first surface in a direction toward the reflective member 1220. The first surface of the first driving magnet 1411 may comprise a first region closest to the second magnet 1120. The first region of the first driving magnet 1411 may have a polarity different from that of the first surface of the second magnet 1120. The first surface of the first driving magnet 1411 may comprise a second region having a polarity different from that of the first region. A first region of the first driving magnet 1411 has an S pole and a second region may have an N pole. At this time, the first surface of the second magnet 1120 may have an N pole. As a modified embodiment, the first region of the first driving magnet 1411 has an N pole and the second region may have an S pole.

In the present embodiment, magnetic field interference can be minimized through the arrangement of the magnet polarities of the first driving magnet 1411 and the second magnet 1120.

The first driving magnet 1411 may comprise a second surface opposite to the first surface of the first driving magnet 1411. The second surface of the first driving magnet 1411 may comprise a third region having a polarity different from that of the first region. The second surface of the first driving magnet 1411 may comprise a fourth region having a polarity different from that of the second region. The second surface of the first driving magnet 1411 may face the first coil 1412. The third region has an N pole and the fourth region may have an S pole. As a modified embodiment, the third region has an S pole and the fourth region may have an N pole.

The first driving magnet 1411 may comprise a neutral portion disposed between the first region and the second region. The first driving magnet 1411 may comprise a neutral portion disposed between the third region and the fourth region. The neutral portion may be a portion having a polarity close to neutral. The neutral portion may be a void. Or, as a modified embodiment, the neutral portion may be disposed between the first region and the third region and between the second region and the fourth region.

A region of the first driving magnet 1411 closest to the first surface of the second magnet 1120 may have a polarity for generating an attractive force with the first surface of the second magnet 1120. The first surface of the second magnet 1120 and the first region of the first driving magnet 1411 closest to the first surface of the second magnet 1120 may generate an attractive force to each other.

Each of the second magnet 1120 and the first driving magnet 1411 may comprise a first surface facing the central portion of the moving part 1200. The first surface of the first driving magnet 1411 may comprise a first region and a second region having different polarities. The first surface of the second magnet 1120 may be disposed closer to the first driving magnet 1411 than to the second driving magnet 1421. The first region of the first driving magnet 1411 may be disposed closer to the second magnet 1120 than the second region. A first region of the first driving magnet 1411 may have a polarity different from that of the first surface of the second magnet 1120.

Each of the second magnet 1120 and the first driving magnet 1411 may comprise a first surface facing the central portion of the holder 1210. The first surface of the first driving magnet 1411 and the first surface of the second magnet 1120 may comprise regions having different polarities.

The first driving unit 1410 may comprise a first coil 1412. The first coil 1412 may be disposed on the substrate 1130. The first coil 1412 may be disposed in the housing 1110. The first coil 1412 may be disposed on the substrate 1130 at a position corresponding to the first driving magnet 1411. The first coil 1412 may be disposed below the holder 1210. The first coil 1412 may interact with the first driving magnet 1411. When a current is applied to the first coil 1412, an electromagnetic field is formed around the first coil 1412 to interact with the first driving magnet 1411. The first driving magnet 1411 and the first coil 1412 may tilt the holder 1210 with respect to the first axis. At this time, the first axis may be an x-axis.

In the present embodiment, a first direction driving current may be applied to the first coil 1412 to drive the first coil 1412. At this time, the second direction driving current opposite to the first direction driving current may not be used to drive the first coil 1412. That is, only a current in either one of a reverse direction or a forward direction may be supplied to the first coil 1412.

The reflective member driving device 1000 may comprise a Hall sensor 1413. The Hall sensor 1413 may detect the first driving magnet 1411. The Hall sensor 1413 may detect a magnetic force of the first driving magnet 1411. The Hall sensor 1413 may detect the position of the holder 1210. The Hall sensor 1413 may detect the position of the reflective member 1220. The Hall sensor 1413 may detect a tilt amount centered about the x-axis of the holder 1210.

The reflective member driving device 1000 may comprise a yoke 1414. The yoke 1414 may be disposed between the first driving magnet 1411 and the holder 1210. The yoke 1414 may be formed in a shape corresponding to the first driving magnet 1411. The yoke 1414 may increase the interaction force between the first driving magnet 1411 and the first coil 1412.

The driving unit 1400 may comprise a second driving unit 1420. The second driving unit 1420 may tilt the moving part 1200 about the second axis against the fixed part 1100. The second driving unit 1420 may tilt the holder 1210 with respect to a second axis perpendicular to the first axis of the moving plate 1300. The second driving unit 1420 may tilt the moving part 1200 centered about the y-axis against the fixed part 1100. The second driving unit 1420 may comprise a coil and a magnet. The second driving unit 1420 may move the moving part 1200 through electromagnetic interaction. As a modified embodiment, the second driving unit 1420 may comprise shape memory alloy (SMA).

The second driving unit 1420 may comprise a second driving magnet 1421. The second driving magnet 1421 may be disposed in the holder 1210. The second driving magnet 1421 may be disposed on both side surfaces of the holder 1210. The second driving magnet 1421 may be fixed to the holder 1210. The second driving magnet 1421 may be fixed to the holder 1210 by an adhesive. The second driving magnet 1421 may be disposed between the holder 1210 and a side surface of the housing 1110. The second driving magnet 1421 may be disposed between the holder 1210 and a side plate of the housing 1110. The second driving magnet 1421 may move integrally with the holder 1210. The second driving magnet 1421 may tilt the holder 1210. The second driving magnet 1421 may tilt the holder 1210 with respect to a second axis perpendicular to the first axis. The second driving magnet 1421 may be disposed to face the second coil 1422. The second driving magnet 1421 may face the second coil 1422. The second driving magnet 1421 may be disposed at a position corresponding to the second coil 1422. The second driving magnet 1421 may interact with the second coil 1422. The second driving magnet 1421 may electromagnetically interact with the second coil 1422.

The second driving magnet 1421 may comprise a neutral portion having no polarity. The neutral portion may be a void. The neutral portion may be disposed between the N pole and the S pole. The neutral portion may be disposed between a first portion corresponding to the front side of the second driving magnet 1421 and a second portion corresponding to the rear side of the second driving magnet 1421. Or, the neutral portion may be disposed between the inner side portion and the outer side portion of the second driving magnet 1421.

The second driving magnet 1421 may comprise a first sub-magnet 1421-1. The first sub-magnet 1421-1 may be disposed on one side of the holder 1210. The first sub-magnet 1421-1 may be disposed to face a first sub-coil 1422-1. The first sub-magnet 1421-1 may face the first sub-coil 1422-1. The first sub-magnet 1421-1 may be disposed at a position corresponding to the first sub-coil 1422-1. The first sub-magnet 1421-1 may interact with the first sub-coil 1422-1. The first sub-magnet 1421-1 may electromagnetically interact with the first sub-coil 1422-1.

The second driving magnet 1421 may comprise a second sub-magnet 1421-2. The second sub-magnet 1421-2 may be disposed on the other side of the holder 1210. The second sub-magnet 1421-2 may be disposed at an opposite side of the first sub-magnet 1421-1. The second sub-magnet 1421-2 may have the same size and shape as the first sub-magnet 1421-1. The second sub-magnet 1421-2 may be disposed to face the second sub-coil 1422-2. The second sub-magnet 1421-2 may face the second sub-coil 1422-2. The second sub-magnet 1421-2 may be disposed at a position corresponding to the second sub-coil 1422-2. The second sub-magnet 1421-2 may interact with the second sub-coil 1422-2. The second sub-magnet 1421-2 may electromagnetically interact with the second sub-coil 1422-2.

The second driving unit 1420 may comprise a second coil 1422. The second coil 1422 may be disposed on the substrate 1130. The second coil 1422 may be disposed in the housing 1110. The second coil 1422 may be disposed on the second portion of the substrate 1130. The second coil 1422 may be disposed on both side surfaces of the holder 1210. When a current is applied to the second coil 1422, an electromagnetic field is formed around the second coil 1422 to interact with the second driving magnet 1421. The second coil 1422 may comprise two sub-coils 1421-1 and 1421-2 disposed opposite to each other with respect to the holder 1210. The two sub-coils 1421-1 and 1421-2 may be electrically connected to each other. The second driving magnet 1421 and the second coil 1422 may tilt the holder 1210 with respect to a second axis perpendicular to the first axis. At this time, the second axis may be a y-axis. The first axis may be an x-axis, and the z-axis may be an optical axis of the image sensor 3400.

The second coil 1422 may comprise a first sub-coil 1422-1. The first sub-coil 1422-1 may be disposed on the substrate 1130. The first sub-coil 1422-1 may be disposed in the housing 1110. The first sub-coil 1422-1 may be disposed on the second portion of the substrate 1130. The first sub-coil 1422-1 may be disposed on the side of the holder 1210. When a current is applied to the first sub-coil 1422-1, an electromagnetic field is formed around the first sub-coil 1422-1 to interact with the first sub-magnet 1421-1.

The second coil 1422 may comprise a second sub-coil 1422-2. The second sub-coil 1422-2 may be disposed on the substrate 1130. The second sub-coil 1422-2 may be disposed in the housing 1110. The second sub-coil 1422-2 may be disposed on the second portion of the substrate 1130. The second sub-coil 1422-2 may be disposed on the side of the holder 1210. When a current is applied to the second sub-coil 1422-2, an electromagnetic field is formed around the second sub-coil 1422-2 to interact with the second sub-magnet 1421-2.

The second driving magnet 1421 may comprise a first sub-magnet 1421-1 disposed on a first side surface of the holder 1210 and a second sub-magnet 1421-2 disposed on a second side surface of the holder 1210. The second coil 1422 may comprise a first sub-coil 1422-1 disposed on the substrate and disposed at a position corresponding to the first sub-magnet 1421-1, and a second sub-coil 1422-2 disposed on the substrate and disposed at a position corresponding to the second sub-magnet 1421-2.

The reflective member driving device 1000 may comprise a Hall sensor 1423. The Hall sensor 1423 may detect the second driving magnet 1421. The Hall sensor 1423 may detect a magnetic force of the second driving magnet 1421. The Hall sensor 1423 may detect the position of the holder 1210. The Hall sensor 1423 may detect the position of the reflective member 1220. The Hall sensor 1423 may detect a tilt amount centered about the y-axis of the holder 1210.

The reflective member driving device 1000 may comprise a yoke 1424. The yoke 1424 may be disposed between the second driving magnet 1421 and the holder 1210. The yoke 1424 may be formed to have a shape corresponding to that of the second driving magnet 1421. The yoke 1424 may increase the interaction force between the second driving magnet 1421 and the second coil 1422.

The reflective member driving device 1000 may comprise a damper 1500. The damper 1500 may comprise an adhesive material. The damper 1500 may have viscosity. The damper 1500 may be disposed between the fixed part 1100 and the moving part 1200. The damper 1500 may be disposed between the rigid mover 1230 and the housing 1110. The damper 1500 may connect the rigid mover 1230 and the housing 1110. The damper 1500 may be coupled to the rigid mover 1230 and the housing 1110. The damper 1500 may be disposed on the rigid mover 1230. The damper 1500 may be coupled with the rigid mover 1230. The damper 1500 may be coupled to the rigid mover 1230. The rigid mover 1230 may be coupled to the housing 1110. The housing 1110 and the rigid mover 1230 may be attached to each other by the damper 1500.

The damper 1500 may be disposed on at least one among an upper portion and a lower portion of the first portion 1111 of the housing 1110. The damper 1500 may connect the protruding portion 1231 of the rigid mover 1230 and the housing 1110. At least a portion of the damper 1500 may be disposed in the groove 1119 of the housing 1110 between the protruding portion 1231 of the rigid mover 1230 and the housing 1110. At least a portion of the damper 1500 may be disposed in a second groove being recessed from the first groove portion of the housing 1110.

In the present embodiment, a bond of a gel component that acts as a damper between the housing 1110 and the rigid mover 1230 may be applied. Through this, it is possible to increase the responsiveness of the actuator by securing a phase margin while maintaining a gain value. That is, FRA characteristics may be improved. In particular, a response characteristic of a tilt centered about the x-axis may be improved. The tilt centered about the y-axis (yaw) can also be enhanced.

Figure 30:
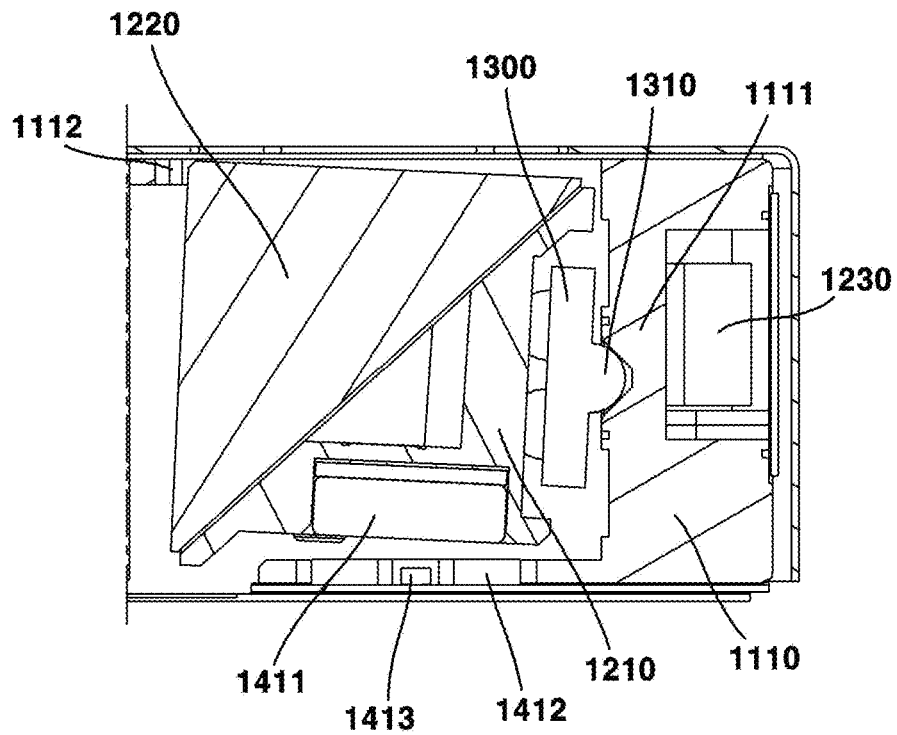
FIGS. 30 and 31 are diagrams for explaining the tilt about the x-axis of a reflective member driving device according to the present embodiment.
Figure 31:
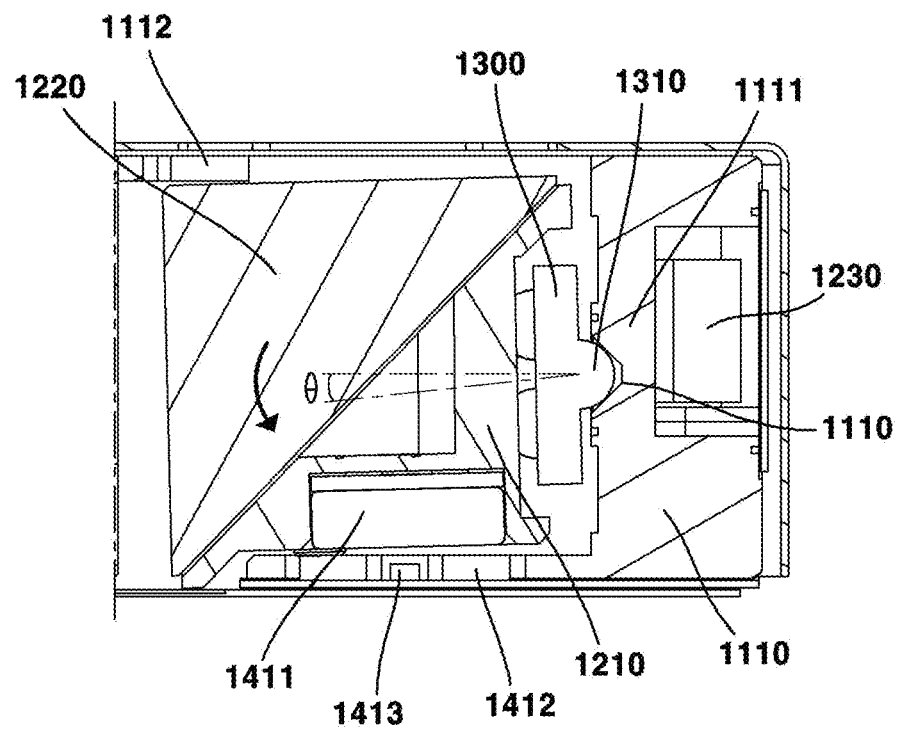

FIGS. 30 and 31 are diagrams for explaining the tilt about the x-axis of a reflective member driving device according to the present embodiment.

In the present embodiment, the holder 1210 may be disposed between the upper plate and the lower plate of the housing 1110 in an initial state in which current is not supplied to the first driving unit 1410. At this time, the holder 1210 may be in contact with the upper plate of the housing 1110 (refer to FIG. 30).

At this time, when a current in a first direction is applied to the first coil 1412, the holder 1210 may be tilted downward centered about the first protrusion 1310 of the moving plate 1300 by the electromagnetic interaction between the first coil 1412 and the first driving magnet 1411 (refer to θ of FIG. 31).

That is, current is applied to the first coil 1412 so that the holder 1210 may be tilted downward against the housing 1110 centered about the x-axis. At this time, since the reflective member 1220 is also tilted together with the holder 1210, the optical path is changed, so that the shaking detected by the gyro sensor 1150 can be offset.

In the present embodiment, only the current in the first direction may be used for controlling the first coil 1412 and the current in the first direction opposite to the first direction may not be used. Through this, the separation and removal problem of the moving plate 1300 that may occur when the current in the second direction is applied to the first coil 1412 can be fundamentally blocked.

In more detail, as a comparative example, when the centers of the first magnet 1240 and the second magnet 1120 are disposed at the same height as the first protrusion 1310 of the moving plate 1300, the moving part 1200 is slid by the electromagnetic force and the moving plate 1300 may be separated and removed when the repulsive force between the first magnet 1240 and the second magnet 1120 and the electromagnetic force between the first coil 1412 and the first driving magnet 1411 are non-uniform. When the electromagnetic force between the first coil 1412 and the first driving magnet 1411 is greater than the repulsive force between the first magnet 1240 and the second magnet 1120, a phenomenon in that the rigid mover 1230 falls out as much as the gap between the first magnet 1240 and the second magnet 1120 occurs and the moving plate 1300 may be separated. This may be a cause of poor Hall calibration dynamic characteristics.

In the present embodiment, the center axis of the repulsive force and the center axis of the x-axis driving force may deviate by a certain distance. Through this, the reflective member 1220 may be mechanically shifted in an upward direction. At this time, the upward direction may be a direction opposite to gravity.

In the present embodiment, it can be controlled by code rather than current control. In the pivot structure like the present embodiment, it is difficult to know the initial position in the open state for reasons such as deflection due to gravity, so the closed method (a method in which the moving part 1200 is in contact with the fixed part 1100 in the initial state) may be required. In the present embodiment, since it is controlled by a closed method, more precise driving can be performed. Furthermore, in the present embodiment, the noise generated by the moving part 1200 moving here and there can also be minimized by the closed method.

Figure 32:
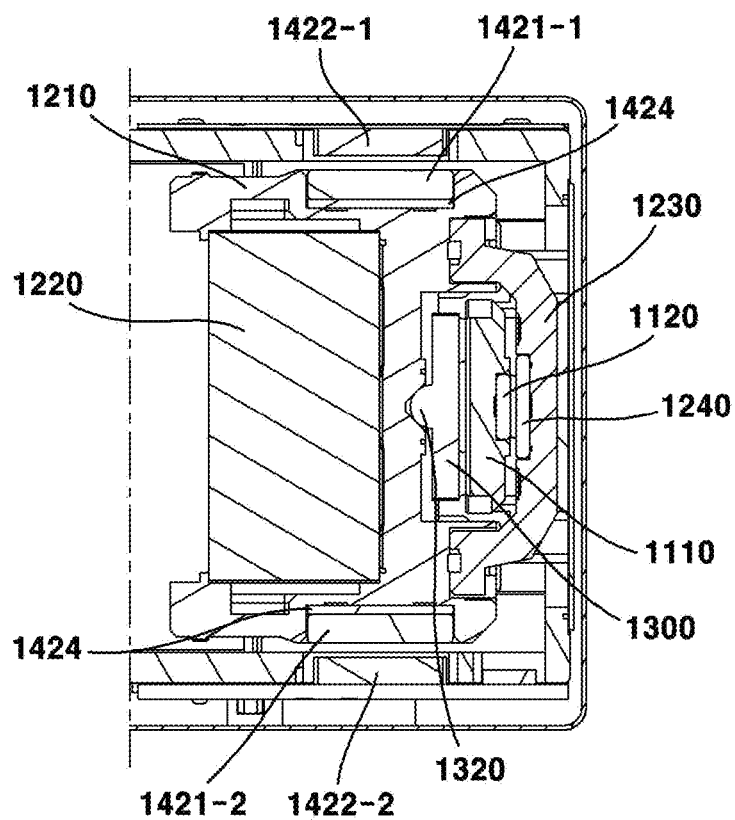
FIGS. 32 to 34 are views for explaining a tilt about the y-axis of a reflective member driving device according to the present embodiment.
Figure 33:
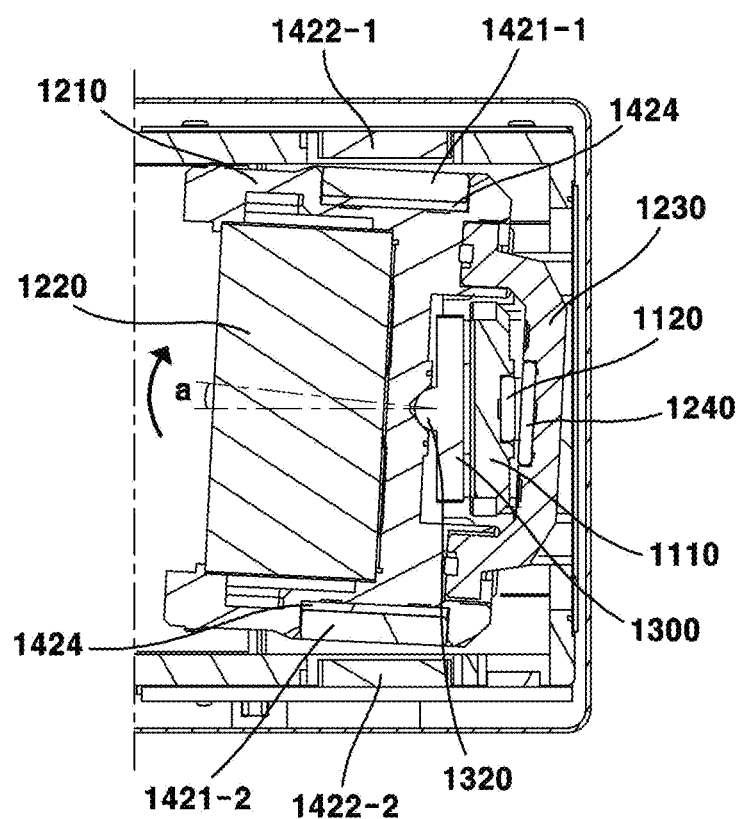
Figure 34:
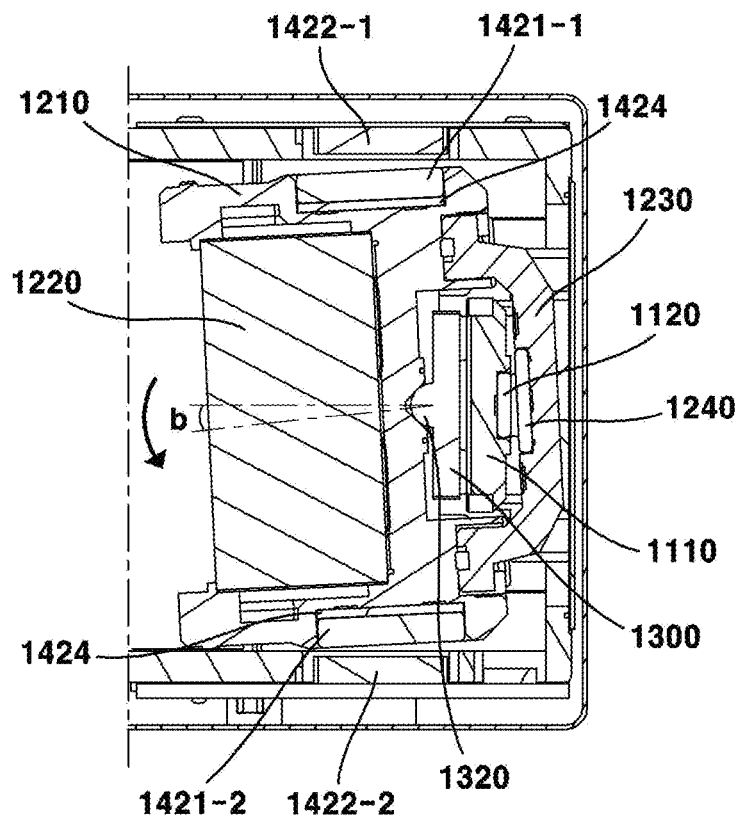

FIGS. 32 to 34 are views for explaining a tilt about the y-axis of a reflective member driving device according to the present embodiment.

In the present embodiment, in an initial state in which current is not supplied to the second driving unit 1420, the holder 1210 may be disposed between the both side plates of the housing 1110. At this time, the holder 1210 may be in a state of being spaced apart from all of the both side plates of the housing 1110 (refer to FIG. 32).

At this time, when a current in the first direction is applied to the second coil 1422, the holder 1210 may be tilted to one side centered about the second protrusion 1320 of the moving plate 1300 due to the electromagnetic interaction between the second coil 1422 and the second driving magnet 1421 (refer to FIG. 33 *a*).

Meanwhile, when a current in a second direction opposite to the first direction is applied to the second coil 1422, the holder 1210 may be tilted to the other side centered about the second protrusion 1320 of the moving plate 1300 due to the electromagnetic interaction between the second coil 1422 and the second driving magnet 1421 (refer to FIG. 34 *b*).

That is, current is selectively applied to the second coil 1422 in both directions so that the holder 1210 can be tilted in the left and right directions against the housing 1110 centered about the y-axis. At this time, since the reflective member 1220 is also tilted together with the holder 1210, the optical path is changed, so that the shaking detected by the gyro sensor 1150 may be offset. Therefore, in the present embodiment, hand shake correction for the x-axis tilting and the y-axis tilting, that is, the 2-axis tilting can be performed.

Hereinafter, a lens driving device according to the present embodiment will be described with reference to the drawings.

Figure 35:
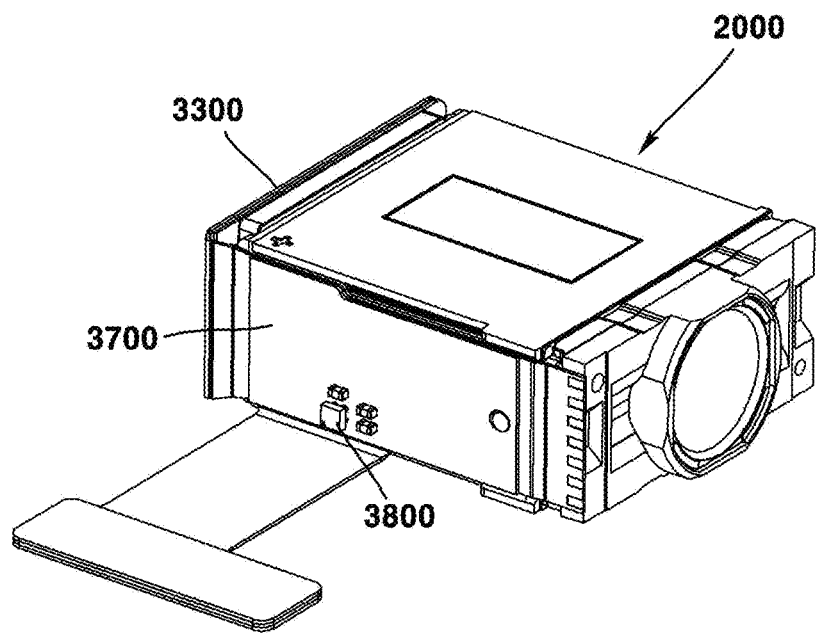
FIG. 35 is a perspective view of a lens driving device according to the present embodiment.
Figure 36:
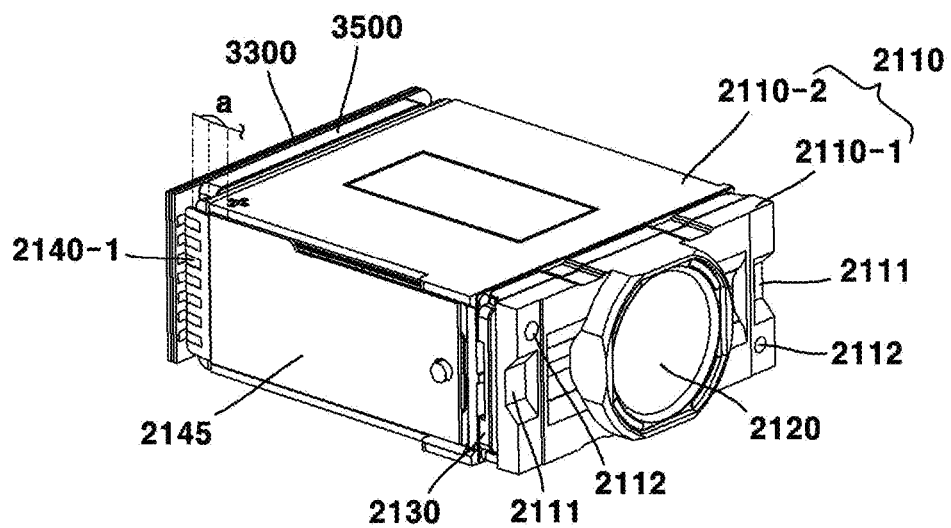
FIG. 36 is a perspective view in which some configurations of a lens driving device according to the present embodiment are omitted.
Figure 37:
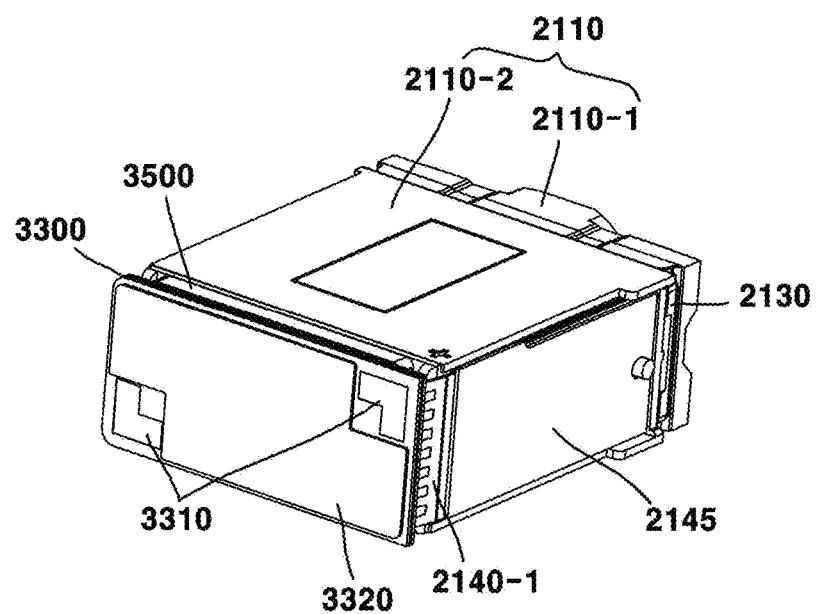
FIG. 37 is a perspective view of a lens driving device in the state illustrated in FIG. 36 as viewed from another direction.
Figure 38:
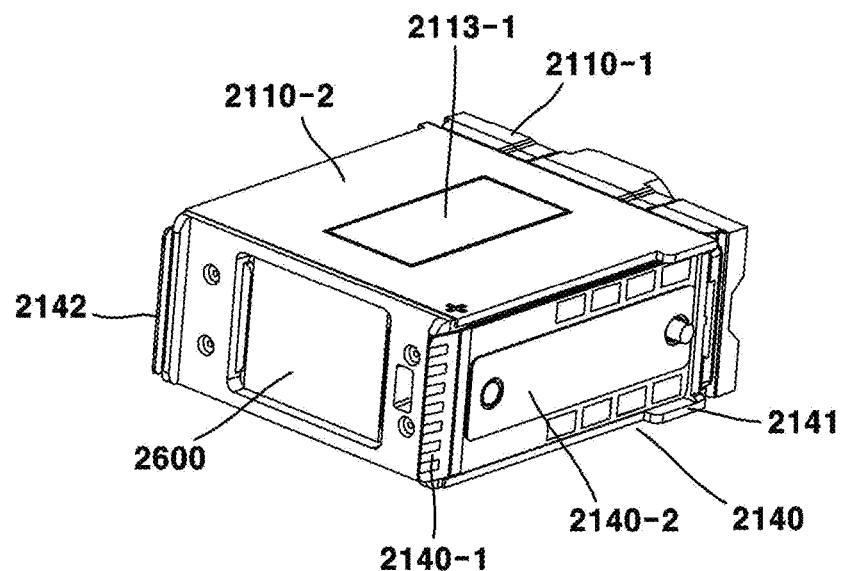
FIG. 38 is a perspective view in which some configurations of a lens driving device according to the present embodiment are omitted.
Figure 39:
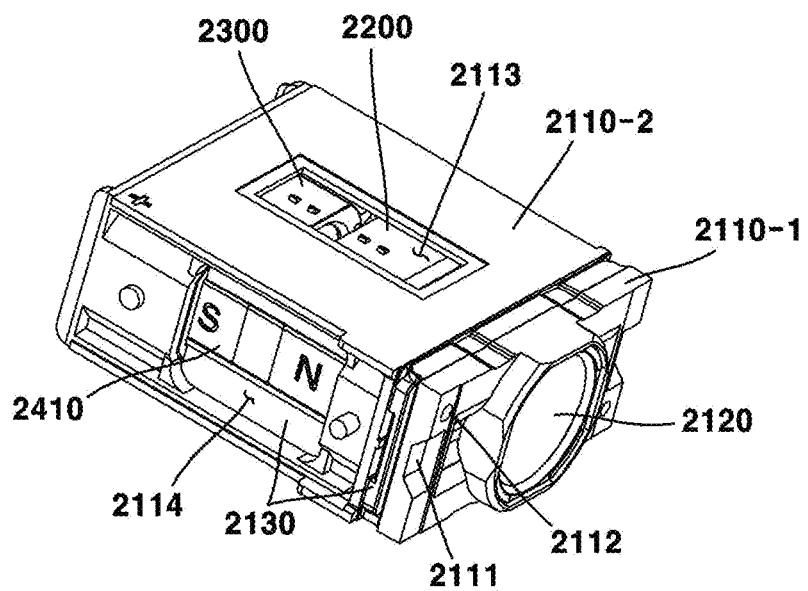
FIG. 39 is a perspective view of a state in which configurations such as a substrate and a coil are omitted in a lens driving device according to the present embodiment.
Figure 40:
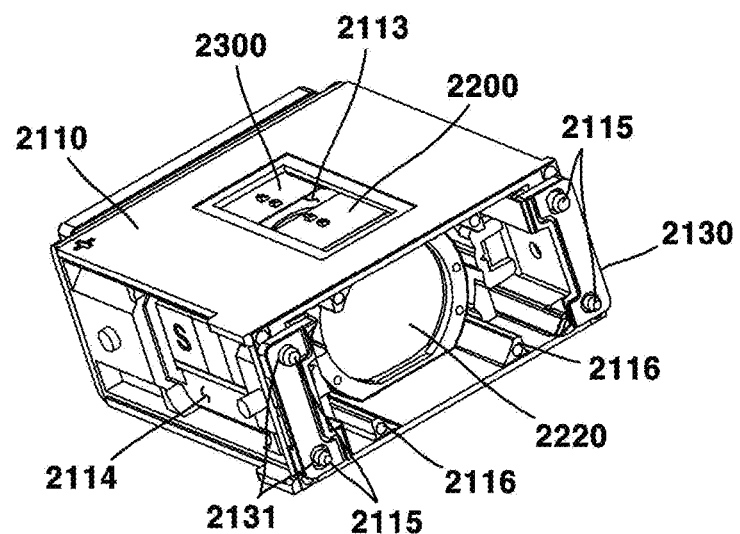
FIG. 40 is a perspective view of a state in which the first lens and related components are omitted in the lens driving device of the state illustrated in FIG. 39.
Figure 41:
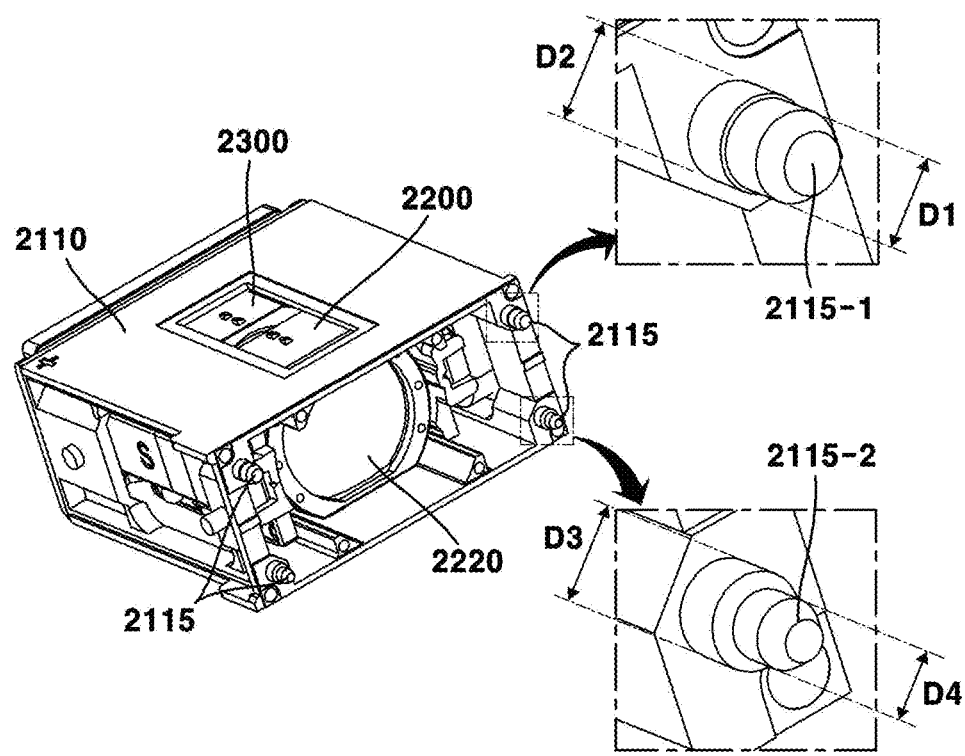
FIG. 41 is a perspective view and a partially enlarged view of a part of a lens driving device according to the present embodiment.
Figure 42:
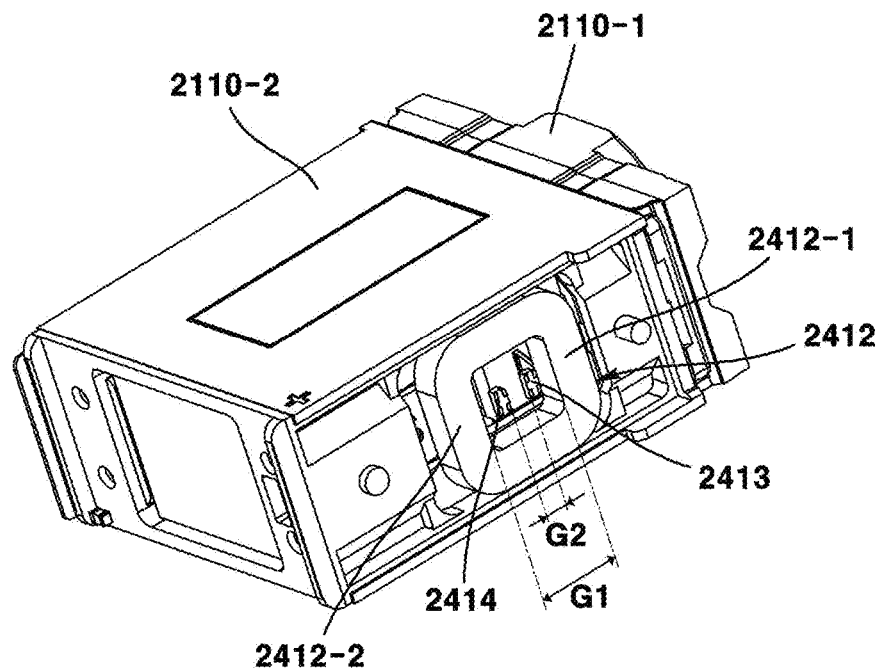
FIG. 42 is a diagram for explaining an arrangement structure of a coil and a sensor of a lens driving device according to the present embodiment.
Figure 43:
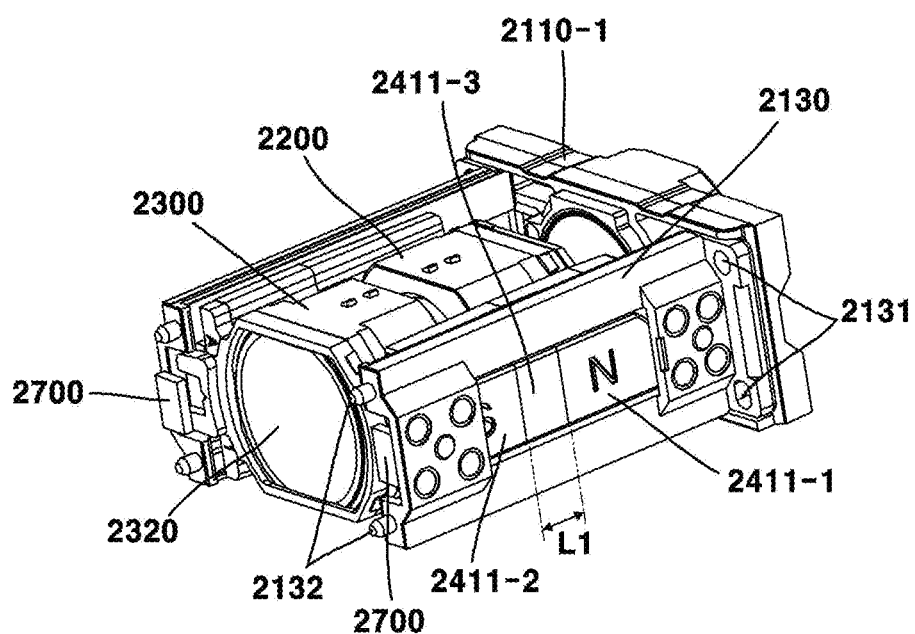
FIG. 43 is a perspective view illustrating a state in which the second housing is omitted in the lens driving device of the state illustrated in FIG. 39.
Figure 44:
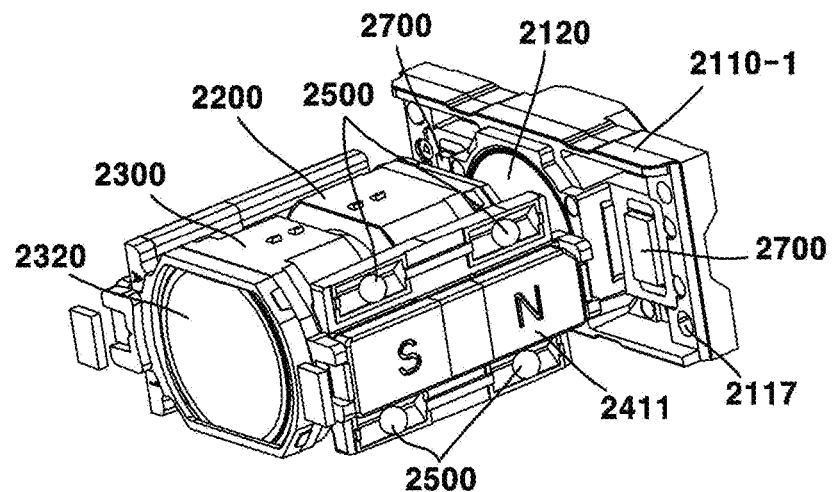
FIG. 44 is a perspective view of a state in which a guide rail is omitted from the lens driving device of the state illustrated in FIG. 43.
Figure 45:
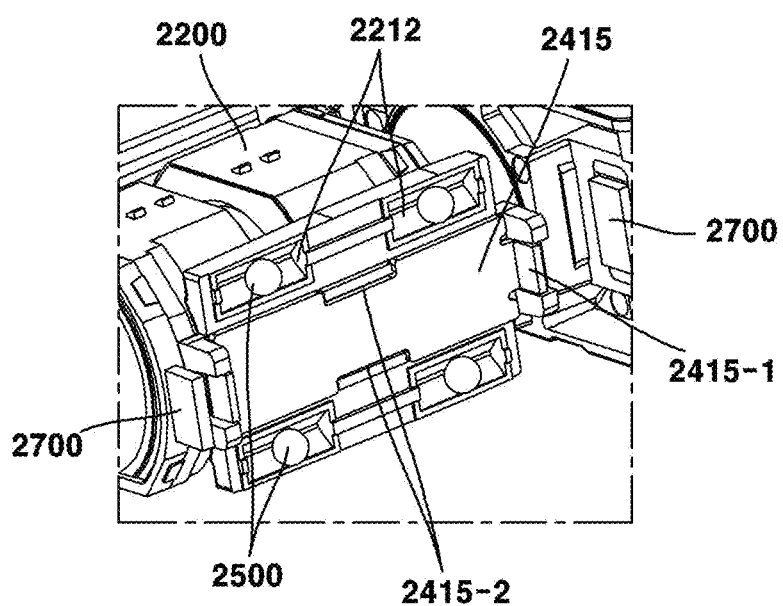
FIG. 45 is an enlarged view of some configurations of a lens driving device according to the present embodiment.
Figure 46:
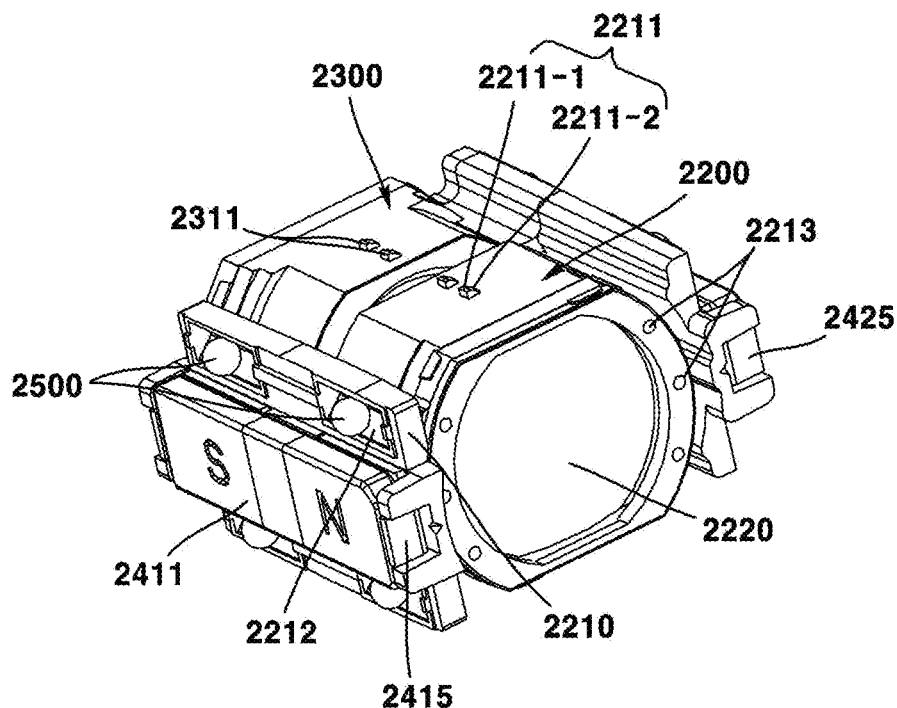
FIG. 46 is a perspective view of a first moving part and a second moving part of a lens driving device according to the present embodiment, and a related configuration thereof.
Figure 47:
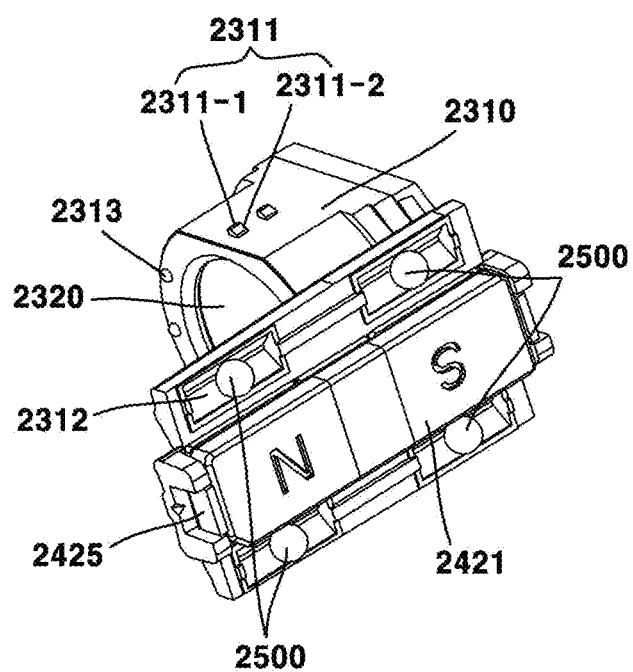
FIG. 47 is a perspective view of a second moving part of the lens driving device according to the present embodiment and a related configuration.
Figure 48:
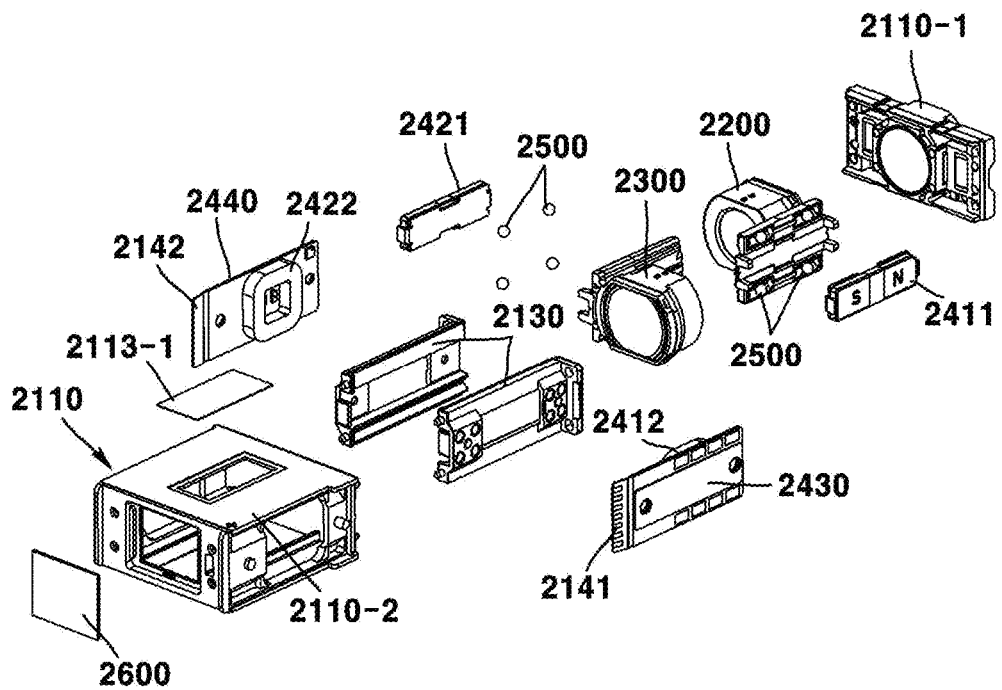
FIG. 48 is an exploded perspective view of a lens driving device according to the present embodiment.
Figure 49:
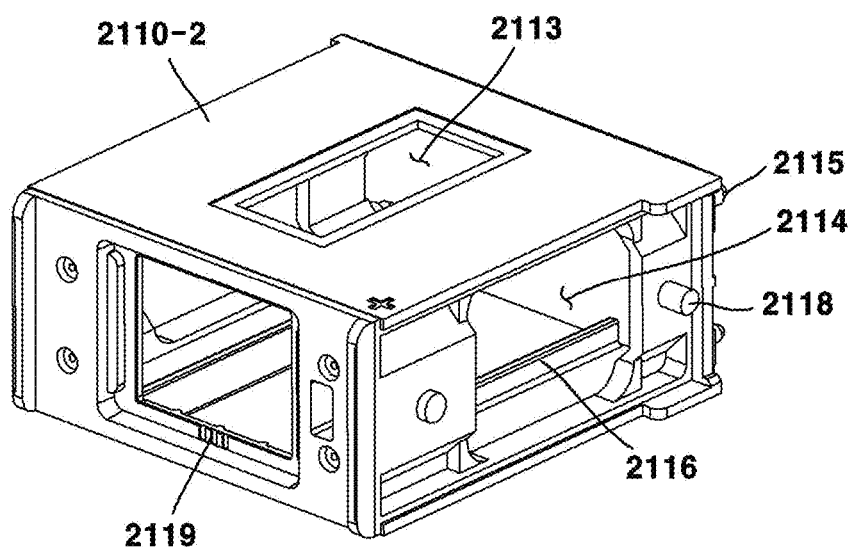
FIG. 49 is a perspective view of a second housing of a lens driving device according to the present embodiment.
Figure 50:
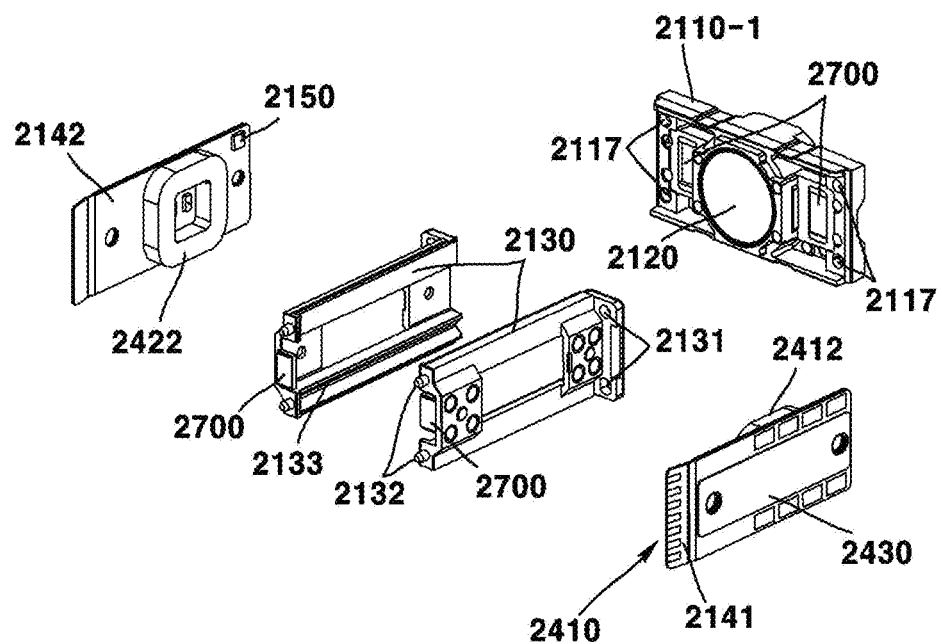
FIGS. 50 and 51 are exploded perspective views of some configurations of a lens driving device according to the present embodiment.
Figure 51:
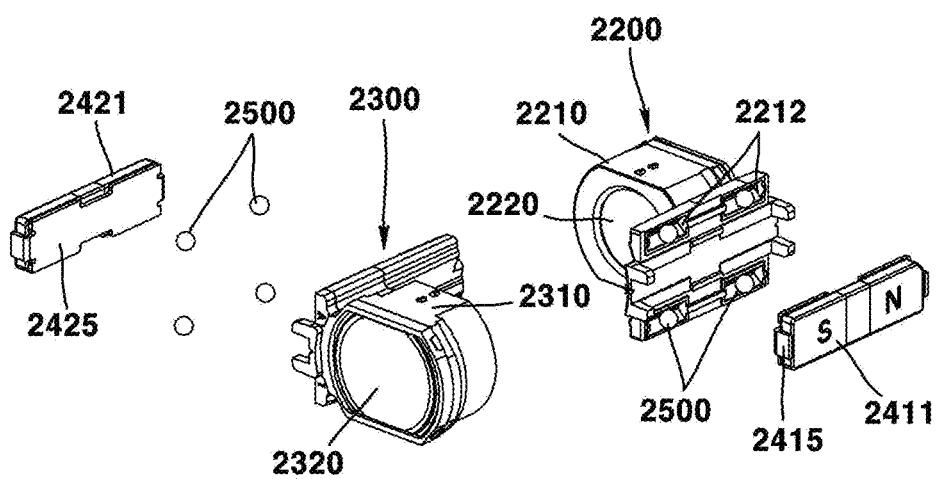
Figure 52:
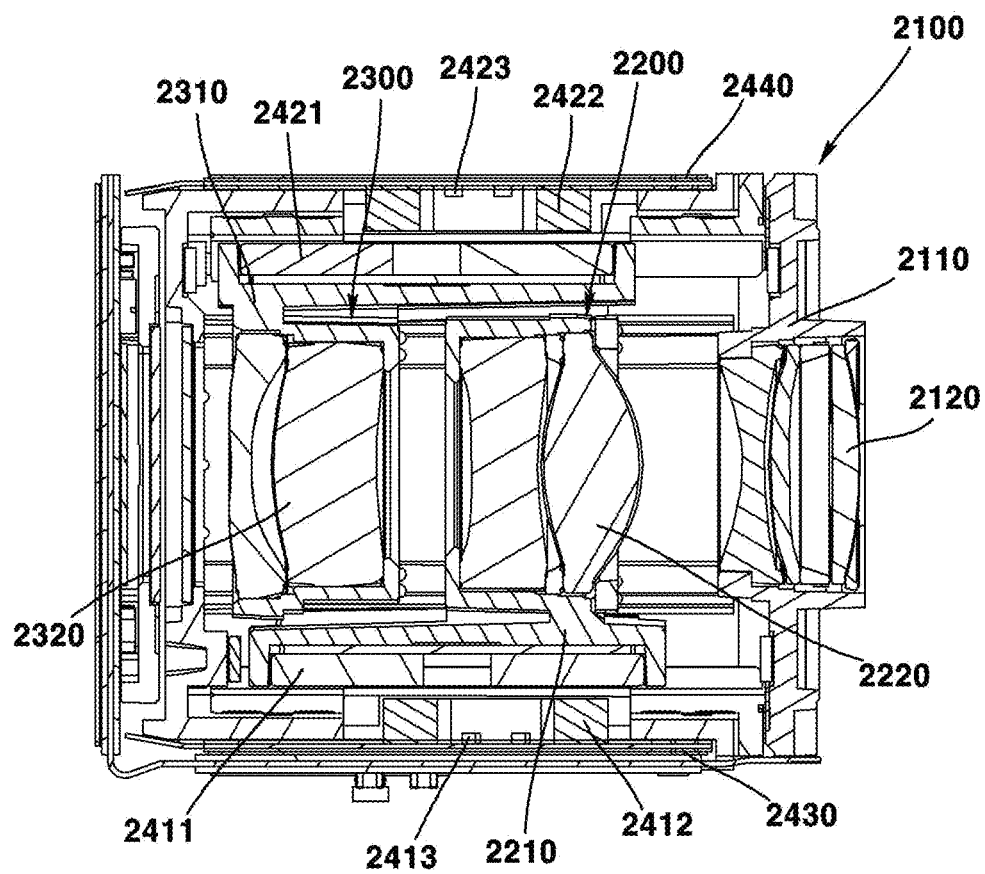
FIG. 52 is a cross-sectional view of a lens driving device according to the present embodiment.

FIG. 35 is a perspective view of a lens driving device according to the present embodiment; FIG. 36 is a perspective view in which some configurations of a lens driving device according to the present embodiment are omitted; FIG. 37 is a perspective view of a lens driving device in the state illustrated in FIG. 36 as viewed from another direction; FIG. 38 is a perspective view in which some configurations of a lens driving device according to the present embodiment are omitted; FIG. 39 is a perspective view of a state in which configurations such as a substrate and a coil are omitted in a lens driving device according to the present embodiment; FIG. 40 is a perspective view of a state in which the first lens and related components are omitted in the lens driving device of the state illustrated in FIG. 39; FIG. 41 is a perspective view and a partially enlarged view of a part of a lens driving device according to the present embodiment; FIG. 42 is a diagram for explaining an arrangement structure of a coil and a sensor of a lens driving device according to the present embodiment; FIG. 43 is a perspective view illustrating a state in which the second housing is omitted in the lens driving device of the state illustrated in FIG. 39; FIG. 44 is a perspective view of a state in which a guide rail is omitted from the lens driving device of the state illustrated in FIG. 43; FIG. 45 is an enlarged view of some configurations of a lens driving device according to the present embodiment; FIG. 46 is a perspective view of a first moving part and a second moving part of a lens driving device according to the present embodiment, and a related configuration thereof; FIG. 47 is a perspective view of a second moving part of the lens driving device according to the present embodiment and a related configuration; FIG. 48 is an exploded perspective view of a lens driving device according to the present embodiment; FIG. 49 is a perspective view of a second housing of a lens driving device according to the present embodiment; FIGS. 50 and 51 are exploded perspective views of some configurations of a lens driving device according to the present embodiment; and FIG. 52 is a cross-sectional view of a lens driving device according to the present embodiment.

The lens driving device 2000 may perform a zoom function. The lens driving device 2000 may perform a continuous zoom function. The lens driving device 2000 may perform an auto focus (AF) function. The lens driving device 2000 may move a lens. The lens driving device 2000 may move the lens along an optical axis. The lens driving device 2000 may move lenses formed in a plurality of groups by each group. The lens driving device 2000 may move a second group lens. The lens driving device 2000 may move a third group lens. The lens driving device 2000 may be a lens actuator. The lens driving device 2000 may be an AF actuator. The lens driving device 2000 may be a zoom actuator. The lens driving device 2000 may comprise a voice coil motor (VCM).

The lens driving device 2000 may comprise a lens. Or, the lens may be described as one configuration of the camera device 10 rather than one configuration of the lens driving device 2000. The lens may be disposed in an optical path formed by the reflective member 1220 and the image sensor 3400 of the reflective member driving device 1000. The lens may comprise a plurality of lenses. The plurality of lenses may form a plurality of groups. The lenses may form three groups. The lens may comprise first to third lens groups. A first lens group, a second lens group, and a third lens group may be sequentially disposed between the reflective member 1220 and the image sensor 3400. The first lens group may comprise a first lens 2120. The second lens group may comprise a second lens 2220. The third lens group may comprise a third lens 2320.

The lens driving device 2000 may comprise a fixed part 2100. The fixed part 2100 may be a relatively fixed part when the first moving part 2200 and the second moving part 2300 are moved.

The lens driving device 2000 may comprise a housing 2110. The fixed part 2100 may comprise a housing 2110. The housing 2110 may be disposed outside the first holder 2210 and the second holder 2310. The housing 2110 may accommodate at least a portion of the first holder 2210 and the second holder 2310. The housing 2110 may comprise a front plate, a rear plate, and a plurality of connection plates. At this time, the front plate may be referred to as an upper plate, the rear plate may be referred to as a lower plate, and the connection plate may be referred to as a side plate.

The housing 2110 may comprise a first housing 2110-1. The first housing 2110-1 may be a cover. The first housing 2110-1 may form a front plate of the housing 2110. The first housing 2110-1 may be coupled to the first lens 2120. The first housing 2110-1 may be a cover. The first housing 2110-1 may be coupled to the reflective member driving device 1000. A first lens 2120 may be fixed to the first housing 2110-1.

The housing 2110 may comprise a second housing 2110-2. The second housing 2110-2 may be a housing. The second housing 2110-2 may form a rear plate and a connection plate of the housing 2110. The second housing 2110-2 may be open forward. The first housing 2110-1 may be coupled to the front of the second housing 2110-2. A portion of a guide rail 2130 may be disposed between the first housing 2110-1 and the second housing 2110-2.

The housing 2110 may comprise a first groove 2111. The first groove 2111 may be coupled to the protruding portion 1116 of the housing 1110 of the reflective member driving device 1000. The first groove 2111 may be formed in a shape corresponding to the protruding portion 1116 of the reflective member driving device 1000. An adhesive for coupling the reflective member driving device 1000 to the lens driving device 2000 may be disposed in the first groove 2111.

The housing 2110 may comprise a second groove 2112. The second groove 2112 may be coupled to the protrusion 1117 of the housing 1110 of the reflective member driving device 1000. The protrusion 1117 of the reflective member driving device 1000 may be inserted into the second groove 2112. The second groove 2112 may be formed in a shape corresponding to the protrusion 1117 of the reflective member driving device 1000. An adhesive for coupling the reflective member driving device 1000 to the lens driving device 2000 may be disposed in the second groove 2112.

The housing 2110 may comprise a first hole 2113. The first hole 2113 may expose the protrusion 2211 of the first holder 2210 and the protrusion 2311 of the second holder 2310. The first hole 2113 may be formed in the connection plate of the housing 2110. In the manufacturing test step, by checking the protrusion 2211 of the first holder 2210 and the protrusion 2311 of the second holder 2310 being exposed through the first hole 2113, it can be checked whether the lens driving device 2000 is operating normally.

The housing 2110 may comprise a plate 2113-1. The plate 2113-1 may cover the first hole 2113. The plate 2113-1 is disposed in the first hole 2113 and may close the first hole 2113.

The housing 2110 may comprise a second hole 2114. The second hole 2114 may be a coil accommodating hole in which a first coil 2412 and a second coil 2422 are disposed. The first coil 2412 and the second coil 2422 may be disposed in the second hole 2114. The second hole 2114 may be formed to be larger than the first coil 2412 and the second coil 2422.

The housing 2110 may comprise a protrusion 2115. The protrusion 2115 may be formed in the second housing 2110-2. The protrusion 2115 may be formed as a two-step protrusion. The protrusion 2115 may be coupled to a guide rail 2130. The protrusion 2115 may be coupled to the first housing 2110-1. The guide rail 2130 may be coupled to a portion having a large diameter of the protrusion 2115 and the first housing 2110-1 may be coupled to a portion having a small diameter of the protrusion 2115.

The protrusion 2115 may comprise a first protrusion 2115-1. The first protrusion 2115-1 may comprise a first portion 2115a having a first diameter D2 and a second portion 2115b being protruded from the first portion 2115a and having a second diameter D1. The protrusion 2115 may comprise a second protrusion 2115-2. The second protrusion 2115-2 may comprise a third portion having a third diameter D3 and a fourth portion being protruded from the third portion and having a fourth diameter D4. At this time, the fourth diameter D4 may be smaller than the second diameter D1. Through this, the first protrusion 2115-1 may be more tightly coupled to the first housing 2110-1 than the second protrusion 2115-2.

The housing 2110 may comprise a guide protrusion 2116. The guide protrusion 2116 may be formed on an inner surface of the housing 2110. The guide protrusion 2116 may be formed in a shape corresponding to the shape of at least a portion of the first holder 2210 and the second holder 2310. Through this, the guide protrusion 2116 may guide the movement of the first holder 2210 and the second holder 2310 in an optical axis direction. At this time, the optical axis direction may be a z-axis direction perpendicular to the x-axis and the y-axis. The guide protrusion 2116 may be disposed in the optical axis direction. The guide protrusion 2116 may be extended in an optical axis direction.

The housing 2110 may comprise a groove 2117. The groove 2117 may be formed in the first housing 2110-1. The groove 2117 of the first housing 2110-1 may be coupled to the protrusion 2115 of the second housing 2110-2.

The housing 2110 may comprise a protrusion 2118. The protrusion 2118 may be coupled to the substrate 2140. The protrusion 2118 may be inserted into the groove of the substrate 2140. The protrusion 2118 may be formed to have a corresponding size and shape to fit into the groove of the substrate 2140.

The housing 2110 may comprise a vent hole 2119. The vent hole 2119 may be formed in the rear plate of the housing 2110. The vent hole 2119 may form a gap between the housing 2110 and the dummy glass 2600. Air may flow into the gap between the housing 2110 and the dummy glass 2600. A gas generated during the curing process of the adhesive may escape through the vent hole 2119.

The lens driving device 2000 may comprise a first lens 2120. Or, the first lens 2120 may be described as one configuration of the camera device 10 rather than one configuration of the lens driving device 2000. The fixed part 2100 may comprise a first lens 2120. The first lens 2120 may be disposed on an optical axis. The first lens 2120 may be disposed between the reflective member 1220 and the image sensor 3400. The first lens 2120 may be disposed between the reflective member 1220 and the second lens 2220. The first lens 2120 may be disposed in the first housing 2110-1. The first lens 2120 may be fixed to the first housing 2110-1. The first lens 2120 may maintain a fixed state even when the second lens 2220 and the third lens 2320 are being moved.

The first lens 2120 may be a first lens group. The first lens 2120 may comprise a plurality of lenses. The first lens 2120 may comprise three lenses.

The lens driving device 2000 may comprise a guide rail 2130. The fixed part 2100 may comprise a guide rail 2130.

The guide rail 2130 may be coupled to the fixed part 2100. The guide rail 2130 may be coupled between the first housing 2110-1 and the second housing 2110-2. The guide rail 2130 may be coupled to the protrusion 2115 of the second housing 2110-2. The guide rail 2130 may guide the movement of the first holder 2210 and the second holder 2310. The guide rail 2130 may guide the first holder 2210 and the second holder 2310 to move in an optical axis direction. The guide rail 2130 may comprise a rail disposed in the optical axis direction. The guide rail 2130 may comprise a rail being extended in the optical axis direction. The guide rail 2130 may comprise a rail formed so that the ball 2500 rolls.

The lens driving device 2000 may comprise a substrate 2140. The fixed part 2100 may comprise a substrate 2140. The substrate 2140 may be disposed in the fixed part 2100. The substrate 2140 may be disposed on both side surfaces of the housing 2110. The substrate 2140 may be an FPCB. A first coil 2412 and a second coil 2422 may be disposed on the substrate 2140.

The substrate 2140 may comprise a first region 2140-1. The first region 2140-1 may be formed at an end of the substrate 2140. A terminal may be disposed in the first region 2140-1. The substrate 2140 may comprise a second region 2140-2. The first region 2140-1 of the substrate 2140 may be bent inward with respect to the second region 2140-2. Through this, the size of the printed circuit board 3300 can be minimized while securing a region for soldering arrangement that connects the terminals of the board 2140 and the printed circuit board 3300. The first region 2140-1 may form an obtuse angle with the second region 2140-2.

The substrate 2140 may comprise a first substrate 2141. The first substrate 2141 may be disposed at one side of the housing 2110. A first coil 2412 may be disposed on the first substrate 2141. First and second Hall sensors 2413 and 2414 may be disposed on the first substrate 2141.

The substrate 2140 may comprise a second substrate 2142. The second substrate 2142 may be disposed at the other side of the housing 2110. The second substrate 2142 may be disposed at an opposite side of the first substrate 2141. A second coil 2422 may be disposed on the second substrate 2142. Third and fourth Hall sensors 2423 and 2424 may be disposed on the second substrate 2142.

The lens driving device 2000 may comprise a suspension (SUS) 2145. The suspension 2145 may be disposed on the substrate 2140. The suspension 2145 may reinforce the strength of the substrate 2140. The suspension 2145 may dissipate heat generated by the substrate 2140.

The lens driving device 2000 may comprise an EEPROM 2150. The EEPROM 2150 may be electrically connected to the first coil 2412 and the second coil 2422. The EEPROM 2150 may be used to control currents applied to the first coil 2412 and the second coil 2422 before connecting the lens driving device 2000 to the driver IC 3900 in the manufacturing stage. That is, the EEPROM 2150 may be used to test whether the lens driving device 2000 operates normally. The EEPROM 2150 may be disposed on an inner surface of the substrate 2140.

The lens driving device 2000 may comprise a first moving part 2200. The first moving part 2200 may move against the fixed part 2100. At least a portion of the first moving part 2200 may be disposed between the fixed part 2100 and the second moving part 2300. The first moving part 2200 may move between the fixed part 2100 and the second moving part 2300.

The lens driving device 2000 may comprise a first holder 2210. The first moving part 2200 may comprise a first holder 2210. The first holder 2210 may be disposed inside the housing 2110. The first holder 2210 may move against the housing 2110. At least a portion of the first holder 2210 may be spaced apart from the housing 2110. The first holder 2210 may be in contact with the housing 2110. The first holder 2210 may be in contact with the housing 2110 when moving. Or, in the initial state, the first holder 2210 may be in contact with the housing 2110.

The first holder 2210 may comprise a protrusion 2211. The protrusion 2211 may be a test protrusion. The protrusion 2211 may be formed on the outer surface of the first holder 2210. The protrusion 2211 may be protruded from the first holder 2210. The protrusion 2211 can be seen from the outside through the first hole 2113 of the housing 2110. The protrusion 2211 may be used to test whether the lens driving device 2000 operates normally. The protrusion 2211 may comprise a flat surface 2211-1 and an inclined surface 2211-2.

The first holder 2210 may comprise a rail groove 2212. A ball 2500 may be disposed in the rail groove 2212. In the rail groove 2212, the ball 2500 may be moved by rolling. The rail groove 2212 and the ball 2500 may be in contact at two points. The rail groove 2212 may be disposed in an optical axis direction. The rail groove 2212 may be extended in an optical axis direction.

The rail groove 2212 may comprise a plurality of rail grooves. The rail groove 2212 may comprise four rail grooves. The rail groove 2212 may comprise first to fourth rail grooves. One or more balls 2500 may be disposed in each of the plurality of rail grooves 2212.

The first holder 2210 may comprise a protrusion 2213. The protrusion 2213 may be formed on the surface facing the first housing 2110-1 of the first holder 2210. The first holder 2210 may comprise a first surface facing the first housing 2110-1, and a plurality of protrusions 2213 formed on the first surface and being in contact with the first housing 2110-1. The protrusion 2213 may be in contact with the first housing 2110-1 when the first holder 2210 moves in a direction getting closer to the first housing 2110-1. At this time, when the protrusion 2213 is formed, the contact area between the first holder 2210 and the first housing 2110-1 can be reduced compared to the case where the protrusion 2213 is omitted. Through this, shock and noise generated due to the contact between the first holder 2210 and the first housing 2110-1 can be minimized.

The lens driving device 2000 may comprise a second lens 2220. Or, the second lens 2220 may be described as one configuration of the camera device 10 rather than one configuration of the lens driving device 2000. The first moving part 2200 may comprise a second lens 2220. The second lens 2220 may be disposed in an optical axis. The second lens 2220 may be disposed between the reflective member 1220 and the image sensor 3400. The second lens 2220 may be disposed between the first lens 2120 and the third lens 2320. The second lens 2220 may be disposed in the first holder 2210. The second lens 2220 may be coupled to the first holder 2210. The second lens 2220 may be fixed to the first holder 2210. The second lens 2220 may move against the first lens 2120. The second lens 2220 may move separately from the third lens 2320.

The second lens 2220 may be a second lens group. The second lens 2220 may comprise a plurality of lenses. The second lens 2220 may comprise two lenses.

The lens driving device 2000 may comprise a second moving part 2300. The second moving part 2300 may move against the fixed part 2100. The second moving part 2300 may move separately from the first moving part 2200. The second moving part 2300 may be disposed at a rear side of the first moving part 2200. The second moving part 2300 may move in a direction getting closer to and away from the first moving part 2200.

The lens driving device 2000 may comprise a second holder 2310. The second moving part 2300 may comprise a second holder 2310. The second holder 2310 may be disposed inside the housing 2110. The second holder 2310 may move against the housing 2110. At least a portion of the second holder 2310 may be spaced apart from the housing 2110. The second holder 2310 may be in contact with the housing 2110. The second holder 2310 may be in contact with the housing 2110 when moving. Or, in the initial state, the second holder 2310 may be in contact with the housing 2110. The second holder 2310 may be in contact with the first holder 2210. The second holder 2310 may be spaced apart from the first holder 2210. The second holder 2310 may be in contact with the first holder 2210 when moving. Or, in the initial state, the second holder 2310 may be in contact with the first holder 2210.

The second holder 2310 may comprise a protrusion 2311. The protrusion 2311 may be a test protrusion. The protrusion 2311 may be formed on an outer surface of the second holder 2310. The protrusion 2311 may be protruded from the second holder 2310. The protrusion 2311 can be seen from the outside through the first hole 2113 of the housing 2110. The protrusion 2311 may be used to test whether the lens driving device 2000 operates normally. The protrusion 2311 may comprise a flat surface 2311-1 and an inclined surface 2311-2.

The second holder 2310 may comprise a rail groove 2312. A ball 2500 may be disposed in the rail groove 2312. In the rail groove 2312, the ball 2500 may move by rolling. The rail groove 2312 and the ball 2500 may be in contact at two points. The rail groove 2312 may be disposed in an optical axis direction. The rail groove 2312 may be extended in an optical axis direction.

The rail groove 2312 may comprise a plurality of rail grooves. The rail groove 2312 may comprise four rail grooves. The rail groove 2312 may comprise first to fourth rail grooves. One or more balls 2500 may be disposed in each of the plurality of rail grooves 2312.

The second holder 2310 may comprise a protrusion 2313. The protrusion 2313 may be formed on a surface facing the first holder 2210 of the second holder 2310. The second holder 2310 may comprise a second surface facing the first holder 2210 and a plurality of protrusions 2313 formed on a second surface and being in contact with the second holder 2310. The protrusion 2313 may be in contact with the first holder 2210 when the second holder 2310 moves in a direction getting closer to the first holder 2210. At this time, when the protrusion 2313 is formed, the contact area between the second holder 2310 and the first holder 2210 can be reduced compared to the case where the protrusion 2313 is omitted. Through this, the impact and noise generated due to the contact between the second holder 2310 and the first holder 2210 can be minimized.

The lens driving device 2000 may comprise a third lens 2320. Or, the third lens 2320 may be described as one configuration of the camera device 10 rather than one configuration of the lens driving device 2000. The second moving part 2300 may comprise a third lens 2320. The third lens 2320 may be disposed in an optical axis. The third lens 2320 may be disposed between the reflective member 1220 and the image sensor 3400. The third lens 2320 may be disposed between the second lens 2220 and the image sensor 3400. The third lens 2320 may be disposed in the second holder 2310. The third lens 2320 may be coupled to the second holder 2310. The third lens 2320 may be fixed to the second holder 2310. The third lens 2320 may move against the first lens 2120. The third lens 2320 may move separately from the second lens 2220.

The third lens 2320 may be a third lens group. The third lens 2320 may comprise a plurality of lenses. The third lens 2320 may comprise two lenses.

The lens driving device 2000 may comprise a driving unit 2400. The driving unit 2400 may move at least some of the plurality of lenses. The driving unit 2400 may move the first moving part 2200 and the second moving part 2300 against the fixed part 2100. The driving unit 2400 may comprise a coil and a magnet. The driving unit 2400 may move the first moving part 2200 and the second moving part 2300 through electromagnetic interaction. In a modified embodiment, the driving unit 2400 may comprise a shape memory alloy.

The driving unit 2400 may comprise a first driving unit 2410. The first driving unit 2410 may move the first moving part 2200 against the fixed part 2100. The first driving unit 2410 may move the first moving part 2200 against the second moving part 2300. The first driving unit 2410 may be used to drive a zoom function. Or, the first driving unit 2410 may be used to drive an autofocus function.

The first driving unit 2410 may comprise a first driving magnet 2411. The first driving magnet 2411 may be disposed in the first moving part 2200. The first driving magnet 2411 may be disposed in the first holder 2210. The first driving magnet 2411 may be disposed on a side surface of the first holder 2210. The first driving magnet 2411 may be coupled to the first holder 2210. The first driving magnet 2411 may be fixed to the first holder 2210. The first driving magnet 2411 may be fixed to the first holder 2210 by an adhesive. The first driving magnet 2411 may move integrally with the first holder 2210. The first driving magnet 2411 may be disposed to face the first coil 2412. The first driving magnet 2411 may face the first coil 2412. The first driving magnet 2411 may be disposed at a position corresponding to the first coil 2412. The first driving magnet 2411 may interact with the first coil 2412. The first driving magnet 2411 may electromagnetically interact with the first coil 2412.

The first driving magnet 2411 may comprise a first magnet portion 2411-1. The first magnet portion 2411-1 may have a first polarity. The first driving magnet 2411 may comprise a second magnet portion 2411-2. The second magnet portion 2411-2 may have a second polarity different from the first polarity. At this time, the first polarity may be an N pole and the second polarity may be an S pole. Conversely, the first polarity may be an S pole and the second polarity may be an N pole.

The first driving magnet 2411 may comprise a neutral portion 2411-3. The neutral portion 2411-3 may be disposed between the first magnet portion 2411-1 and the second magnet portion 2411-2. The neutral portion 2411-3 may have a neutral polarity. The neutral portion 2411-3 may be a portion not being magnetized.

The first driving unit 2410 may comprise a first coil 2412. The first coil 2412 may be disposed on the substrate 2140. The first coil 2412 may be disposed on the first substrate 2141. The first coil 2412 may be disposed in the housing 2110. The first coil 2412 may be disposed at an outer side of the first holder 2210. When a current is applied to the first coil 2412, an electromagnetic field is formed around the first coil 2412 to interact with the first driving magnet 2411.

As a modified embodiment, the first coil 2412 may be disposed on the first holder 2210 and the first driving magnet 2411 may be disposed in the housing 2110.

The first coil 2412 may be formed in a ring shape. The first coil 2412 may be formed as a square ring or a circular ring. Even when the first coil 2412 is formed in a rectangular ring shape, the corner portion may be formed to be curved. The first coil 2412 may comprise a first portion 2412-1 and a second portion 2412-2 having a gap G1 therebetween. First and second Hall sensors 2413 and 2414 may be disposed in the gap G1 of the first coil 2412.

The lens driving device 2000 may comprise a Hall sensor. The Hall sensor may detect the first driving magnet 2411. The Hall sensor may comprise a plurality of Hall sensors. The Hall sensor may comprise a first Hall sensor 2413 and a second Hall sensor 2414. The first Hall sensor 2413 and the second Hall sensor 2414 may be spaced apart from each other. The first Hall sensor 2413 and the second Hall sensor 2414 may be spaced apart to form a gap G2 therebetween. The first Hall sensor 2413 and the second Hall sensor 2414 may detect the first driving magnet 2411. The first Hall sensor 2413 and the second Hall sensor 2414 may detect a magnetic force of the first driving magnet 2411. The first Hall sensor 2413 and the second Hall sensor 2414 may detect the position of the first holder 2210. The first Hall sensor 2413 and the second Hall sensor 2414 may detect the position of the second lens 2220.

The lens driving device 2000 may comprise a yoke 2415. The yoke 2415 may be disposed between the first driving magnet 2411 and the first holder 2210. The yoke 2415 may be disposed between the first driving magnet 2411 and the first moving part 2200. The yoke 2415 may be formed in a shape corresponding to the first driving magnet 2411. The yoke 2415 may increase the interaction force between the first driving magnet 2411 and the first coil 2412.

The yoke 2415 may comprise an extension portion 2415-1. The extension portion 2415-1 may surround the front and rear side surfaces of the first driving magnet 2411. The yoke 2415 may comprise a groove 2415-2. The groove 2415-2 may be formed in the central portion of the body portion of the yoke 2415.

The driving unit 2400 may comprise a second driving unit 2420. The second driving unit 2420 may move the second moving part 2300 against the fixed part 2100. The second driving unit 2420 may move the second moving part 2300 against the first moving part 2200. The second driving unit 2420 may be used to drive the auto focus function. Or, the second driving unit 2420 may be used to drive the zoom function.

The second driving unit 2420 may comprise a second driving magnet 2421. The second driving magnet 2421 may be disposed in the second moving part 2300. The second driving magnet 2421 may be disposed in the second holder 2310. The second driving magnet 2421 may be disposed on a side surface of the second holder 2310. The second driving magnet 2421 may be coupled to the second holder 2310. The second driving magnet 2421 may be fixed to the second holder 2310. The second driving magnet 2421 may be fixed to the second holder 2310 by an adhesive. The second driving magnet 2421 may move integrally with the second holder 2310. The second driving magnet 2421 may be disposed to face the second coil 2422. The second driving magnet 2421 may face the second coil 2422. The second driving magnet 2421 may be disposed at a position corresponding to the second coil 2422. The second driving magnet 2421 may interact with the second coil 2422. The second driving magnet 2421 may electromagnetically interact with the second coil 2422.

The second driving unit 2420 may comprise a second coil 2422. The second coil 2422 may be disposed on the substrate

2140. The second coil 2422 may be disposed on the second substrate 2142. The second coil 24222 may be disposed in the housing 2110. The second coil 2422 may be disposed outside the second holder 2310. When a current is applied to the second coil 2422, an electromagnetic field is formed around the second coil 2422 to interact with the second driving magnet 2421.

As a modified embodiment, the second coil 2422 may be disposed on the second holder 2310 and the second driving magnet 2421 may be disposed on the housing 2110.

The lens driving device 2000 may comprise a Hall sensor. The Hall sensor may detect the second driving magnet 2421. The Hall sensor may comprise a plurality of Hall sensors. The Hall sensor may comprise a third Hall sensor 2423 and a fourth Hall sensor 2424. The third Hall sensor 2423 and the fourth Hall sensor 2424 may be spaced apart from each other. The third Hall sensor 2423 and the fourth Hall sensor 2424 may be spaced apart to form a gap G2 therebetween. The third Hall sensor 2423 and the fourth Hall sensor 2424 may detect the second driving magnet 2421. The third Hall sensor 2423 and the fourth Hall sensor 2424 may detect a magnetic force of the second driving magnet 2421. The third Hall sensor 2423 and the fourth Hall sensor 2424 may detect the position of the second holder 2310. The third Hall sensor 2423 and the fourth Hall sensor 2424 may detect the position of the third lens 2320.

The lens driving device 2000 may comprise a yoke 2425. The yoke 2425 may be disposed between the second driving magnet 2421 and the second holder 2310. The yoke 2425 may be formed to have a shape corresponding to that of the second driving magnet 2421. The yoke 2425 may increase the interaction force between the second driving magnet 2421 and the second coil 2422.

The lens driving device 2000 may comprise a first yoke 2430.

The first yoke 2430 may be disposed such that an attractive force acts between the first yoke 2430 and the first driving magnet 2411. The first yoke 2430 may be disposed in the housing 2110. The first yoke 2430 may be disposed on the substrate 2140. The first yoke 2430 may be disposed on the first substrate 2141. The first holder 2210 may press the ball 2500 toward the guide rail 2130 by an attractive force between the first driving magnet 2411 and the first yoke 2430. That is, the ball 2500 may be maintained between the first holder 2210 and the guide rail 2130 without being separated and removed by the attractive force between the first driving magnet 2411 and the first yoke 2430.

The lens driving device 2000 may comprise a second yoke 2440. The second yoke 2440 may be a magnetic material. The second yoke 2440 may be disposed such that an attractive force acts between the second yoke 2440 and the second driving magnet 2421. The second yoke 2440 may be disposed in the housing 2110. The second yoke 2440 may be disposed on the substrate 2140. The second yoke 2440 may be disposed on the second substrate 2142. The second holder 2310 may press the ball 2500 toward the guide rail 2130 by an attractive force between the second driving magnet 2421 and the second yoke 2440. That is, the ball 2500 may be maintained between the second holder 2310 and the guide rail 2130 without being separated and removed by the attractive force between the second driving magnet 2421 and the second yoke 2440.

The lens driving device 2000 may comprise a ball 2500. The ball 2500 may guide the movement of the first holder 2210. The ball 2500 may be disposed between the guide rail 2130 and the moving parts 2200 and 2300. The ball 2500 may be disposed between the first holder 2210 and the guide rail 2130. The ball 2500 may guide the movement of the second holder 2310. The ball 2500 may be disposed between the second holder 2310 and the guide rail 2130. The ball 2500 may be formed in a spherical shape. The ball 2500 may roll over the rail groove 2212 of the first holder 2210 and the rail 2133 of the guide rail 2130. The ball 2500 may move in an optical axis direction between the rail groove 2212 of the first holder 2210 and the rail 2133 of the guide rail 2130. The ball 2500 may roll over the rail groove 2312 of the second holder 2310 and the rail 2133 of the guide rail 2130. The ball 2500 may move in an optical axis direction between the rail groove 2312 of the second holder 2310 and the rail 2133 of the guide rail 2130. The ball 2500 may comprise a plurality of balls. The ball 2500 may be provided a total of eight, four in the first holder 2210 and four in the second holder 2310.

The lens driving device 2000 may comprise a dummy glass 2600. The dummy glass 2600 may be disposed in the housing 2110. The dummy glass 2600 may close the rear opening of the housing 2110. The dummy glass 2600 may be formed to be transparent to allow light to pass therethrough.

The lens driving device 2000 may comprise a poron 2700. The poron 2700 may be a shock absorbing member. The poron 2700 can minimize the shock and noise generated by the movement of the first holder 2210 and the second holder 2310. The poron 2700 may be disposed at a portion where the first holder 2210 collides with the housing 2110. The poron 2700 may be disposed at a portion where the second holder 2310 collides with the housing 2110.

Figure 53:
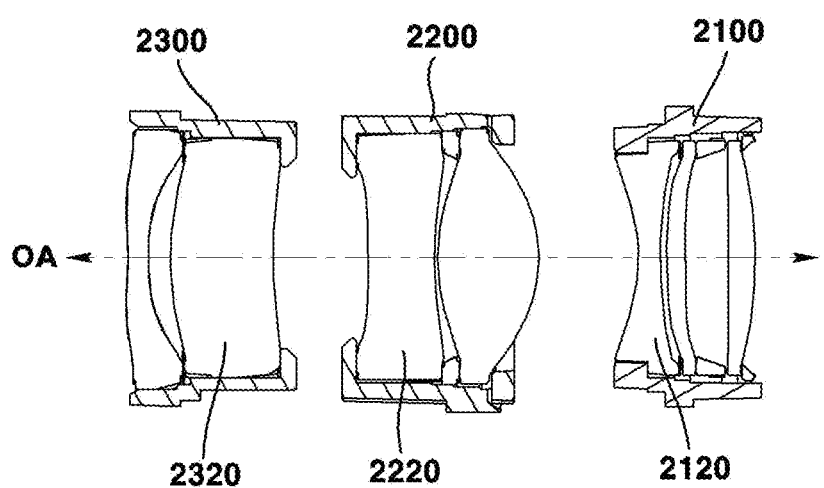
FIGS. 53 to 55 are diagrams for explaining implementation of a zoom function and an autofocus function of a lens driving device according to the present embodiment.
Figure 54:
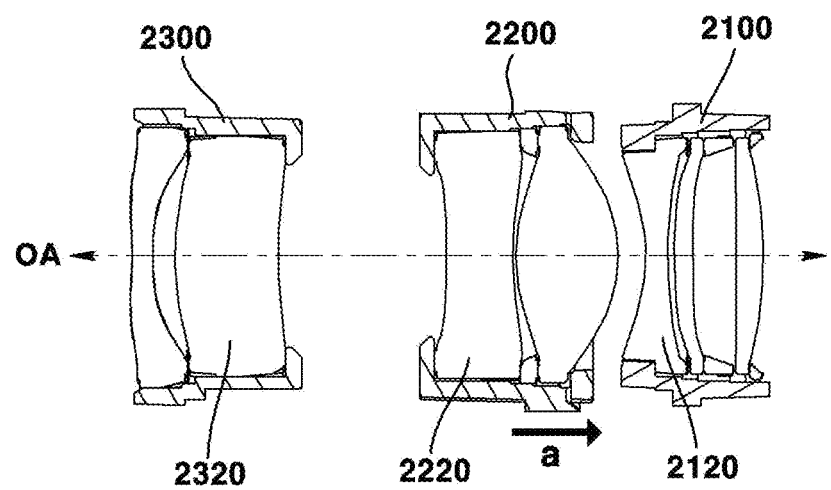
Figure 55:
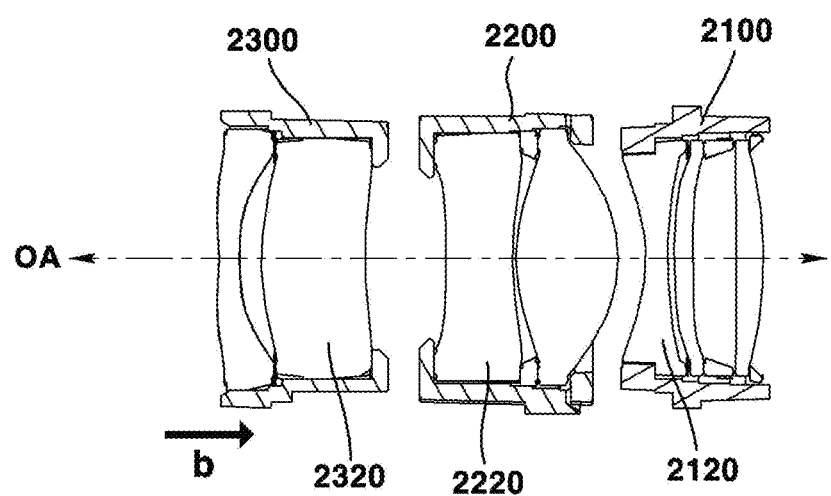

FIGS. 53 to 55 are diagrams for explaining implementation of a zoom function and an autofocus function of a lens driving device according to the present embodiment.

In the present embodiment, the first lens 2120, the second lens 2220, and the third lens 2320 may be disposed in a state aligned with the optical axis OA in the initial state in which current is not supplied to the driving unit 2400 (refer to FIG. 53).

At this time, when a current is applied to the first coil 2412, the second lens 2220 may move along the optical axis OA due to electromagnetic interaction between the first coil 2412 and the first driving magnet 2411 (refer to a in FIG. 54). As the second lens 2220 moves while the first lens 2120 is being fixed, a zoom function may be performed. When a current in a first direction is applied to the first coil 2412, the second lens 2220 may move in a direction getting closer to the first lens 2120. When a current in a second direction opposite to the first direction is applied to the first coil 2412, the second lens 2220 may move in a direction getting away from the first lens 2120.

Meanwhile, when a current is applied to the second coil 2422, the third lens 2320 may move along the optical axis OA due to electromagnetic interaction between the second coil 2422 and the second driving magnet 2421 (refer to FIG. 55 b). An auto focus (AF) function may be performed by relative movement of the third lens 2320 against the first lens 2120 and the second lens 2220. When a current in a first direction is applied to the second coil 2422, the third lens 2320 may move in a direction getting closer to the first lens 2120, and when a current in a second direction opposite to the first direction is applied to the second coil 2422, the third lens 2320 may move in a direction getting away from the first lens 2120.

Hereinafter, a camera device according to the present embodiment will be described with reference to the drawings.

Figure 1:
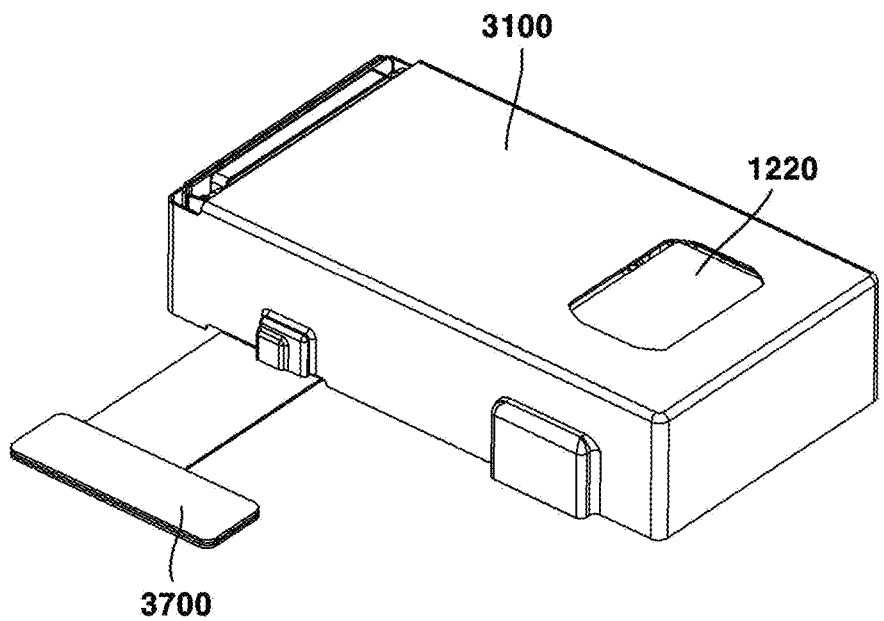
FIG. 1 is a perspective view of a camera device according to the present embodiment.
Figure 2:
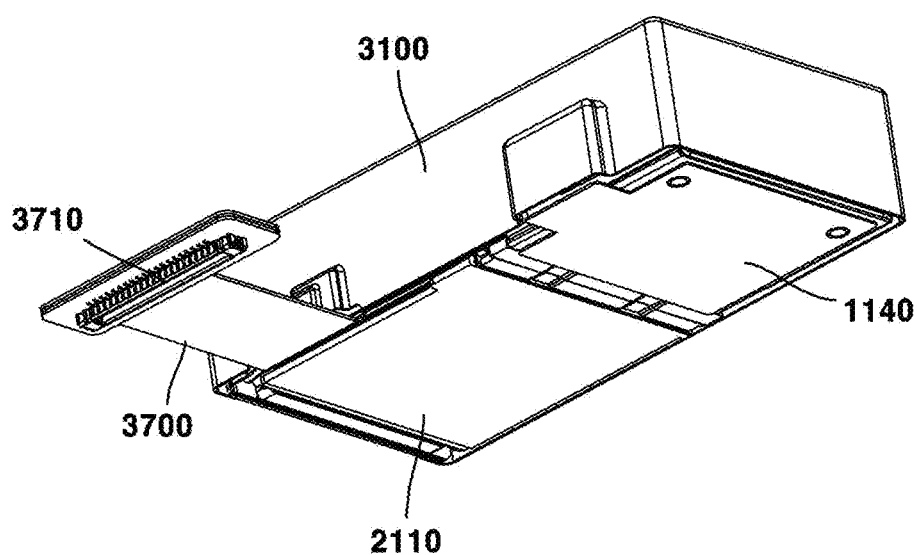
FIG. 2 is a bottom perspective view of a camera device according to the present embodiment.
Figure 3:
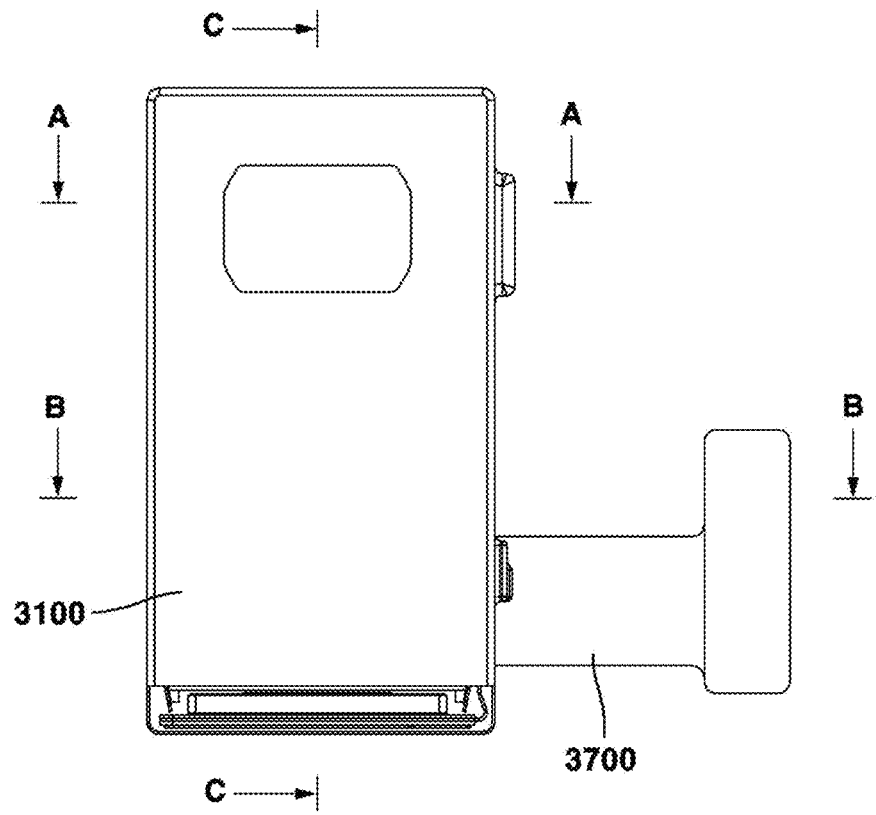
FIG. 3 is a flat surface diagram of a camera device according to the present embodiment.
Figure 4:
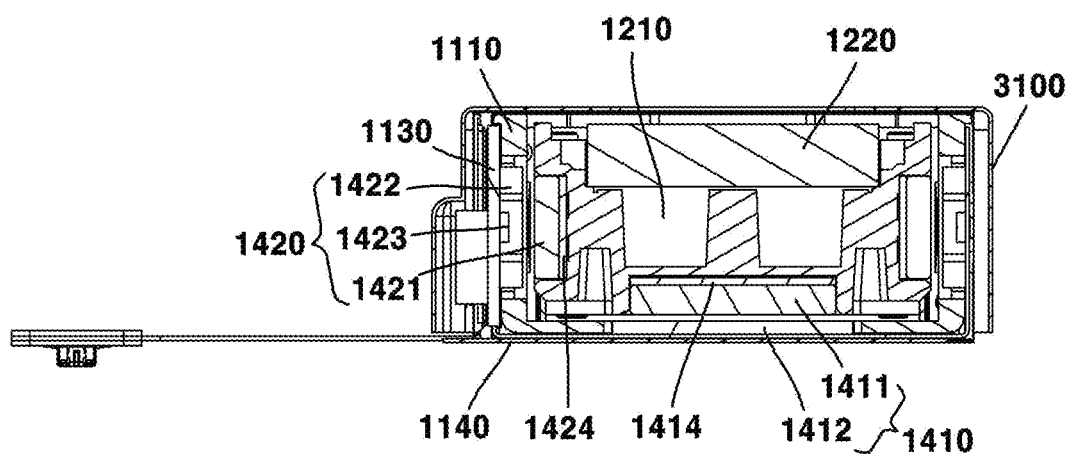
FIG. 4 is a cross-sectional view taken along line A-A of FIG. 3.
Figure 5:
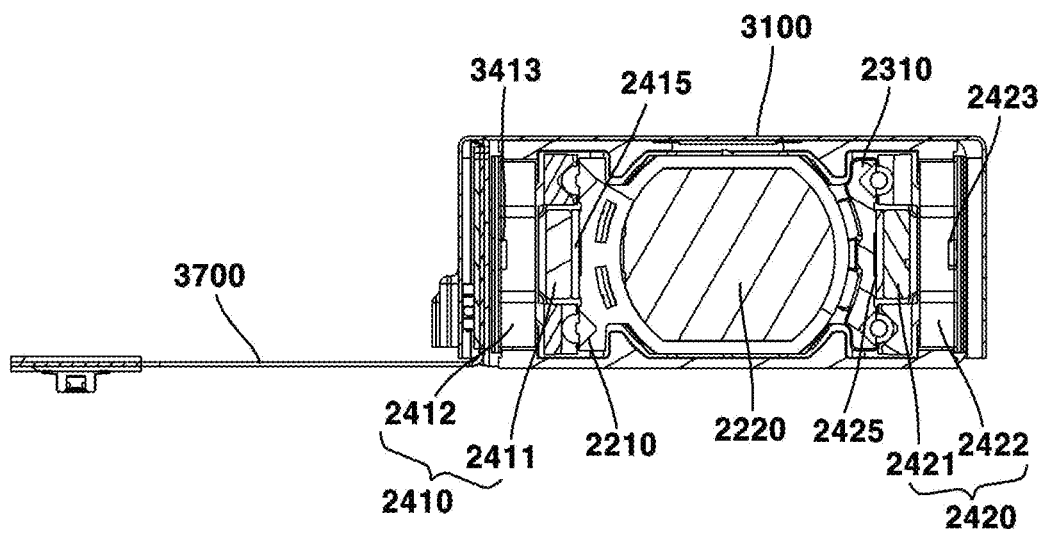
FIG. 5 is a cross-sectional view taken along line B-B of FIG. 3.
Figure 6:
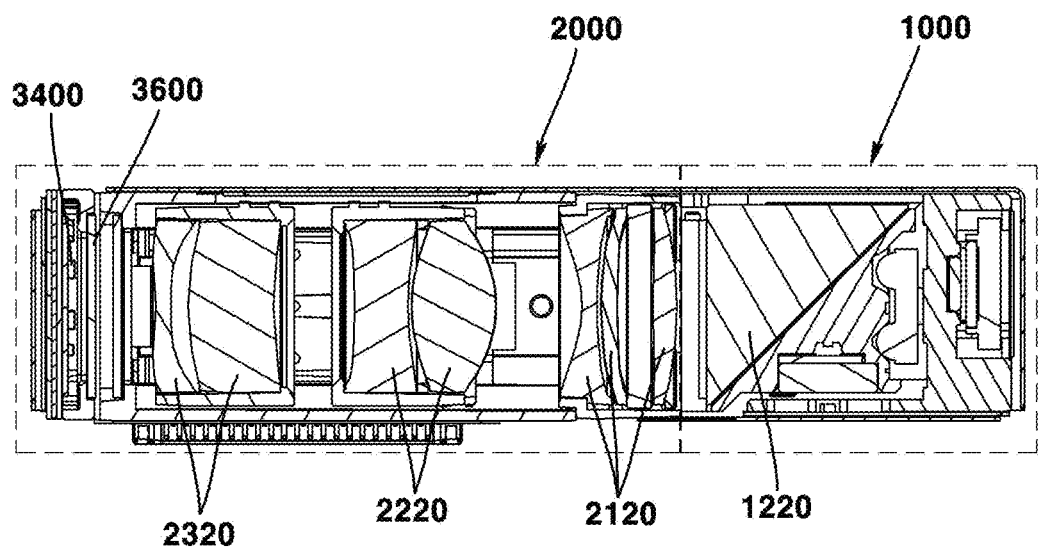
FIG. 6 is a cross-sectional view taken along line C-C of FIG. 3.
Figure 7:
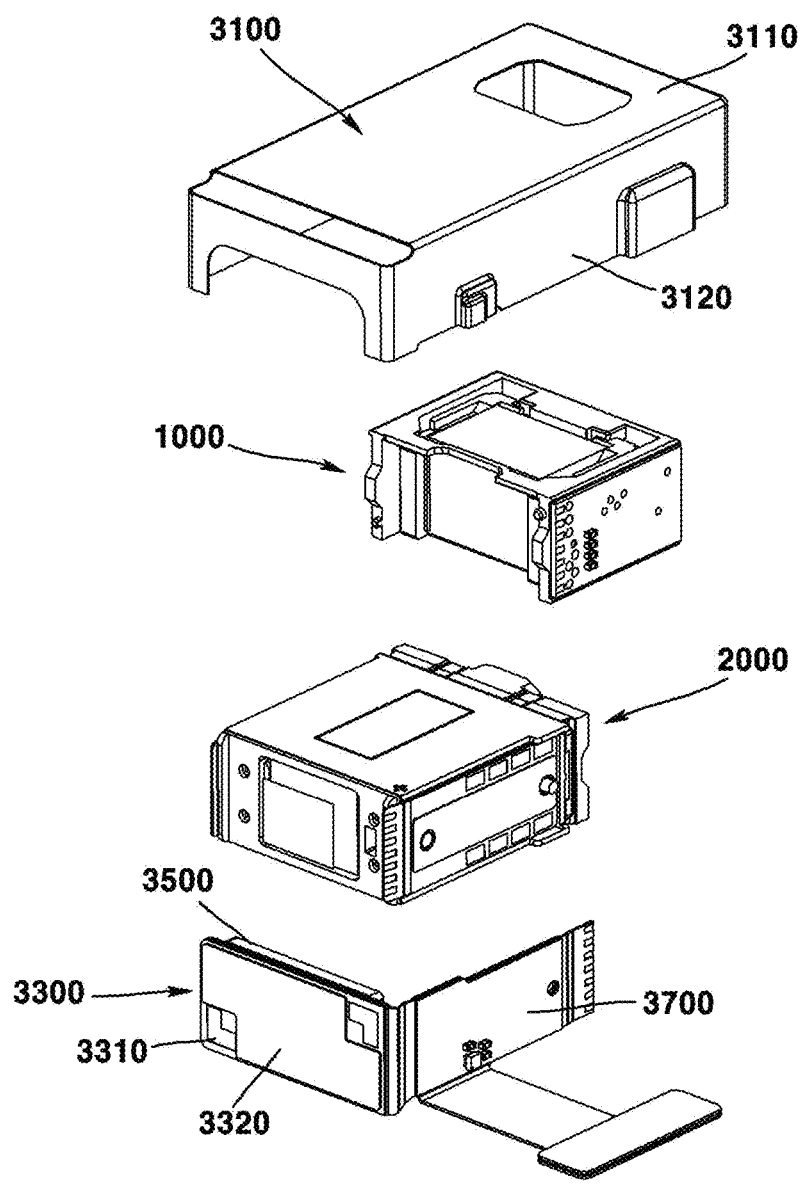
FIG. 7 is an exploded perspective view of a camera device according to the present embodiment.
Figure 8:
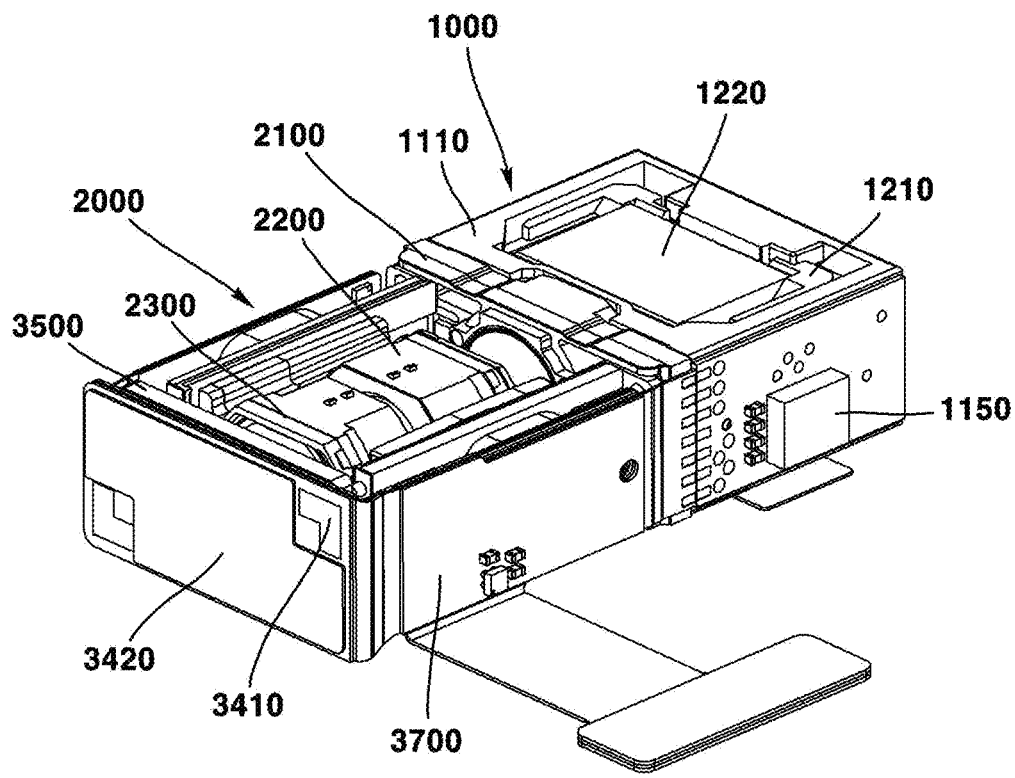
FIG. 8 is a perspective view in which the cover member is omitted from a camera device according to the present embodiment.
Figure 56:
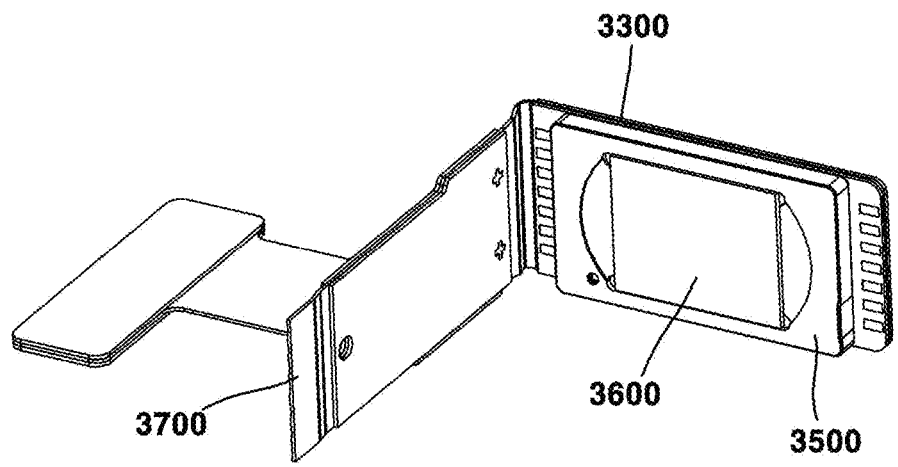
FIG. 56 is a perspective view of a partial configuration of a camera device according to the present embodiment.
Figure 57:
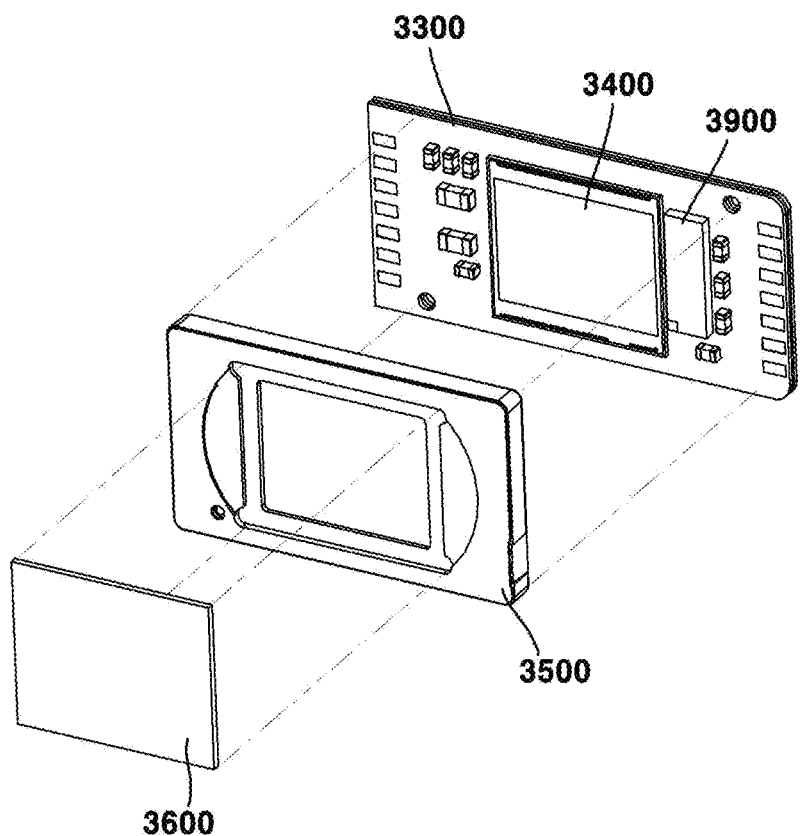
FIG. 57 is an exploded perspective view of an image sensor, a filter, and related components of a camera device according to the present embodiment.

FIG. 1 is a perspective view of a camera device according to the present embodiment; FIG. 2 is a bottom perspective view of a camera device according to the present embodiment; FIG. 3 is a flat surface diagram of a camera device according to the present embodiment; FIG. 4 is a cross-sectional view taken along line A-A of FIG. 3; FIG. 5 is a cross-sectional view taken along line B-B of FIG. 3; FIG. 6 is a cross-sectional view taken along line C-C of FIG. 3; FIG. 7 is an exploded perspective view of a camera device according to the present embodiment; FIG. 8 is a perspective view in which the cover member is omitted from a camera device according to the present embodiment; FIG. 56 is a perspective view of a partial configuration of a camera device according to the present embodiment; and FIG. 57 is an exploded perspective view of an image sensor, a filter, and a related configuration of a camera device according to the present embodiment.

The camera device 10 may comprise a cover member 3100. The cover member 3100 may be a 'cover can' or a 'shield can'. The cover member 3100 may be disposed to cover the reflective member driving device 1000 and the lens driving device 2000. The cover member 3100 may be disposed at an outer side of the reflective member driving device 1000 and the lens driving device 2000. The cover member 3100 may surround the reflective member driving device 1000 and the lens driving device 2000. The cover member 3100 may accommodate the reflective member driving device 1000 and the lens driving device 2000. The cover member 3100 may be formed of a metal material. The cover member 3100 may block electromagnetic interference (EMI).

The cover member 3100 may comprise an upper plate 3110. The upper plate 3110 may comprise an opening or a hole. Light may be incident through the opening or hole of the upper plate 3110. An opening or a hole in the upper plate 3110 may be formed at a position corresponding to the reflective member 1220.

The cover member 3100 may comprise a side plate 3120. The side plate 3120 may comprise a plurality of side plates. The side plate 3120 may comprise four side plates. The side plate 3120 may comprise first to fourth side plates. The side plate 3120 may comprise first and second side plates disposed opposite to each other, and third and fourth side plates disposed opposite to each other.

The camera device 10 may comprise a printed circuit board 3300 (PCB). The printed circuit board 3300 may be a board or a circuit board. A sensor base 3500 may be disposed on the printed circuit board 3300. The printed circuit board 3300 may be electrically connected to the reflective member driving device 1000 and the lens driving device 2000. The printed circuit board 3300 may be provided with various circuits, elements, control units, and the like to convert an image formed on the image sensor 3400 into an electrical signal and transmit it to an external device.

The printed circuit board 3300 may comprise a marking unit 3310. The marking unit 3310 may be disposed on the rear surface of the printed circuit board 3300.

The camera device 10 may comprise a suspension (SUS) 3320. The suspension 3320 may be disposed on a rear surface of the printed circuit board 3300. The suspension 3320 may reinforce the strength of the printed circuit board 3300. The suspension 3320 may radiate heat generated in the printed circuit board 3300.

The camera device 10 may comprise an image sensor 3400. The image sensor 3400 may be disposed on the printed circuit board 3300. Light passing through the lens and filter 3600 may be incident to the image sensor 3400 to form an image. The image sensor 3400 may be electrically connected to the printed circuit board 3300. For example, the image sensor 3400 may be coupled to the printed circuit board 3300 by a surface mounting technology (SMT). As another example, the image sensor 3400 may be coupled to the printed circuit board 3300 by flip chip technology. The image sensor 3400 may be disposed so that the lens and the optical axis coincide. The optical axis of the image sensor 3400 and the optical axis of the lens may be aligned. The image sensor 3400 may convert light irradiated to the effective image area of the image sensor 3400 into an electrical signal. The image sensor 3400 may comprise any one or more among a charge coupled device (CCD), a metal oxide semi-conductor (MOS), a CPD, and a CID.

The camera device 10 may comprise a sensor base 3500. The sensor base 3500 may be disposed on the printed circuit board 3300. A filter 3600 may be disposed on the sensor base 3500. An opening may be formed in a portion of the sensor base 3500 where the filter 3600 is disposed so that light passing through the filter 3600 may be incident on the image sensor 3400.

The camera device 10 may comprise a filter 3600. The filter 3600 may serve to block light of a specific frequency band from being incident on the image sensor 3400 in light passing through the lens. The filter 3600 may be disposed between the lens and the image sensor 3400. The filter 3600 may be disposed on the sensor base 3500. The filter 3600 may comprise an infrared filter. The infrared filter may block light in the infrared region from being incident on the image sensor 3400.

The camera device 10 may comprise a substrate 3700. The substrate 3700 may be connected to the printed circuit board 3300. The substrate 3700 may be extended from the printed circuit board 3300. The substrate 3700 may comprise a terminal electrically connected to the reflective member driving device 1000. The substrate 3700 may comprise an extension portion being extended outward.

The camera device 10 may comprise a connector 3710. The connector 3710 may be disposed on the board 3700. The connector 3710 may be disposed on a lower surface of the extension portion of the board 3700. The connector 3710 may be connected to, for example, a power supply unit of a smartphone.

The camera device 10 may comprise a temperature sensor 3800. The temperature sensor 3800 may detect a temperature. The temperature detected by the temperature sensor 3800 may be used for more accurate control of any one or more among a handshake correction function, an autofocus function, and a zoom function.

The camera device 10 may comprise a driver IC 3900. The driver IC 3900 may be electrically connected to the lens driving device 2000. The driver IC 3900 may be described as one configuration of the lens driving device 2000. The driver IC 3900 may be electrically connected to the first coil 2412 and the second coil 2422 of the lens driving device 2000. The driver IC 3900 may supply current to the first coil 2412 and the second coil 2422 of the lens driving device 2000. The driver IC 3900 may control at least one of a voltage or a current applied to each of the first coil 2412 and the second coil 2422 of the lens driving device 2000. The driver IC 3900 may be electrically connected to the Hall sensors 2413, 2414, 2423, and 2424. The driver IC 3900 may perform feedback control of the voltage and current applied to the first coil 2412 and the second coil 2422 through the positions of the second lens 2220 and the third lens 2320 detected by the Hall sensors 2413, 2414, 2423, and 2424.

Hereinafter, an optical device according to the present embodiment will be described with reference to the drawings.

Figure 58:
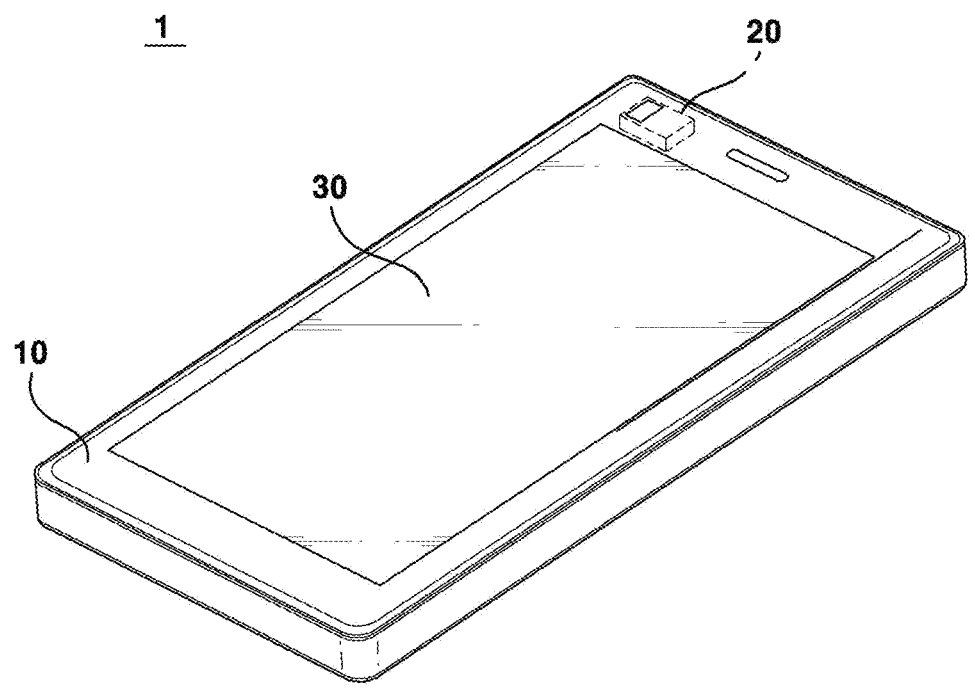
FIG. 58 is a perspective view of a front side of an optical device according to the present embodiment.
Figure 59:
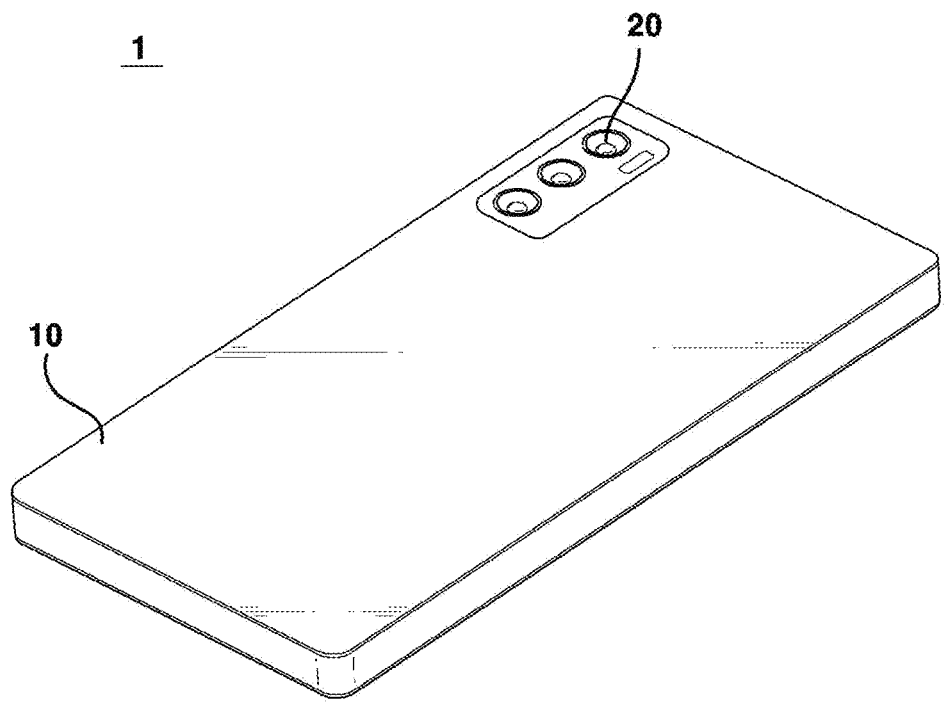
FIG. 59 is a perspective view of a rear surface of an optical device according to the present embodiment.

FIG. 58 is a perspective view of the front side of an optical device according to the present embodiment; and FIG. 59 is a perspective view of a rear surface of an optical device according to the present embodiment.

The optical device 1 may comprise any one or more among a hand phone, a mobile phone, a portable terminal, a mobile terminal, a smart phone, a smart pad, a portable smart device, a digital camera, a laptop computer, a digital broadcasting terminal, personal digital assistants (PDA), portable multimedia player (PMP), and navigation. The optical device 1 may comprise any device for photographing an image or a photo.

The optical device 1 may comprise a main body 20. The optical device 1 may comprise a camera device 10. The camera device 10 may be disposed in the main body 20. The camera device may photograph a subject. The optical device 1 may comprise a display 30. The display 30 may be disposed on the main body 20. The display 30 may output any one or more of a video and an image photographed by the camera device 10. The display 30 may be disposed on a first surface of the main body 20. The camera device 10 may be disposed on any one or more of the first surface of the main body 20 and the second surface opposite to the first surface.

The camera device 10 according to the present embodiment may be a folded camera module. The folded camera module may have an angle of view of 15 degrees to 40 degrees. The folded camera module may have a focal length of 18 mm to 20 mm or more. The folded camera module may be used as a rear camera of the optical device 1. A main camera having an angle of view of 70 degrees to 80 degrees may be disposed on the rear surface of the optical device 1. At this time, the folded camera can be disposed next to the main camera. That is, the camera device according to the present embodiment may be applied to any one or more of a plurality of rear cameras of the optical device 1. The camera device 10 according to the present embodiment may be applied to one camera among the rear cameras such as two, three, four or more of the optical device 1.

Meanwhile, the camera device 10 according to the present embodiment may be disposed on the front surface of the optical device 1. However, when the front camera of the optical device 1 is one, a wide-angle camera may be applied. When there are two or more of front cameras in the optical device 1, one of them may be a telescopic camera as in the present embodiment. However, since the focal length is shorter than that of the rear telescopic camera, a normal camera module that does not comprise a reflective member rather than a folded camera module may be applied.

Although the embodiment of the present invention has been described above with reference to the accompanying drawings, those of ordinary skill in the art to which the present invention belongs will understand that the present invention may be embodied in other specific forms without changing the technical spirit or essential features thereof. Therefore, it should be understood that the embodiments described above are illustrative in all respects and not restrictive.

The invention claimed is:

1. An actuator device comprising:
a holder;
a reflective member disposed on the holder;
a rigid mover coupled to the holder;
a first magnet disposed on the rigid mover;
a second magnet configured to generate a repulsive force with the first magnet; and
a first driving magnet configured to tilt the holder,
wherein the first driving magnet comprises a first surface in a direction toward the reflective member,
wherein the second magnet comprises a first surface in a direction toward the reflective member,
wherein the first surface of the first driving magnet comprises a first region that is the most adjacent to the second magnet, and
wherein the first region of the first driving magnet has a polarity different from that of the first surface of the second magnet.

2. The actuator device of claim 1, wherein the first surface of the first driving magnet comprises a second region having a polarity different from that of the first region.

3. The actuator device of claim 2, wherein the first driving magnet comprises a second surface opposite to the first surface of the first driving magnet, and
wherein the second surface of the first driving magnet comprises a third region having a polarity different from that of the first region and a fourth region having a polarity different from that of the second region.

4. The actuator device of claim 1, comprising:
a housing; and
a moving plate disposed between the housing and the holder,
wherein the second magnet is disposed on the housing.

5. The actuator device of claim 1, wherein a size of the first magnet is different from a size of the second magnet.

6. The actuator device of claim 4, wherein a central axis of the first magnet is disposed to be eccentric with a central axis of the moving plate with respect to a first optical axis.

7. The actuator device of claim 4, wherein the rigid mover comprises a protruding portion coupled to the housing by a damper.

8. The actuator device of claim 3, wherein the first driving magnet comprises a neutral portion disposed between the first region and the second region.

9. The actuator device of claim 3, comprising a first coil configured to interact with the first driving magnet,
wherein the second surface of the first driving magnet faces the first coil.

10. An actuator device comprising:
a fixed part;
a moving part configured to move with respect to the fixed part;
a first magnet disposed on the moving part;
a second magnet configured to generate a repulsive force with the first magnet; and
a first driving magnet configured to tilt the moving part,
wherein the second magnet comprises a first surface opposite to a surface facing the first magnet, and
wherein a region of the first driving magnet that is the most adjacent to the first surface of the second magnet has a polarity configured to generate an attractive force with the first surface of the second magnet.

11. The actuator device of claim 1, wherein the second magnet comprises a second surface disposed at an opposite side of the first surface of the second magnet,
wherein the first magnet comprises a first surface facing the second surface of the second magnet, and
wherein the first surface of the first magnet has a same polarity as the second surface of the second magnet.

12. The actuator device of claim 1, wherein the second magnet is disposed so as not to be overlapped with the first driving magnet in a direction to which the first surface of the first driving magnet faces.

13. The actuator device of claim 1, wherein the second magnet is disposed so as not to be overlapped with the first driving magnet in a direction to which the first surface of the second magnet faces.

14. The actuator device of claim 2, wherein the first region of the first driving magnet has an S pole, and wherein the second region of the first driving magnet has an N pole.

15. The actuator device of claim 1, wherein the holder comprises a groove concavely formed on a lower surface of the holder, and wherein at least a portion of the first driving magnet is disposed on the groove of the holder.

16. The actuator device of claim 9, wherein the first driving magnet and the first coil are configured to tilt the holder with respect to a first axis.

17. The actuator device of claim 16, comprising a second driving magnet and a second coil configured to tilt the holder with respect to a second axis perpendicular to the first axis, wherein the second driving magnet is disposed on both side surfaces of the holder.

18. A camera device comprising:
a printed circuit board;
an image sensor disposed on the printed circuit board;
the actuator device of claim 1; and
a lens disposed on an optical path formed by the reflective member and the image sensor of the actuator device.

19. An optical device comprising:
a main body;
the camera device of claim 18 disposed on the main body; and
a display disposed on the main body and configured to output at least one of a video and an image photographed by the camera device.

20. An actuator device comprising:
a fixed part;
a moving part configured to move with respect to the fixed part;
a magnet disposed on the fixed part and configured to generate a repulsive force with the moving part; and
a driving magnet configured to drive the moving part,
wherein a first surface of the magnet and a first region of the driving magnet that is the most adjacent to the first surface of the magnet are configured to generate an attractive force with each other.

* * * * *